(12) United States Patent
Schweigert et al.

(10) Patent No.: US 12,434,112 B2
(45) Date of Patent: Oct. 7, 2025

(54) GOLF CLUB HEADS AND METHODS TO MANUFACTURE GOLF CLUB HEADS

(71) Applicant: PARSONS XTREME GOLF, LLC, Scottsdale, AZ (US)

(72) Inventors: Bradley D. Schweigert, Cave Creek, AZ (US); Brandt B. Cameron, Scottsdale, AZ (US)

(73) Assignee: PARSONS XTREME GOLF, LLC, Scottsdale, AZ (US)

( * ) Notice: Subject to any disclaimer, the term of this patent is extended or adjusted under 35 U.S.C. 154(b) by 169 days.

(21) Appl. No.: 18/403,995

(22) Filed: Jan. 4, 2024

(65) Prior Publication Data

US 2024/0139589 A1    May 2, 2024

Related U.S. Application Data

(63) Continuation-in-part of application No. 18/385,960, filed on Nov. 1, 2023, and a continuation-in-part of
(Continued)

(51) Int. Cl.
*A63B 53/04* (2015.01)
*A63B 60/02* (2015.01)

(52) U.S. Cl.
CPC .......... *A63B 53/0466* (2013.01); *A63B 53/04* (2013.01); *A63B 60/02* (2015.10);
(Continued)

(58) Field of Classification Search
CPC . A63B 53/0466; A63B 53/04; A63B 53/0408; A63B 53/0412; A63B 53/0416;
(Continued)

(56) References Cited

U.S. PATENT DOCUMENTS 1,133,129 A    3/1915   Govan
1,269,745 A    6/1918   Robertson
(Continued)

FOREIGN PATENT DOCUMENTS

CN         1608696 A      4/2005
CN       203108126 U      8/2013
(Continued)

*Primary Examiner* — Jason L Vaughan
*Assistant Examiner* — Amanda Kreiling

(57) ABSTRACT

Embodiments of golf club heads and methods to manufacture golf club heads are generally described herein. In one example, a golf club head includes a metal body portion including a front portion having a peripheral face portion surrounding an opening. A face plate is set in the opening and includes a metal bezel welded to the opening and a strike assembly set in the bezel. The strike assembly includes an outer metal sheet welded to the metal bezel, an inner metal sheet welded to the metal bezel, and an intermediate composite sheet disposed between the outer metal sheet and the inner metal sheet. The intermediate composite sheet includes a fiber reinforced thermoplastic having a plurality of discontinuous fibers transversely aligned. Other examples and embodiments may be described and claimed.

20 Claims, 38 Drawing Sheets

Related U.S. Application Data application No. 18/206,474, filed on Jun. 6, 2023, now Pat. No. 12,285,660, and a continuation-in-part of application No. 18/201,350, filed on May 24, 2023, now Pat. No. 12,303,750, said application No. 18/385,960 is a continuation of application No. 18/115,100, filed on Feb. 28, 2023, now Pat. No. 11,839,799, which is a continuation-in-part of application No. 17/841,893, filed on Jun. 16, 2022, now Pat. No. 11,806,590, which is a continuation of application No. 17/685,546, filed on Mar. 3, 2022, now Pat. No. 11,400,352, said application No. 18/115,100 is a continuation-in-part of application No. 17/528,436, filed on Nov. 17, 2021, now abandoned, said application No. 18/201,350 is a continuation-in-part of application No. 17/400,516, filed on Aug. 12, 2021, now Pat. No. 11,779,819, and a continuation of application No. 17/198,906, filed on Mar. 11, 2021, now Pat. No. 11,684,831, said application No. 18/206,474 is a continuation of application No. 17/198,770, filed on Mar. 11, 2021, now Pat. No. 11,707,651, said application No. 17/400,516 is a continuation of application No. 16/930,716, filed on Jul. 16, 2020, now Pat. No. 11,110,328, said application No. 17/198,906 is a continuation of application No. 16/813,453, filed on Mar. 9, 2020, now Pat. No. 10,967,231, said application No. 17/198,770 is a continuation of application No. 16/807,591, filed on Mar. 3, 2020, now Pat. No. 10,960,274, said application No. 16/930,716 is a continuation of application No. 16/422,661, filed on May 24, 2019, now Pat. No. 10,722,765.

(60) Provisional application No. 63/316,154, filed on Mar. 3, 2022, provisional application No. 63/276,981, filed on Nov. 8, 2021, provisional application No. 63/117,182, filed on Nov. 23, 2020, provisional application No. 62/957,757, filed on Jan. 6, 2020, provisional application No. 62/897,015, filed on Sep. 6, 2019, provisional application No. 62/873,773, filed on Jul. 12, 2019, provisional application No. 62/850,292, filed on May 20, 2019, provisional application No. 62/837,592, filed on Apr. 23, 2019, provisional application No. 62/816,418, filed on Mar. 11, 2019.

(52) U.S. Cl.
CPC ....... *A63B 53/0408* (2020.08); *A63B 53/0412* (2020.08); *A63B 53/0416* (2020.08); *A63B 53/042* (2020.08); *A63B 53/0425* (2020.08); *A63B 53/0429* (2020.08); *A63B 53/0433* (2020.08); *A63B 2053/0491* (2013.01)

(58) Field of Classification Search
CPC .............. A63B 53/042; A63B 53/0425; A63B 53/0429; A63B 53/0433; A63B 53/00
See application file for complete search history.

(56) References Cited

U.S. PATENT DOCUMENTS

| | | |
|---|---|---|
| 1,306,029 A | 6/1919 | Robertson |
| 1,534,600 A | 4/1925 | Mattern |
| 1,538,312 A | 5/1925 | Neish |
| 2,034,936 A | 3/1936 | Barnhart |
| 3,652,094 A | 3/1972 | Glover |
| 4,085,934 A | 4/1978 | Churchward |
| 4,502,687 A | 3/1985 | Kochevar |
| 4,545,580 A | 10/1985 | Tomita et al. |
| 4,591,160 A | 5/1986 | Piragino |
| 4,614,627 A | 9/1986 | Curtis et al. |
| 4,803,023 A | 2/1989 | Enomoto et al. |
| 4,824,116 A | 4/1989 | Nagamoto et al. |
| 4,883,274 A | 11/1989 | Hsien |
| 4,883,623 A | 11/1989 | Nagamoto et al. |
| 4,988,104 A | 1/1991 | Shiotani et al. |
| 5,090,702 A | 2/1992 | Viste |
| 5,106,094 A | 4/1992 | Desbiolles et al. |
| 5,213,328 A | 5/1993 | Long et al. |
| 5,219,408 A | 6/1993 | Sun |
| 5,244,211 A | 9/1993 | Lukasiewicz |
| 5,282,624 A | 2/1994 | Viste |
| 5,306,450 A | 4/1994 | Okumoto et al. |
| 5,351,958 A | 10/1994 | Helmstetter |
| 5,377,985 A | 1/1995 | Ohnishi |
| 5,380,009 A | 1/1995 | Henry et al. |
| 5,405,137 A | 4/1995 | Vincent et al. |
| 5,407,202 A | 4/1995 | Igarashi |
| 5,419,559 A | 5/1995 | Melanson et al. |
| 5,421,577 A | 6/1995 | Kobayashi |
| 5,451,056 A | 9/1995 | Manning |
| 5,467,983 A | 11/1995 | Chen |
| 5,485,998 A | 1/1996 | Kobayashi |
| 5,518,243 A | 5/1996 | Redman |
| 5,529,543 A | 6/1996 | Beaumont, Sr. |
| 5,547,427 A | 8/1996 | Rigal et al. |
| 5,624,331 A | 4/1997 | Lo et al. |
| 5,637,045 A | 6/1997 | Igarashi |
| 5,649,873 A | 7/1997 | Fuller |
| 5,676,605 A | 10/1997 | Kobayashi |
| D386,550 S | 11/1997 | Wright et al. |
| D386,551 S | 11/1997 | Solheim et al. |
| D387,405 S | 12/1997 | Solheim et al. |
| 5,766,092 A | 6/1998 | Mimeur et al. |
| 5,766,094 A | 6/1998 | Mahaffey et al. |
| 5,769,735 A | 6/1998 | Hosokawa |
| 5,785,610 A | 7/1998 | Birmingham |
| 5,788,584 A | 8/1998 | Parente et al. |
| 5,797,807 A | 8/1998 | Moore |
| 5,971,868 A | 10/1999 | Kosmatka |
| 5,993,331 A | 11/1999 | Shieh |
| 5,997,415 A | 12/1999 | Wood |
| 6,042,486 A | 3/2000 | Gallagher |
| 6,077,171 A | 6/2000 | Yoneyama |
| 6,146,287 A | 11/2000 | Rugge et al. |
| 6,162,133 A | 12/2000 | Peterson |
| 6,165,081 A | 12/2000 | Chou |
| 6,203,449 B1 | 3/2001 | Kenmi |
| 6,231,458 B1 | 5/2001 | Cameron et al. |
| 6,280,349 B1 | 8/2001 | Cook |
| 6,306,048 B1 | 10/2001 | McCabe et al. |
| 6,368,234 B1 | 4/2002 | Galloway |
| 6,379,262 B1 | 4/2002 | Boone |
| 6,386,990 B1 | 5/2002 | Reyes et al. |
| 6,409,612 B1 | 6/2002 | Evans et al. |
| 6,413,169 B1 | 7/2002 | Kosmatka |
| 6,435,977 B1 | 8/2002 | Helmstetter et al. |
| 6,454,665 B2 | 9/2002 | Antonious |
| 6,471,604 B2 | 10/2002 | Hocknell et al. |
| 6,506,127 B2 | 1/2003 | Helmstetter et al. |
| 6,595,057 B2 | 7/2003 | Bissonnette et al. |
| 6,607,451 B2 | 8/2003 | Kosmatka et al. |
| 6,616,546 B2 | 9/2003 | Cho |
| 6,638,182 B2 | 10/2003 | Kosmatka |
| 6,641,491 B1 | 11/2003 | Schillaci |
| 6,695,712 B1 | 2/2004 | Iwata et al. |
| 6,695,714 B1 | 2/2004 | Bliss et al. |
| 6,729,971 B2 | 5/2004 | Caldwell |
| 6,743,117 B2 | 6/2004 | Gilbert |
| 6,746,343 B2 | 6/2004 | Yoneyama |
| 6,780,123 B2 | 8/2004 | Hasebe |
| 6,800,040 B2 | 10/2004 | Galloway et al. |
| 6,811,496 B2 | 11/2004 | Wahl et al. |
| 6,830,519 B2 | 12/2004 | Reed et al. |
| 6,835,144 B2 | 12/2004 | Best |
| 6,840,872 B2 | 1/2005 | Yoneyama |

(56) References Cited

U.S. PATENT DOCUMENTS

| | | |
|---|---|---|
| 6,852,038 B2 | 2/2005 | Yabu |
| 6,857,973 B2 | 2/2005 | Wieland et al. |
| 6,863,626 B2 | 3/2005 | Evans et al. |
| 6,904,663 B2 | 6/2005 | Willett et al. |
| 6,932,719 B2 | 8/2005 | Yabu |
| 6,951,518 B2 | 10/2005 | Solheim et al. |
| 6,979,270 B1 | 12/2005 | Allen |
| 6,984,180 B2 | 1/2006 | Hasebe |
| 6,986,715 B2 | 1/2006 | Mahaffey |
| 6,991,560 B2 | 1/2006 | Tseng |
| 6,997,821 B2 | 2/2006 | Galloway et al. |
| 7,014,570 B2 | 3/2006 | Evans et al. |
| 7,041,003 B2 | 5/2006 | Bissonnette et al. |
| 7,082,665 B2 | 8/2006 | Deshmukh et al. |
| 7,083,530 B2 | 8/2006 | Wahl et al. |
| 7,101,289 B2 | 9/2006 | Gibbs et al. |
| 7,121,956 B2 | 10/2006 | Lo |
| 7,125,344 B2 | 10/2006 | Hocknell et al. |
| 7,137,903 B2 | 11/2006 | Best et al. |
| 7,137,907 B2 | 11/2006 | Gibbs et al. |
| 7,153,220 B2 | 12/2006 | Lo |
| 7,169,062 B2 | 1/2007 | Chen |
| 7,182,698 B2 | 2/2007 | Tseng |
| 7,186,190 B1 | 3/2007 | Beach et al. |
| 7,192,364 B2 | 3/2007 | Long |
| 7,214,142 B2 | 5/2007 | Meyer et al. |
| 7,220,189 B2 | 5/2007 | Wieland et al. |
| 7,223,180 B2 | 5/2007 | Willett et al. |
| 7,258,625 B2 | 8/2007 | Kawaguchi et al. |
| 7,258,626 B2 | 8/2007 | Gibbs et al. |
| 7,258,628 B2 | 8/2007 | Huang et al. |
| 7,281,988 B2 | 10/2007 | Hou |
| 7,338,388 B2 | 3/2008 | Schweigert et al. |
| 7,347,794 B2 | 3/2008 | Schweigert |
| 7,347,795 B2 | 3/2008 | Yamagishi et al. |
| 7,367,897 B2 | 5/2008 | Poynor |
| 7,384,348 B2 | 6/2008 | Lin et al. |
| 7,387,579 B2 | 6/2008 | Lin et al. |
| 7,419,441 B2 | 9/2008 | Hoffman et al. |
| 7,422,528 B2 | 9/2008 | Gibbs et al. |
| 7,435,190 B2 | 10/2008 | Sugimoto |
| 7,442,132 B2 | 10/2008 | Nishio |
| 7,448,960 B2 | 11/2008 | Gibbs et al. |
| 7,448,964 B2 | 11/2008 | Schweigert et al. |
| 7,494,426 B2 | 2/2009 | Nishio et al. |
| 7,524,249 B2 | 4/2009 | Breier et al. |
| 7,527,565 B1 | 5/2009 | Ehlers et al. |
| 7,572,193 B2 | 8/2009 | Yokota |
| 7,575,524 B2 | 8/2009 | Willett et al. |
| 7,582,024 B2 | 9/2009 | Shear |
| 7,584,531 B2 | 9/2009 | Schweigert et al. |
| 7,594,862 B2 | 9/2009 | Gilbert |
| 7,597,633 B2 | 10/2009 | Shimazaki et al. |
| 7,601,077 B2 | 10/2009 | Serrano et al. |
| 7,611,424 B2 | 11/2009 | Nagai et al. |
| 7,618,331 B2 | 11/2009 | Hirano |
| 7,641,568 B2 | 1/2010 | Hoffman et al. |
| 7,658,686 B2 | 2/2010 | Soracco |
| 7,713,140 B2 | 5/2010 | Gibbs et al. |
| 7,731,603 B2 | 6/2010 | Beach et al. |
| 7,744,484 B1 | 6/2010 | Chao |
| 7,785,212 B2 | 8/2010 | Lukasiewicz et al. |
| 7,794,333 B2 | 9/2010 | Wallans et al. |
| 7,798,203 B2 | 9/2010 | Schweigert et al. |
| 7,806,781 B2 | 10/2010 | Imamoto |
| 7,811,178 B2 | 10/2010 | Davis |
| 7,846,041 B2 | 12/2010 | Beach et al. |
| 7,871,339 B2 | 1/2011 | Sanchez et al. |
| 7,927,229 B2 | 4/2011 | Jertson et al. |
| 7,935,000 B2 | 5/2011 | Stites |
| 8,007,369 B2 | 8/2011 | Soracco |
| 8,012,038 B1 | 9/2011 | Beach et al. |
| 8,012,040 B2 | 9/2011 | Takechi |
| 8,012,041 B2 | 9/2011 | Gibbs et al. |
| 8,016,691 B2 | 9/2011 | Stites |
| 8,033,930 B2 | 10/2011 | Tavares et al. |
| 8,033,931 B2 | 10/2011 | Wahl et al. |
| 8,070,623 B2 | 12/2011 | Stites et al. |
| 8,088,025 B2 | 1/2012 | Wahl et al. |
| 8,096,896 B2 | 1/2012 | Schiell et al. |
| 8,187,116 B2 | 5/2012 | Boyd et al. |
| 8,192,303 B2 | 6/2012 | Ban |
| 8,197,357 B1 | 6/2012 | Rice et al. |
| 8,202,175 B2 | 6/2012 | Ban |
| 8,221,264 B2 | 7/2012 | Cole et al. |
| 8,226,498 B2 | 7/2012 | Stites et al. |
| 8,235,843 B1 | 8/2012 | Rice et al. |
| 8,257,196 B1 | 9/2012 | Abbott et al. |
| 8,262,506 B2 | 9/2012 | Watson et al. |
| 8,287,402 B2 | 10/2012 | Shiell et al. |
| 8,353,783 B2 | 1/2013 | Soracco |
| 8,353,787 B2 | 1/2013 | Meyer et al. |
| 8,371,957 B2 | 2/2013 | Schweigert et al. |
| 8,376,876 B2 | 2/2013 | Gibbs et al. |
| 8,403,769 B2 | 3/2013 | Stites |
| 8,414,422 B2 | 4/2013 | Peralta et al. |
| 8,430,763 B2 | 4/2013 | Beach et al. |
| 8,439,769 B2 | 5/2013 | Rice et al. |
| 8,444,506 B2 | 5/2013 | Watson et al. |
| 8,449,406 B1 | 5/2013 | Frame et al. |
| 8,469,834 B2 | 6/2013 | Wada et al. |
| 8,480,512 B2 | 7/2013 | Oldknow et al. |
| 8,485,919 B2 | 7/2013 | Rice et al. |
| 8,540,590 B2 | 9/2013 | Tsukada et al. |
| 8,545,343 B2 | 10/2013 | Boyd et al. |
| 8,568,248 B2 | 10/2013 | DeShiell et al. |
| 8,602,912 B2 | 12/2013 | Stites |
| 8,628,431 B2 | 1/2014 | Schweigert et al. |
| 8,651,975 B2 | 2/2014 | Soracco |
| 8,657,701 B2 | 2/2014 | Boyd et al. |
| 8,663,026 B2 | 3/2014 | Blowers et al. |
| 8,696,489 B2 | 4/2014 | Gibbs et al. |
| 8,727,908 B2 | 5/2014 | Goto |
| 8,734,265 B2 | 5/2014 | Soracco |
| 8,784,232 B2 | 7/2014 | Jertson et al. |
| 8,790,196 B2 | 7/2014 | Solheim et al. |
| 8,814,724 B2 | 8/2014 | Kato |
| 8,826,512 B2 | 9/2014 | Schweigert |
| 8,845,454 B2 | 9/2014 | Boyd et al. |
| 8,858,362 B1 | 10/2014 | Leposky et al. |
| 8,876,624 B2 | 11/2014 | Ban et al. |
| 8,888,607 B2 | 11/2014 | Harbert et al. |
| 8,900,069 B2 | 12/2014 | Beach et al. |
| 8,900,072 B1 | 12/2014 | Willett et al. |
| 8,905,858 B2 | 12/2014 | Nivanh et al. |
| 8,915,794 B2 | 12/2014 | Stites |
| 8,979,671 B1 | 3/2015 | Demille et al. |
| 9,022,880 B2 | 5/2015 | Kawaguchi et al. |
| 9,033,819 B2 | 5/2015 | Wahl et al. |
| 9,033,820 B2 | 5/2015 | Kato |
| 9,089,746 B2 | 7/2015 | Schweigert |
| 9,089,747 B2 | 7/2015 | Boyd et al. |
| 9,101,808 B2 | 8/2015 | Stites et al. |
| 9,101,809 B2 | 8/2015 | Gibbs et al. |
| 9,168,436 B2 | 10/2015 | Slaughter et al. |
| 9,199,138 B2 | 12/2015 | Willett et al. |
| 9,199,140 B1 | 12/2015 | Schweigert et al. |
| 9,242,152 B2 | 1/2016 | Cole et al. |
| 9,265,996 B1 | 2/2016 | Abbott et al. |
| 9,327,173 B2 | 5/2016 | Mizutani |
| 9,352,197 B2 | 5/2016 | Parsons et al. |
| 9,370,697 B2 * | 6/2016 | Beno .................... A63B 60/00 |
| 9,393,471 B2 | 7/2016 | Beno et al. |
| 9,399,157 B2 | 7/2016 | Greensmith et al. |
| 9,399,158 B2 | 7/2016 | Parsons et al. |
| 9,403,069 B2 | 8/2016 | Boyd et al. |
| 9,452,325 B2 | 9/2016 | DeShiell et al. |
| 9,492,722 B2 | 11/2016 | Taylor et al. |
| 9,550,096 B2 | 1/2017 | Parsons et al. |
| 9,573,027 B2 | 2/2017 | Nivanh et al. |
| 9,630,070 B2 | 4/2017 | Parsons et al. |
| 9,649,542 B2 | 5/2017 | Nicolette |
| 9,669,270 B2 | 6/2017 | Schweigert et al. |
| 9,682,295 B1 | 6/2017 | Dawson et al. |

(56) References Cited

U.S. PATENT DOCUMENTS

| | | |
|---|---|---|
| 9,700,764 B2 | 7/2017 | Carter |
| 9,717,959 B2 | 8/2017 | Stites |
| 9,782,643 B2 | 10/2017 | Parsons et al. |
| 9,795,842 B1 | 10/2017 | Parsons et al. |
| 9,795,844 B1 | 10/2017 | Dacey et al. |
| 9,814,954 B2 | 11/2017 | Westrum et al. |
| 9,821,201 B1 | 11/2017 | Parsons et al. |
| 9,833,667 B1 | 12/2017 | Parsons et al. |
| 9,839,817 B1 | 12/2017 | Johnson et al. |
| 9,839,821 B2 | 12/2017 | DeShiell et al. |
| 9,861,867 B2 | 1/2018 | Parsons et al. |
| 9,895,581 B2 | 2/2018 | Onuki et al. |
| 9,937,388 B2 | 4/2018 | Cardani et al. |
| 9,981,160 B2 | 5/2018 | Parsons et al. |
| 9,993,704 B2 | 6/2018 | Hebreo et al. |
| 10,065,082 B2 | 9/2018 | James et al. |
| 10,150,020 B2 | 12/2018 | Cole et al. |
| 10,213,659 B2 | 2/2019 | Parsons et al. |
| 10,328,319 B2 | 6/2019 | Nakamura |
| 10,376,754 B2 | 8/2019 | Parsons et al. |
| 10,413,787 B2 | 9/2019 | Parsons et al. |
| 10,583,336 B2 | 3/2020 | Parsons et al. |
| 10,722,765 B2 | 7/2020 | Schweigert et al. |
| 10,905,925 B2 | 2/2021 | Morales et al. |
| 10,960,274 B2 | 3/2021 | Parsons et al. |
| 10,967,231 B2 | 4/2021 | Parsons et al. |
| 11,058,931 B2 | 7/2021 | Clarke et al. |
| 11,110,328 B2 | 9/2021 | Schweigert et al. |
| 11,117,028 B2 | 9/2021 | Parsons et al. |
| 11,266,888 B2 | 3/2022 | Kroloff et al. |
| 11,400,348 B2 | 8/2022 | Lee et al. |
| 11,484,756 B2 | 11/2022 | Parsons et al. |
| 11,617,925 B2 | 4/2023 | Parsons et al. |
| 11,654,338 B2 | 5/2023 | Parsons et al. |
| 11,679,309 B2 | 6/2023 | Onuki et al. |
| 11,806,589 B2 | 11/2023 | Nicolette et al. |
| 11,839,799 B2 | 12/2023 | Kroloff et al. |
| 2002/0019265 A1 | 2/2002 | Allen |
| 2002/0098909 A1 | 7/2002 | Cho |
| 2003/0027662 A1 | 2/2003 | Werner et al. |
| 2003/0148818 A1 | 8/2003 | Myrhum et al. |
| 2003/0220156 A1 | 11/2003 | Solheim |
| 2004/0009829 A1 | 1/2004 | Kapilow |
| 2004/0087388 A1 | 5/2004 | Beach et al. |
| 2004/0192468 A1 | 9/2004 | Onoda et al. |
| 2004/0266550 A1 | 12/2004 | Gilbert et al. |
| 2005/0096154 A1 | 5/2005 | Chen |
| 2005/0250596 A1 | 11/2005 | Chuang |
| 2006/0052181 A1 | 3/2006 | Serrano et al. |
| 2006/0100031 A1 | 5/2006 | Lan |
| 2006/0148589 A1 | 7/2006 | Liou |
| 2006/0172817 A1 | 8/2006 | Dewanjee |
| 2006/0229140 A1 | 10/2006 | Kubica et al. |
| 2006/0229141 A1 | 10/2006 | Galloway |
| 2007/0129161 A1 | 6/2007 | Matsunaga et al. |
| 2008/0004129 A1 | 1/2008 | Lin et al. |
| 2008/0004131 A1 | 1/2008 | Lin et al. |
| 2008/0004133 A1 | 1/2008 | Schweigert |
| 2008/0022502 A1 | 1/2008 | Tseng |
| 2008/0234066 A1 | 9/2008 | Jones et al. |
| 2008/0305888 A1 | 12/2008 | Tseng |
| 2010/0144461 A1 | 6/2010 | Ban |
| 2010/0331102 A1 | 12/2010 | Golden et al. |
| 2012/0064994 A1 | 3/2012 | Wada et al. |
| 2014/0248977 A1 | 9/2014 | Morin et al. |
| 2015/0111664 A1 | 4/2015 | Myrhum |
| 2015/0126305 A1 | 5/2015 | Stokke et al. |
| 2015/0290503 A1 | 10/2015 | Su |
| 2016/0038799 A1 | 2/2016 | Cruz et al. |
| 2018/0296887 A1 | 10/2018 | Motokawa |
| 2021/0016137 A1 | 1/2021 | Cleghorn et al. |
| 2022/0072393 A1 | 3/2022 | Parsons et al. |

FOREIGN PATENT DOCUMENTS

| | | |
|---|---|---|
| CN | 203790537 U | 8/2014 |
| DE | 29715997 U1 | 2/1998 |
| GB | 2249031 A | 4/1992 |
| JP | S62200359 A | 9/1987 |
| JP | H0241003 A | 2/1990 |
| JP | H10277187 A | 10/1998 |
| JP | H119742 A | 1/1999 |
| JP | 2002143356 A | 5/2002 |
| JP | 2002535056 A | 10/2002 |
| JP | 2005287679 A | 10/2005 |
| JP | 2006087783 A | 4/2006 |
| JP | 2006223331 A | 8/2006 |
| JP | 2007044445 A | 2/2007 |
| JP | 2007136068 A | 6/2007 |
| JP | 2008161597 A | 7/2008 |
| JP | 2008173314 A | 7/2008 |
| JP | 3158662 U | 4/2010 |
| JP | 2013188400 A | 9/2013 |

* cited by examiner

GOLF CLUB HEADS AND METHODS TO MANUFACTURE GOLF CLUB HEADS

CROSS REFERENCE

This application is a continuation-in-part of U.S. application Ser. No. 18/201,350, filed May 24, 2023, which is a continuation of application Ser. No. 17/198,906, filed Mar. 11, 2021, now U.S. Pat. No. 11,684,831, which is a continuation of application Ser. No. 16/813,453, filed Mar. 9, 2020, now U.S. Pat. No. 10,967,231, which claims the benefit of U.S. Provisional Application No. 62/816,418, filed Mar. 11, 2019 and U.S. Provisional Application No. 62/957,757, filed Jan. 6, 2020.

U.S. patent application Ser. No. 18/201,350, filed May 24, 2023 is a continuation-in-part of application Ser. No. 17/400,516, filed Aug. 12, 2021, now U.S. Pat. No. 11,779,819, which is a continuation of application Ser. No. 16/930,716, filed Jul. 16, 2020, now U.S. Pat. No. 11,110,328, which is a continuation of application Ser. No. 16/422,661, filed May 24, 2019, now U.S. Pat. No. 10,722,765, which claims the benefit of U.S. Provisional Application No. 62/850,292, filed May 20, 2019.

This application is a continuation-in-part of application Ser. No. 18/206,474, filed Jun. 6, 2023, which is a continuation of application Ser. No. 17/198,770, filed Mar. 11, 2021, now U.S. Pat. No. 11,707,651, which is a continuation of application Ser. No. 16/807,591, filed Mar. 3, 2020, now U.S. Pat. No. 10,960,274, which claims the benefit of U.S. Provisional Application No. 62/837,592, filed Apr. 23, 2019, U.S. Provisional Application No. 62/873,773, filed Jul. 12, 2019, and U.S. Provisional Application No. 62/897,015, filed Sep. 6, 2019.

This application is a continuation-in-part of U.S. application Ser. No. 18/385,960, filed Nov. 1, 2023, which is a continuation of U.S. application Ser. No. 18/115,100, filed Feb. 28, 2023, now U.S. Pat. No. 11,839,799, which claims the benefit of U.S. Provisional Application No. 63/316,154, filed Mar. 3, 2022.

U.S. application Ser. No. 18/115,100, filed Feb. 28, 2023, is a continuation-in-part of U.S. application Ser. No. 17/841,893, filed Jun. 16, 2022, now U.S. Pat. No. 11,806,590, which is a continuation of U.S. application Ser. No. 17/685,546, filed Mar. 3, 2022, now U.S. Pat. No. 11,400,352, which claims the benefit of U.S. Provisional Application No. 63/276,981, filed Nov. 8, 2021.

U.S. application Ser. No. 18/115,100, filed Feb. 28, 2023, is a continuation-in-part of application Ser. No. 17/528,436, filed Nov. 17, 2021, now abandoned, which claims the benefit of U.S. Provisional Application No. 63/117,182, filed Nov. 23, 2020.

The disclosures of the above-referenced applications are incorporated by reference herein in their entirety.

COPYRIGHT AUTHORIZATION

The present disclosure may be subject to copyright protection. The copyright owner has no objection to the facsimile reproduction by anyone of the present disclosure and its related documents, as they appear in the Patent and Trademark Office patent files or records, but otherwise reserves all applicable copyrights.

FIELD

The present disclosure generally relates to sports equipment, and more particularly, to golf club heads and methods to manufacture golf club heads.

BACKGROUND

In golf, various factors may affect the distance and direction that a golf ball may travel. In particular, the center of gravity (CG), the moment of inertia (MOI), and the coefficient of restitution (COR) of a golf club head may affect the launch angle, the spin rate, and the direction of the golf ball at impact. While composite materials have been used to move the CG of a golf club head, durability may be an issue, particularly in areas subject to impact forces such as the club face. Accordingly, there is a need for a golf club head having composite material at the club face that is both durable and lightweight. The present disclosure addresses this need and others.

Figure 1:
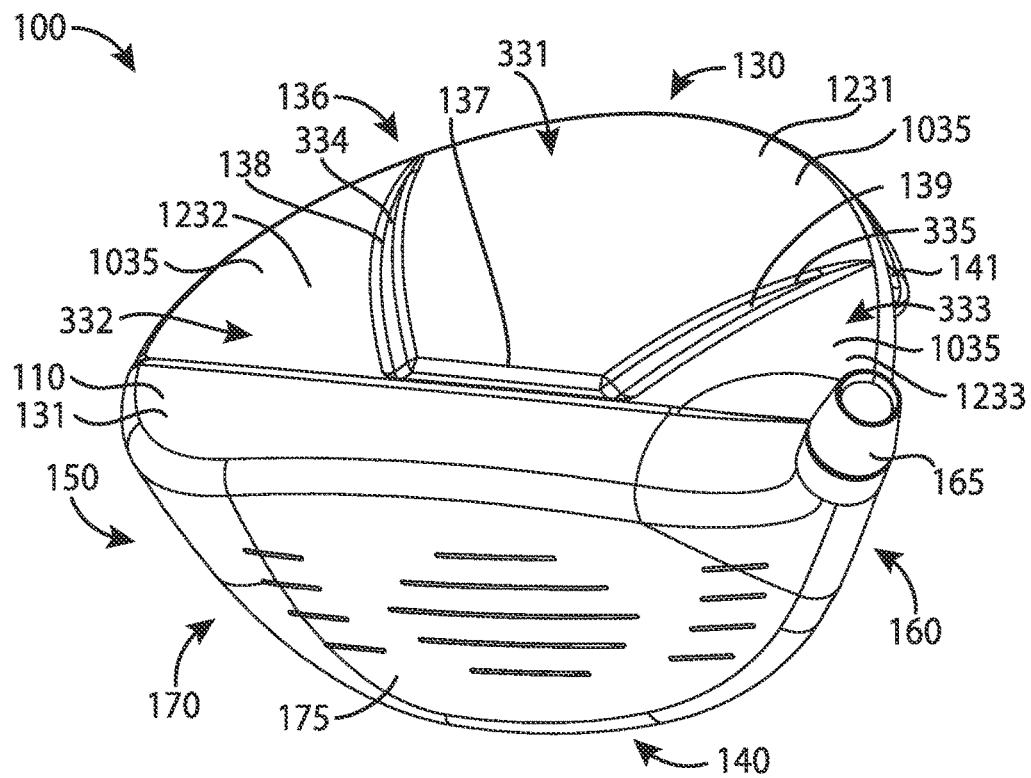
FIG. 1 depicts a top perspective view of an example golf club head according to an embodiment of the apparatus, methods, and articles of manufacture described herein.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure.

DESCRIPTION

In general, golf club heads and methods to manufacture golf club heads are described herein. The apparatus, methods, and articles of manufacture described herein are not limited in this regard. In the example of FIGS. 1-14, a golf club head 100 may include a body portion 110 with a top portion 130, a crown portion 135, a bottom portion 140, a toe portion 150, a heel portion 160, a front portion 170, and a rear portion 180. The bottom portion 140 may include a skirt portion 190 defined as a side portion of the golf club head 100 between the top portion 130 and the bottom portion 140 excluding the front portion 170 and extending across a periphery of the golf club head 100 from the toe portion 150, around the rear portion 180, and to the heel portion 160. Alternatively, the golf club head 100 may not include the skirt portion 190. The front portion 170 may include a face portion 175 to engage a golf ball (e.g., one generally shown as 1501 in FIG. 15). The face portion 175 may be integral to the body portion 110 or may be a separate face portion that is coupled (e.g., welded) to the front portion 170 to enclose an opening in the front portion 170. The body portion 110 may also include a hosel portion 165 configured to receive a shaft portion (similar to the example shaft portion 6512 shown in FIG. 65). The hosel portion 165 may be similar in many respects to any of the hosel portions described herein. The hosel portion 165 may include an interchangeable hosel sleeve. Alternatively, the body portion 110 may include a bore instead of the hosel portion 165. The body portion 110 may be made partially or entirely of an aluminum-based material, a magnesium-type material, a steel-based material, a titanium-based material, any combination thereof, or any other suitable material. In another example the body portion 110 may be made partially or entirely of a non-metal material such as a ceramic material, a composite material, any combination thereof, or any other suitable material. The apparatus, methods, and articles of manufacture described herein are not limited in this regard.

The golf club head 100 may have a club head volume greater than or equal to 300 cubic centimeters (cm$^3$ or cc). In one example, the golf club head 100 may be about 460 cc. Alternatively, the golf club head 100 may have a club head volume less than or equal to 300 cc. In particular, the golf club head 100 may have a club head volume between 100 cc and 200 cc. The club head volume of the golf club head 100 may be determined by using the weighted water displacement method (i.e., Archimedes Principle). For example, procedures defined by golf standard organizations and/or governing bodies such as the United States Golf Association (USGA) and/or the Royal and Ancient Golf Club of St. Andrews (R&A) may be used for measuring the club head volume of the golf club head 100. Although FIG. 1 may depict a particular type of club head (e.g., a driver-type club head), the apparatus, methods, and articles of manufacture described herein may be applicable to other types of club head (e.g., a fairway wood-type club head, a hybrid-type club head, an iron-type club head, a putter-type club head, etc.). The apparatus, methods, and articles of manufacture described herein are not limited in this regard.

Figure 9:
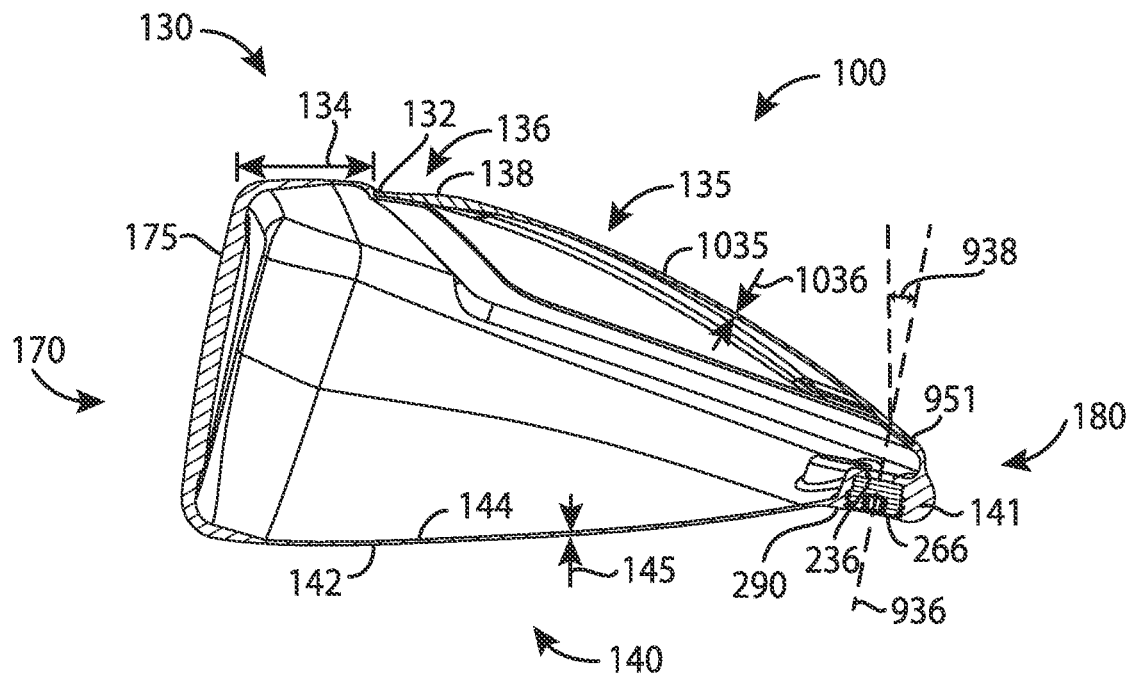
FIG. 9 depicts a cross-sectional view of the example golf club head of FIG. 1 taken at section line 9-9 of FIG. 3.
Figure 10:
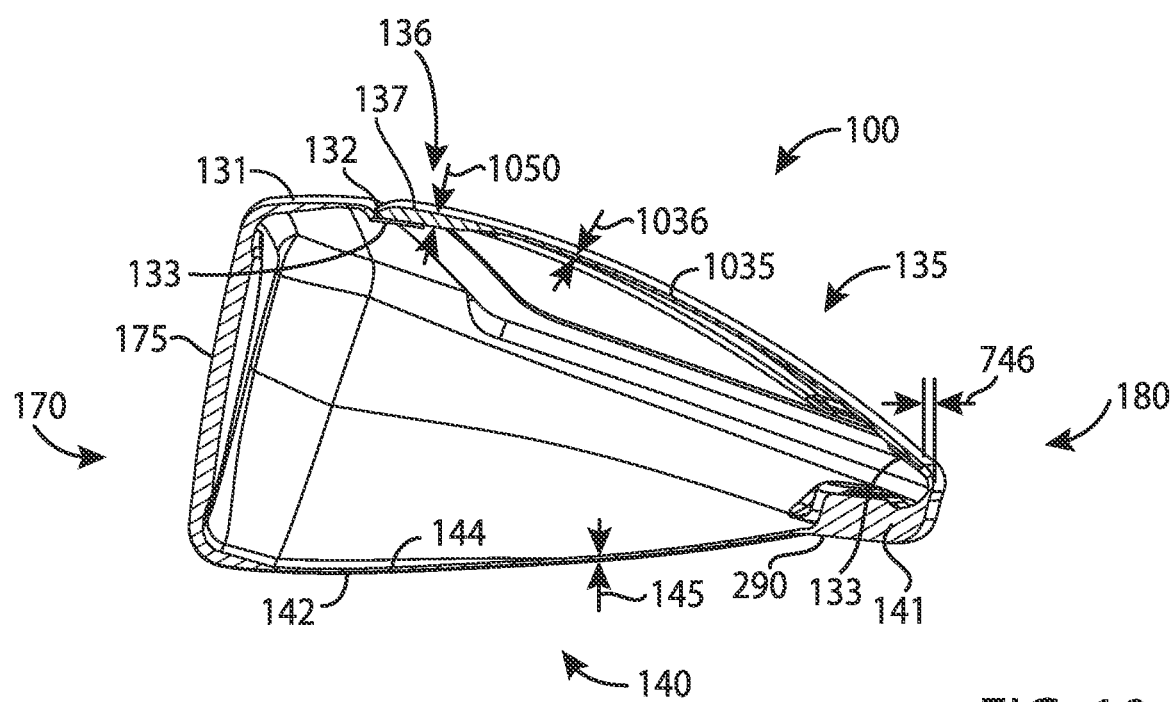
FIG. 10 depicts a cross-sectional view of the example golf club head of FIG. 1 taken at section line 10-10 of FIG. 3.

The top portion 130 may include a forward portion 131 extending a distance 134 between the front portion 170 and the crown portion 135, as shown in FIG. 9. In one example, the forward portion 131 may extend a distance 134 of at least 12 mm in a front-to-rear direction. In another example, the forward portion 131 may extend a distance 134 of at least 16 mm in a front-to-rear direction. In yet another example, the forward portion 131 may extend a distance 134 of at least 20 mm in a front-to-rear direction. In still another example, the forward portion 131 may extend a distance 134 of between and including 12 mm and 20 mm in a front-to-rear direction. While the above examples may describe particular distances, the apparatus, methods, and articles of manufacture described herein may include a forward portion extending a distance less than 12 mm in a front-to-rear direction. The forward portion 131 may enhance structural integrity of the golf club head 100 and resist rearward deflection of the front portion 170 during impact with a golf ball. The forward portion 131 may transfer an impact force to the crown portion 135 during an impact with a golf ball. The forward portion 131 may distribute an impact force along a surface of the crown portion that abuts a junction 132 formed between the crown portion 135 and the forward portion 131 of the top portion 130. The apparatus, methods, and articles of manufacture described herein are not limited in this regard.

Figure 13:
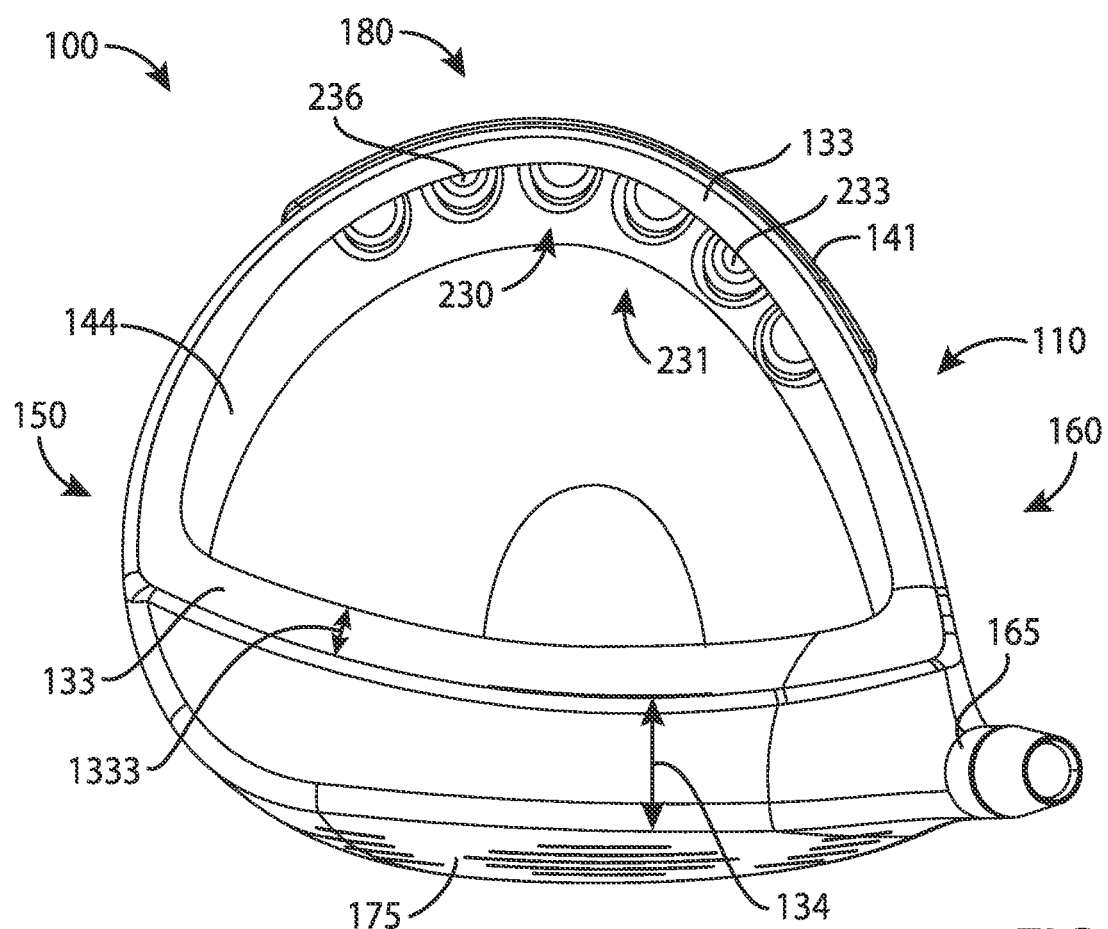
FIG. 13 depicts a top view of the example golf club head of FIG. 1 excluding the crown portion.
Figure 14:
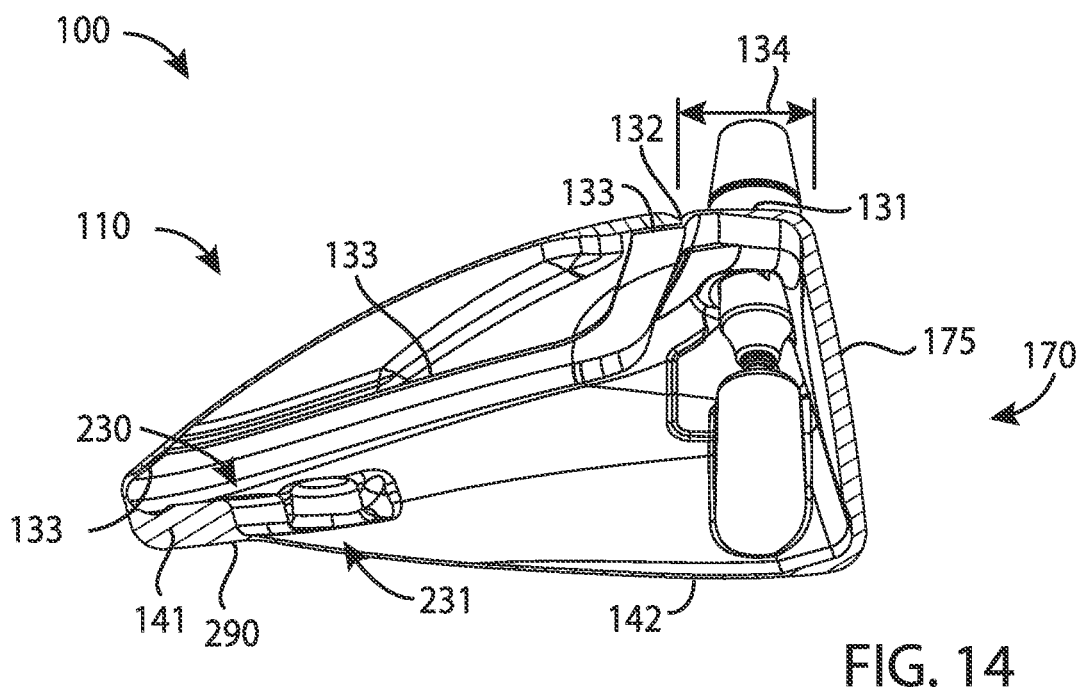
FIG. 14 depicts a cross-sectional view of the example golf club head of FIG. 1 taken at section line 14-14 of FIG. 3.

The crown portion 135 may be a separate piece that may be attached to the top portion 130. The crown portion 135 may enclose an opening in the top portion 130. As illustrated in FIG. 13, for example, the top portion 130 of the golf club head 100 may include the opening prior to installation of the crown portion 135. The crown portion 135 may be constructed from one or more materials, and those materials may be the same or different from the material of the body portion 110. In one example, the crown portion 135 may be at least partially constructed from a composite material such as a fiber-based composite material. The crown portion 135 may be attached to a shoulder portion 133 of the top portion 130. The shoulder portion 133 may extend along all or a portion of the opening in the top portion 130. The shoulder portion 133 may support the crown portion 135. In one example, the shoulder portion 133 may extend a distance 1333 of at least 2 mm inward toward the opening in the top portion 130. In another example, the shoulder portion 133 may extend a distance 1333 of at least 6 mm. In yet another example, the shoulder portion 133 may extend a distance 1333 of at least 8 mm. In still another example, the shoulder portion 133 may extend a distance 1333 of between and including 2 mm and 8 mm. While the above examples may describe particular distances, the apparatus, methods, and articles of manufacture described herein may include a shoulder portion 133 that extends a distance 1333 less than 2 mm inward toward the opening in the top portion 130. The shoulder portion 133 may be a continuous portion encircling the opening in the top portion 130. Alternately, the shoulder portion 133 may include one or more discrete shoulder portions arranged to support the crown portion 135. In another example, the shoulder portion 133 may include a plurality of tabs arranged to support the crown portion 135. In still another example, the shoulder portion 133 may be omitted, and the crown portion 135 may be adhered to an outer surface of the top portion 130 or to an inner surface of the top portion 130. In yet another example, the shoulder portion 133 may be omitted, and the crown portion 135 may include a protrusion extending from a bottom surface of the crown portion 135 that provides an interference fit with a perimeter edge of the opening. The apparatus, methods, and articles of manufacture described herein are not limited in this regard.

The crown portion 135 may include one or more thin portions, one generally shown as 1035. The thin portion 1035 may reduce the weight of the crown portion 135, which may lower the CG of the golf club head 100. In one example, the thin portion 1035 may have a thickness 1036 of less than 1.0 mm. In another example, the thin portion 1035 may have a thickness 1036 of less than 0.75 mm. In yet another example, the thin portion 1035 may have a thickness 1036 of less than 0.65 mm. While the above examples may describe particular thicknesses, the apparatus, methods, and articles of manufacture described herein may include one or more thin portions 1035 having a thickness greater than or equal to 1.0 mm. One or more thin portions 1035 may extend from one or more relatively thicker crown stiffening regions, one generally shown as 136. In one example, the thin portion 1035 may form at least 50% of an exterior surface area of the crown portion 135. In another example, the thin portion 1035 may form at least 75% of an exterior surface area of the crown portion 135. In yet another example, the thin portion 1035 may form at least 85% of the exterior surface area of the crown portion 135. In still yet another example, the thin portions 1035 may form at least 95% of the exterior surface area of the crown portion 135. While the above examples may describe particular percentages of the crown portion 135, the apparatus, methods, and articles of manufacture may include one or more thin portions 1035 forming less than 75% of the exterior surface area of the crown portion

135. The apparatus, methods, and articles of manufacture described herein are not limited in this regard.

The crown stiffening portion 136 may enhance stiffness of the crown portion 135. The crown stiffening portion 136 may compensate for the presence of one or more relatively less stiff regions elsewhere in the crown portion 135. The crown stiffening portion 136 may enhance overall stiffness of the golf club head 100. The crown stiffening portion 136 may limit deflection of the face portion 175 and/or forward portion 131 of the top portion 130 toward the rear portion 180 in response to the face portion 175 impacting a golf ball. The crown stiffening portion 136 may limit physical compression of the crown portion 135 in a front-to-rear direction in response to the face portion 175 impacting a golf ball, which may reduce risk of cracking or delaminating the crown portion 135 in examples where the crown portion 135 is constructed of two or more layers of composite material. The crown stiffening portion 136 may be part of a raised portion. The crown stiffening portion 136 may be part of a contoured portion. The crown stiffening portion 136 may serve as a visual alignment aid for a golfer aligning a golf shot. The crown stiffening portion 136 may improve acoustic response of the golf club head 100 in response to the face portion 175 impacting a golf ball. The crown stiffening portion 136 may have a thickness greater than a thin portion 1035. The crown stiffening portion 136 may have a thickness greater than an average thickness of the crown portion 135. The crown stiffening portion 136 may be integral to the crown portion 135. The crown stiffening portion 136 may be or one or more separate portions adhered or fastened to an inner surface of the crown portion 135 to provide structural reinforcement. The crown stiffening portion 136 may be or one or more separate portions adhered or fastened to an outer surface of the crown portion 135 to provide structural reinforcement. The apparatus, methods, and articles of manufacture described herein are not limited in this regard.

As mentioned above, the crown portion 135 may include one or more crown stiffening portions, generally shown in one example as a first crown stiffening portion 137, a second crown stiffening portion 138, and a third crown stiffening portion 139 in FIG. 1. The first crown stiffening portion 137 may be located adjacent to the forward portion 131 of the top portion 130. The first crown stiffening portion 137 may extend along the junction 132 formed between the crown portion 135 and the forward portion 131 of the top portion 130. The first crown stiffening portion 137 may abut the junction 132. The first crown stiffening portion 137 may have a surface that matches a contour of the forward portion proximate the junction 132. The first crown stiffening portion 137 may have a thickness greater than an average thickness of the crown portion 135. In one example, the first crown stiffening portion 137 may have a thickness of greater than 2 mm. In another example, the first crown stiffening portion 137 may have a thickness of greater than or equal to 2.2 mm. In still another example, the first crown stiffening portion 137 may have a thickness of greater than or equal to 2.4 mm. While the above examples may describe particular thickness, the apparatus, methods, and articles of manufacture described herein may include the first crown stiffening portion 137 with a thickness of less than or equal to 2 mm. The first crown stiffening portion 137 may include two or more plies of fiber-based composite material 7614 (e.g., such as three, four, five, six, seven, eight, or nine plies of fiber-based composite material 7614). In one example, the first crown stiffening portion 137 may have a length of at least 1.25 cm in a heel-to-toe direction. In another example, the first crown stiffening portion 137 may have a length of at least 2 cm in a heel-to-toe direction. In yet another example, the first crown stiffening portion 137 may have a length of at least 3 cm in a heel-to-toe direction. In still yet another example, the first crown stiffening portion 137 may have a length of at least 4 cm in a heel-to-toe direction. In another example, the first crown stiffening portion 137 may have a length of between and including 4 and 4.5 cm in a heel-to-toe direction. While the above examples may describe particular lengths, the apparatus, methods, and articles of manufacture describe herein may include the first crown stiffening portion 137 having a length of less than 3 cm. The first crown stiffening portion 137 may reduce aerodynamic drag of the golf club head 100. The apparatus, methods, and articles of manufacture described herein are not limited in this regard.

The second crown stiffening portion 138 may extend from the first crown stiffening portion 137 toward the rear portion 180. The second crown stiffening portion 138 may extend from the first crown stiffening portion 137 toward the rear portion 180 and toward the toe portion 150. The second crown stiffening portion 138 may extend from a toe-side end of the first crown stiffening portion 137 to a rear perimeter of the crown portion 135. The second crown stiffening portion 138 may extend from the first crown stiffening portion 137 toward a toe-side portion 281 of a protruding portion 141 on the bottom portion 140. The second crown stiffening portion 138 may extend from the first crown stiffening portion 137 toward a toe-side perimeter portion 283 of a protruding portion 141 on the bottom portion 140. The second crown stiffening portion 138 may extend from the first crown stiffening portion 137 toward a weight port 237 on the bottom portion 140. The second crown stiffening portion 138 may extend from the first crown stiffening portion 137 toward a weight port 237 on the bottom portion 140, where the weight port is closer to the toe portion 150 than other weight ports on the bottom portion. The second crown stiffening portion 138 may taper in a front-to-rear direction.

The second crown stiffening portion 138 may serve as a support structure between the forward portion 131 and the rear portion 180. The second crown stiffening portion 138 may oppose rearward deflection of the forward portion 131 in response to the face portion 175 impacting a golf ball. The second crown stiffening portion 138 may have a thickness greater than an average thickness of the crown portion 135. The second crown stiffening portion 138 may have a thickness of greater than 2 mm. The second crown stiffening portion 138 may have a thickness of greater than or equal to 2.2 mm. While the above examples may describe particular thicknesses, the apparatus, methods, and articles of manufacture described herein may include the second crown stiffening portion 138 with a thickness of less than or equal to 2 mm. The second crown stiffening portion 138 may include two or more plies of fiber-based composite material 1514 (e.g., such as three, four, five, six, seven, eight, or nine plies of fiber-based composite material 1514). In one example, the second crown stiffening portion 138 may have a length of at least 2 cm. In another example, the second crown stiffening portion 138 may have a length of at least 4 cm. While the above examples may describe particular lengths, the apparatus, methods, and articles of manufacture describe herein may include a second crown stiffening portion 138 having a length less than 2 cm. The second crown stiffening portion 138 may reduce aerodynamic drag of the golf club head. The apparatus, methods, and articles of manufacture described herein are not limited in this regard.

The third crown stiffening portion 139 may extend from the first crown stiffening portion 137 toward the rear portion 180. The third crown stiffening portion 139 may extend from the first crown stiffening portion 137 toward the rear portion 180 and toward the heel portion 160. The third crown stiffening portion 139 may extend from a heel-side end of the first crown stiffening portion 137 to a rear perimeter of the crown portion 135. The third crown stiffening portion 139 may extend from the first crown stiffening portion 137 toward a heel-side portion 282 of the protruding portion 141 on the bottom portion 140. The third crown stiffening portion 139 may extend from the first crown stiffening portion 137 toward a heel-side perimeter portion 284 of the protruding portion 141 on the bottom portion 140. The third crown stiffening portion 139 may extend from the first crown stiffening portion 137 toward a weight port 232 on the bottom portion 140. The third crown stiffening portion 139 may extend from the first crown stiffening portion 137 toward a weight port 232 on the bottom portion 140, where the weight port 232 is closer to the heel portion 160 than other weight ports on the bottom portion. The third crown stiffening portion 139 may taper in a front-to-rear direction.

The third crown stiffening portion 139 may serve as a support structure between the forward portion 131 and the rear portion 180. The third crown stiffening portion 139 may oppose rearward deflection of the forward portion 131 in response to the face portion 175 impacting a golf ball. The third crown stiffening portion 139 may have a thickness greater than an average thickness of the crown portion 135. The third crown stiffening portion 139 may have a thickness of greater than 2 mm. The third crown stiffening portion 139 may have a thickness of greater than or equal to 2.2 mm. While the above examples may describe particular thicknesses, the apparatus, methods, and articles of manufacture described herein may include the third crown stiffening portion 139 with a thickness of less than or equal to 2 mm. The third crown stiffening portion 139 may include two or more plies of fiber-based composite material 1514 (e.g., such as three, four, five, six, seven, eight, or nine plies of fiber-based composite material 1514). The third crown stiffening portion 139 may have a length of at least 2 cm. The third crown stiffening portion 139 may have a length of at least 4 cm. The third crown stiffening portion 139 may reduce aerodynamic drag of the golf club head. While the above example may describe a particular number of crown stiffening portions, the apparatus, methods, and articles of manufacture described herein may include more or fewer crown stiffening portions. The apparatus, methods, and articles of manufacture described herein are not limited in this regard.

The crown portion 135 may include a central crown portion 331, a toe-side crown portion 332, and a heel-side crown portion 333. The central crown portion 331 may be a raised central crown portion. The raised central crown portion 331 may be located between the heel-side crown portion 333 and the toe-side crown portion 332. The raised central crown portion 331 may have a maximum height greater than a maximum height of the toe-side crown portion 332. The raised central crown portion 331 may have a maximum height greater than a maximum height of the heel-side crown portion 333. The raised central crown portion 331 may serve as a visual alignment aid. The raised central crown portion 331 may improve aerodynamic performance of the golf club head 100. The raised central crown portion 331 may stiffen the crown portion 135 and reduce deflection (e.g. bulging) of the crown portion 135 in response to the face portion 175 impacting a golf ball. Reducing bulging of the crown portion 135 may be desirable to reduce shear stress on a joint (e.g. an adhesive bond) between the crown portion 135 and the top portion 130 of the golf club head. The apparatus, methods, and articles of manufacture described herein are not limited in this regard.

The central crown portion 331 may include a thin portion 1035. The toe-side crown portion 332 may include a thin portion 1035. The heel-side crown portion 333 may include a thin portion 1035. Thin portions 1035 may be desirable to reduce overall mass of the crown portion 135, which may lower the CG of the golf club head 100. The apparatus, methods, and articles of manufacture described herein are not limited in this regard.

The crown portion 135 may include a plurality of contoured surfaces. The plurality of contoured surfaces may reduce aerodynamic drag of the golf club head 100. The plurality of contoured surfaces may enhance structural integrity of the golf club head 100. An outer surface of the central crown portion 331 may be elevated above an outer surface of the toe-side crown portion 332. The outer surface of the central crown portion 331 may be elevated above an outer surface of the heel-side crown portion 333. The crown portion 135 may include a first contoured transition region 334 located between the central crown portion 331 and the toe-side crown portion 332. The crown portion 135 may include a second contoured transition region 335 located between the central crown portion 331 and the heel-side crown portion 333. The location of the first contoured transition region 334 may coincide with the location of the second crown stiffening portion 138. The location of the second contoured transition region 335 may coincide with the location of the third crown stiffening portion 139. Together, the central crown portion 331, toe-side crown portion 332, heel-side crown portion 333, first contoured transition region 334, and second contoured transition region 335 may form a multi-level crown portion 135. Together, the central crown portion 331, toe-side crown portion 332, heel-side crown portion 333, first contoured transition region 334, and second contoured transition region 335 may form a multi-thickness crown portion 135. Together, the central crown portion 331, toe-side crown portion 332, heel-side crown portion 333, first contoured transition region 334, and second contoured transition region 335 may form a multi-thickness and multi-level crown portion 135. The apparatus, methods, and articles of manufacture described herein are not limited in this regard.

Figure 3:
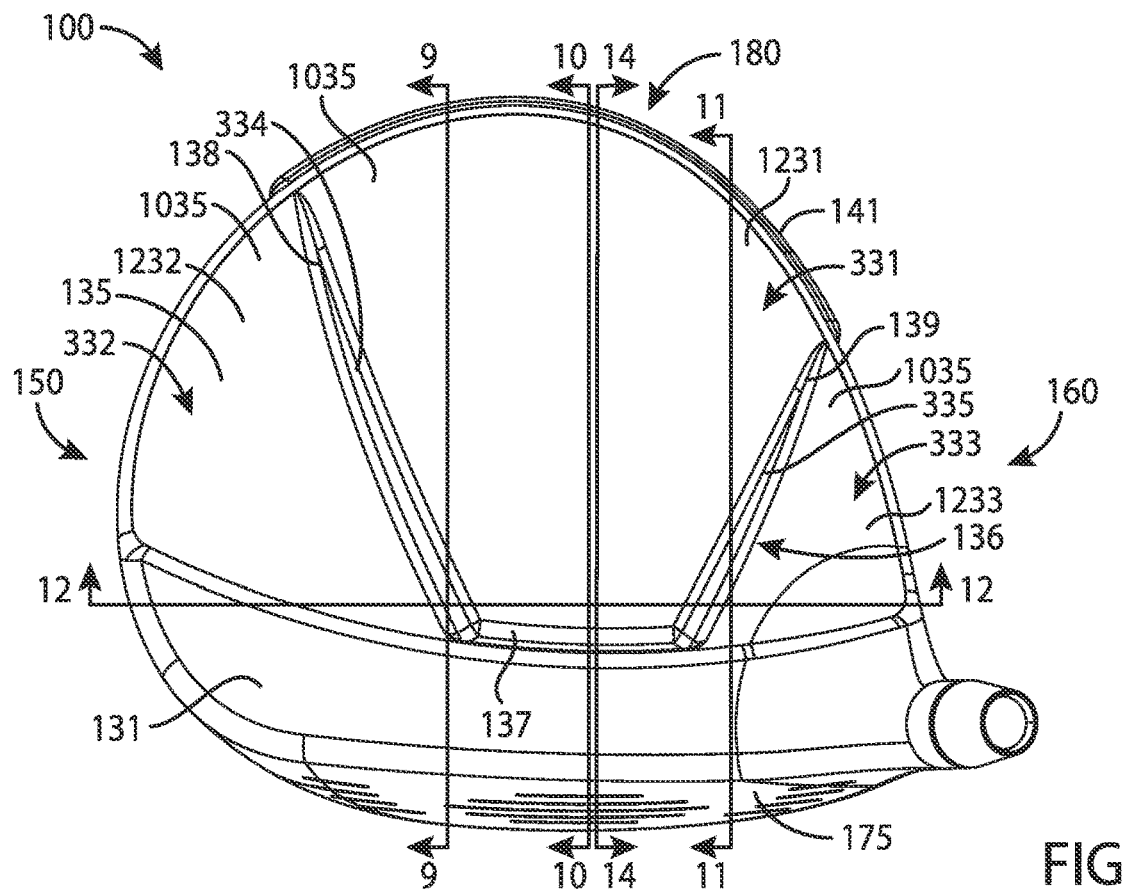
FIG. 3 depicts a top view of the example golf club head of FIG. 1.
Figure 4:
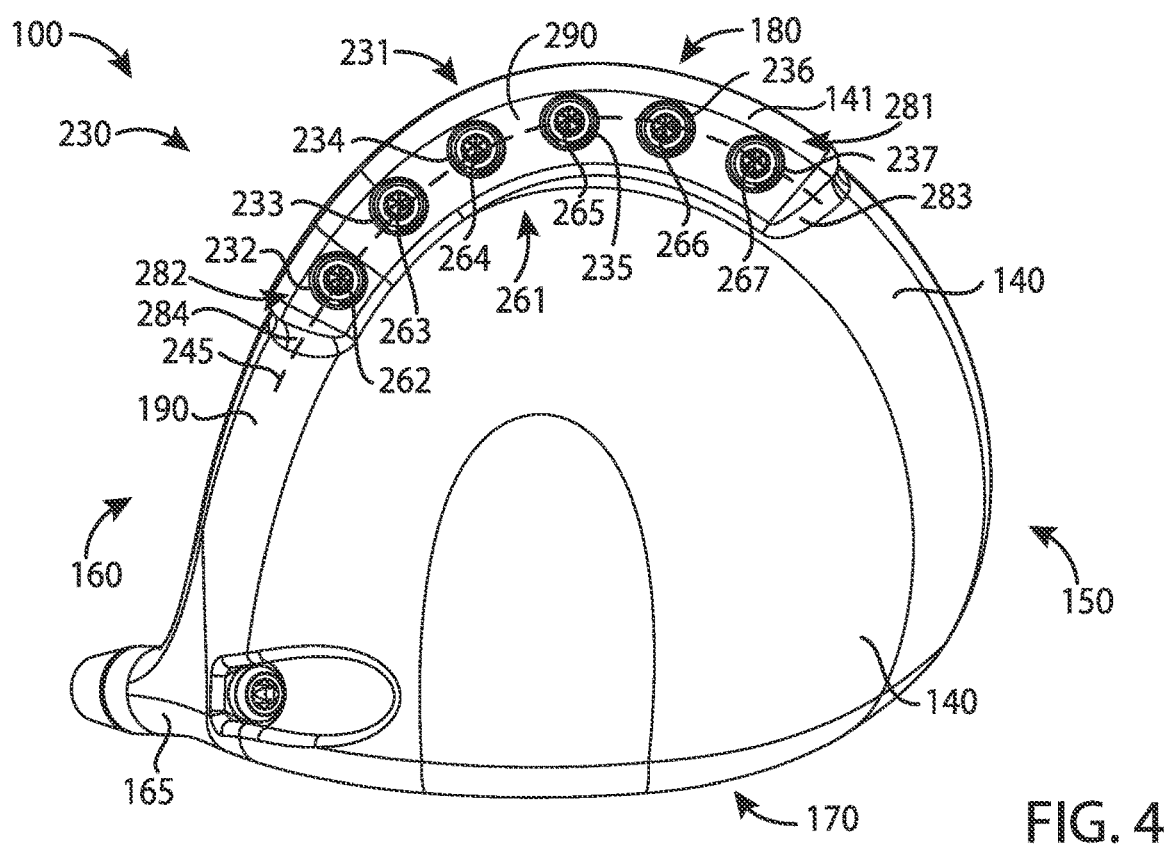
FIG. 4 depicts a bottom view of the example golf club head of FIG. 1.
Figure 5:
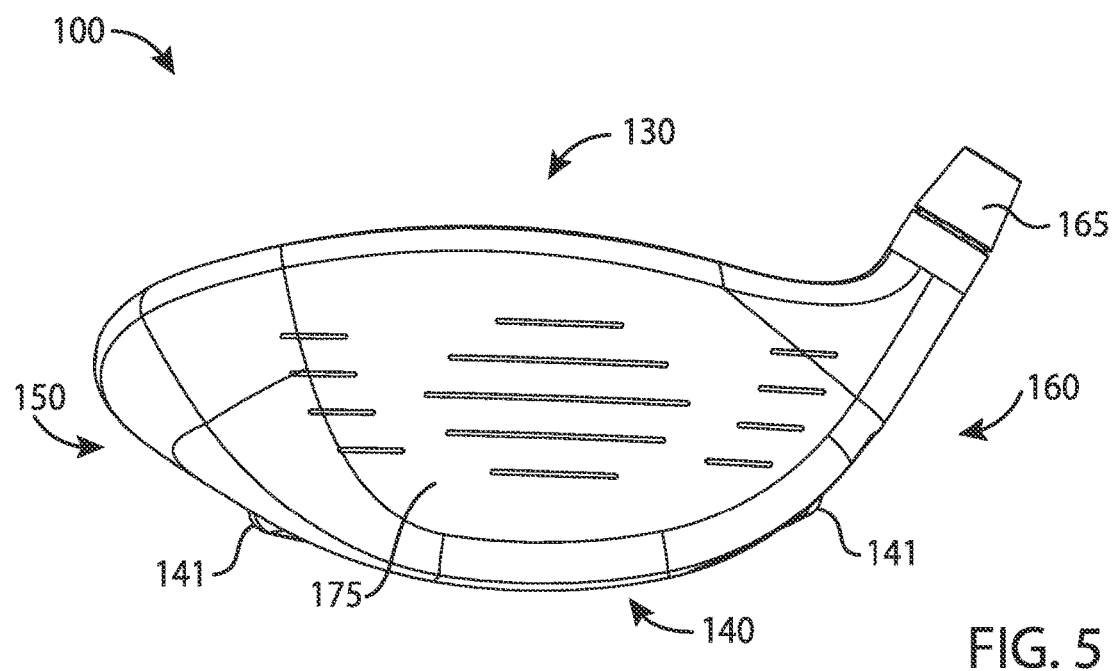
FIG. 5 depicts a front view of the example golf club head of FIG. 1.
Figure 6:
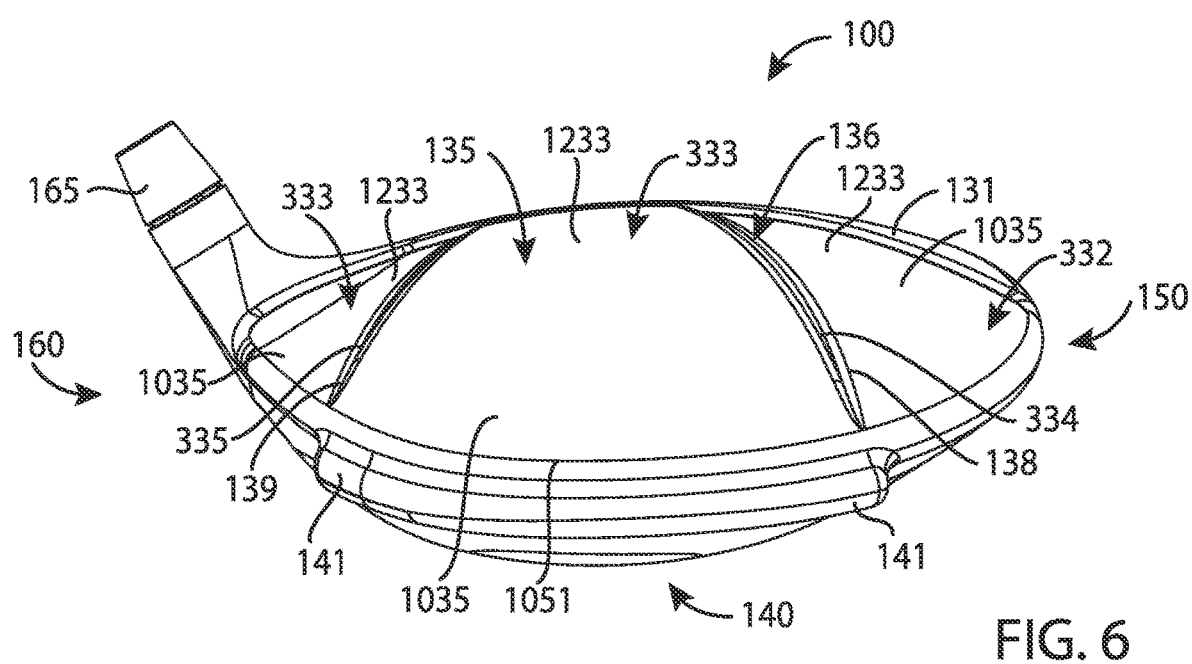
FIG. 6 depicts a rear view of the example golf club head of FIG. 1.
Figure 12:
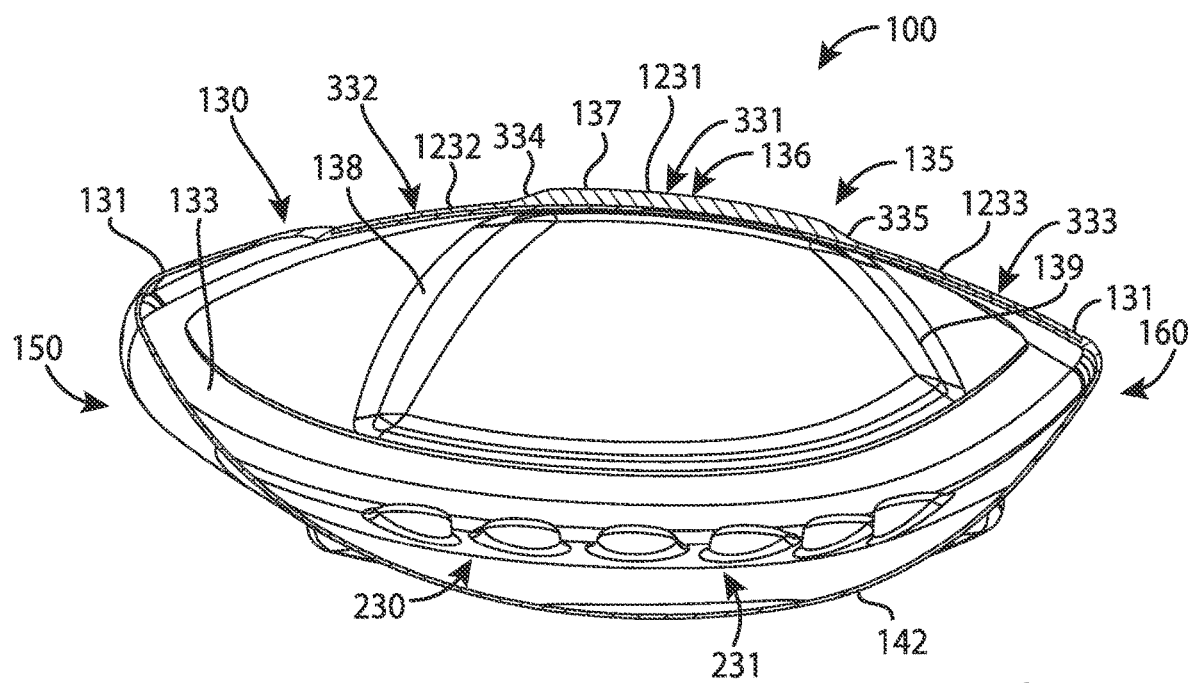
FIG. 12 depicts a cross-sectional view of the example golf club head of FIG. 1 taken at section line 12-12 of FIG. 3.

FIG. 12 depicts a cross-sectional view of the example golf club head of FIG. 1 taken at section line 12-12 of FIG. 3. The outer surface 1231 of the central crown portion 331 may be elevated above an outer surface of the toe-side crown portion 332. In one example, the outer surface 1231 of the central crown portion 331 may be elevated above an outer surface of the toe-side crown portion 332 by a height of greater than or equal to 0.5 mm. In another example, the outer surface 1231 of the central crown portion 331 may be elevated above an outer surface of the toe-side crown portion 332 by a height of greater than or equal to 1.0 mm. In yet another example, the outer surface 1231 of the central crown portion 331 may be elevated above an outer surface of the toe-side crown portion 332 by a height of greater than or equal to 2.0 mm. The outer surface 1231 of the central crown portion 331 may be elevated above an outer surface 1233 of the heel-side crown portion 333. In one example, the outer surface 1231 of the central crown portion 331 may be elevated above an outer surface 1233 of the heel-side crown portion 333 by a height of greater than or equal to 0.5 mm. In another example, the outer surface 1231 of the central crown portion 331 may be elevated above an outer surface 1233 of the heel-side crown portion 333 by a height of greater than or equal to 1.0 mm. In yet another example, the outer surface 1231 of the central crown portion 331 may be elevated above an outer surface 1233 of the heel-side crown portion 333 by a height of greater than or equal to 2.0 mm. While the above examples may describe particular heights, the apparatus, methods, and articles of manufacture described herein may include outer surfaces with a difference in height of less than 0.5 mm. The apparatus, methods, and articles of manufacture described herein are not limited in this regard.

Figure 11:
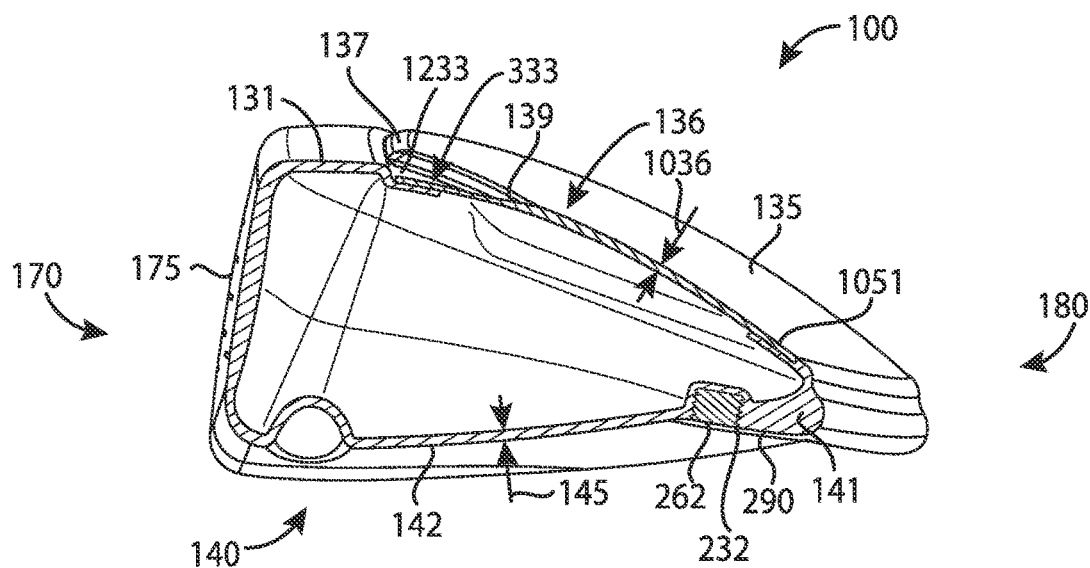
FIG. 11 depicts a cross-sectional view of the example golf club head of FIG. 1 taken at section line 11-11 of FIG. 3.

As shown in FIG. 11, the outer surface 1233 of the heel-side crown portion 333 may be recessed below the forward portion 131 proximate to the junction 132. Likewise, the outer surface 1232 of the toe-side crown portion 332 may be recessed below the forward portion 131 proximate the junction 132. In one example, the outer surface 1233 of the heel-side crown portion 333 may be recessed below the forward portion 131 proximate to the junction 132 by a distance of greater than or equal to 0.5 mm. In another example, the outer surface 1233 of the heel-side crown portion 333 may be recessed below the forward portion 131 proximate to the junction 132 by a distance of greater than or equal to 1.0 mm. In yet another example, the outer surface 1232 of the toe-side crown portion 332 may be recessed below the forward portion 131 proximate the junction 132 by a distance of greater than or equal to 0.5 mm. The outer surface 1232 of the toe-side crown portion 332 may be recessed below the forward portion 131 proximate the junction 132 by a distance of greater than or equal to 1.0 mm. While the above examples may describe particular distances, the apparatus, methods, and articles of manufacture described herein may include outer surfaces recessed by distances of less than 0.5 mm. The apparatus, methods, and articles of manufacture described herein are not limited in this regard.

Figure 15:
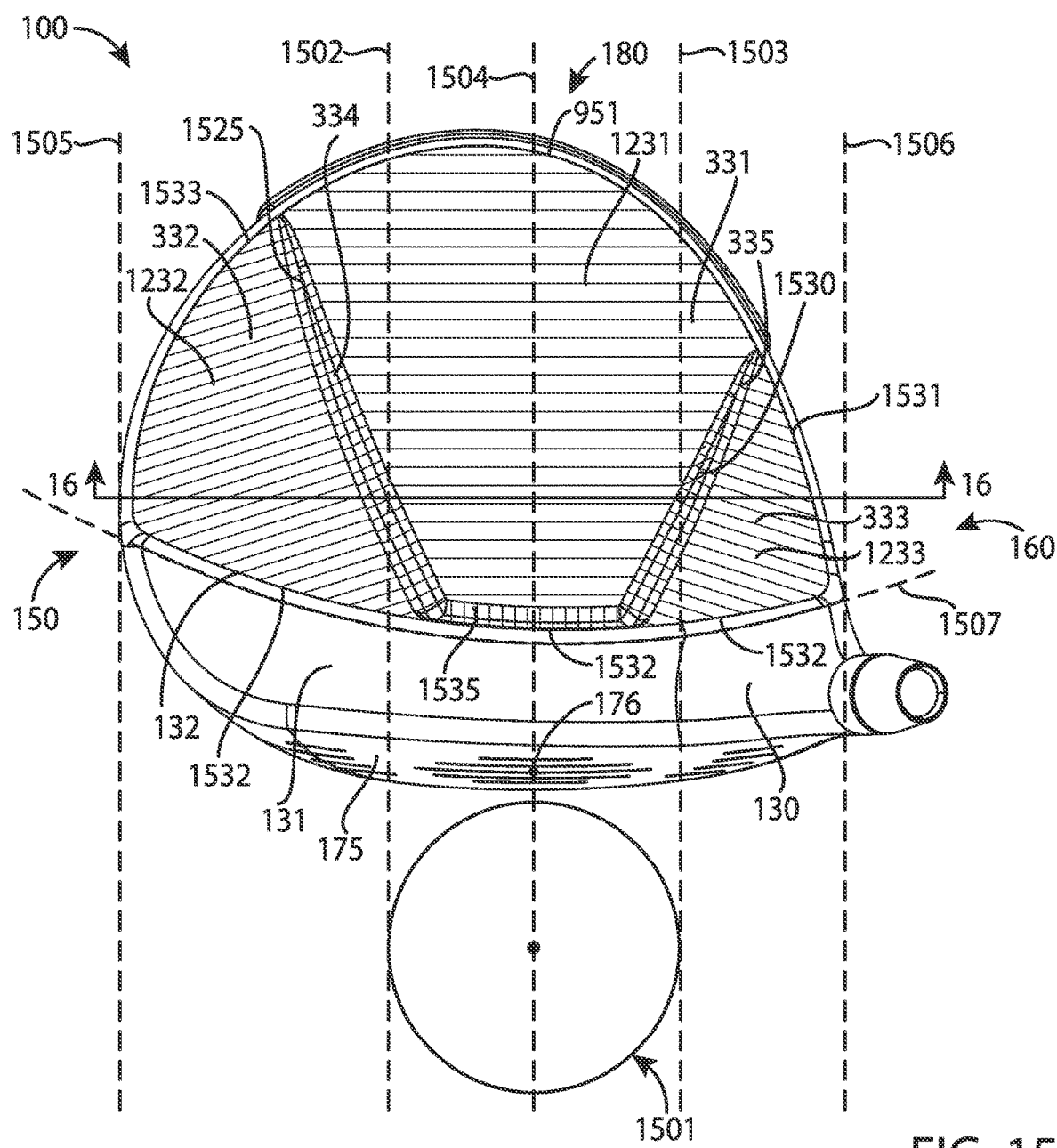
FIG. 15 depicts a top view of the example golf club head of FIG. 1 with a golf ball proximate to the face portion.

The central crown portion 331 may be bounded by the first contoured transition region 334, the second contoured transition region 335, rear perimeter 951 of the crown portion 135, and the front perimeter 1532 of the crown portion 135. The central crown portion 331 may be bounded by the first crown stiffening portion 137, the second crown stiffening portion 138, the third crown stiffening portion 139, and a rear perimeter 951 of the crown portion 135. A front portion of the central crown portion 331 may have a symmetrical shape relative to a central vertical plane (e.g., one generally shown as 1504) that intersects the geometric center 176 (e.g., at or proximate to a "sweet spot" of the golf club head 100) on the face portion 175 and is normal to a front vertical plane 715. A front portion of the central crown portion 331 may have a nonsymmetrical shape relative to the central vertical plane 1504 that intersects the geometric center 176 on the face portion 175 and is normal to the front vertical plane 715. In one example, the second crown stiffening portion 138 and third crown stiffening portion 139 may diverge in a front-to-rear direction, as shown in FIG. 15. The central crown portion 331 may have an irregular polygon-like shape (e.g., a quadrilateral-like shape). The distance between the second and third crown stiffening portions 138 and 139 at or proximate to the front portion 170 may be less than the distance between the second and third crown stiffening portions 138 and 139 at or proximate to the rear portion 180. In another example, the second crown stiffening portion 138 and third crown stiffening portion 139 may converge in a front-to-rear direction. A distance between the second and third crown stiffening portions 138 and 139 at or proximate to the front portion 170 may be greater than a distance between the second and third crown stiffening portions 138 and 139 at or proximate to the rear portion 180. In yet another example, the second crown stiffening portion 138 and third crown stiffening portion 139 may converge and then diverge in a front-to-rear direction (see, e.g., FIG. 40). In another example, the second crown stiffening portion 138 and third crown stiffening portion 139 may diverge and then converge in a front-to-rear direction (see, e.g., FIG. 41). In still another example, the second crown stiffening portion 138 and third crown stiffening portion 139 may be substantially parallel in a front-to-rear direction. The distance between the second crown stiffening portion 138 and third crown stiffening portion 139 at or proximate to the front portion 170 may be equal or substantially the same as the distance between the second and third crown stiffening portions 138 and 139 at or proximate to the rear portion 180. The apparatus, methods, and articles of manufacture described herein are not limited in this regard.

In one example, as shown in FIG. 1, the central crown portion 331 may be raised relative to the toe-side crown portion 332 and the heel-side crown portion 333. In another example, the central crown portion 331 may be depressed relative to the toe-side crown portion 332 and the heel-side crown portion 333. Variations in relative heights of the central crown portion 331, toe-side crown portion 332, and heel-side crown portion 333 may improve aerodynamic performance by reducing a drag coefficient associated with the golf club head 100. Variations in relative heights of the central crown portion 331, toe-side crown portion 332, and heel-side crown portion 333 may provide a visual alignment aid. Variations in relative heights of the central crown portion 331, toe-side crown portion 332, and heel-side crown portion 333, together with contoured transition regions with integral ribs, may enhance structural integrity of the crown portion 135. The apparatus, methods, and articles of manufacture described herein are not limited in this regard.

The total surface area of the crown portion 135 may include surface areas of the central crown portion 331, toe-side crown portion 332, heel-side crown portion 333, first contoured transition region 334, and second contoured transition region 335. In one example, the surface area of the central crown portion 331 may be at least 10% of the total surface area of the crown portion 135. In another example, the surface area of the central crown portion 331 may be at least 20% of the total surface area of the crown portion 135. In yet another example, the surface area of the 331 may be at least 30% of the total surface area of the crown portion 135. In still yet another example, the surface area of the central crown portion 331 may be at least 40% of the total surface area of the crown portion 135. In still yet another example, the surface area of the central crown portion 331 may be at least 50% of the surface area of the crown portion 135. In another example, the surface area of the central crown portion 331 may be at least 60% of the total surface area of the crown portion 135. In still yet another example, the surface area of the central crown portion 331 may be at least 70% of the total surface area of the crown portion 135. In still yet another example, the surface area of the central crown portion 331 may be at least 80% of the total surface area of the crown portion 135. In still yet another example, the surface area of the central crown portion 331 may be at least 90% of the total surface area of the crown portion 135. The apparatus, methods, and articles of manufacture described herein are not limited in this regard.

The toe-side crown portion 332 may be bounded by the first contoured transition region 334, a toe-side perimeter 1533 of the crown portion 135, and a front perimeter 1532 of the crown portion 135. In one example, the surface area of the toe-side crown portion 332 may be at least 5% of the total surface area of the crown portion 135. In another example, the surface area of the toe-side crown portion 332 may be at least 10% of the total surface area of the crown portion 135. In yet another example, the surface area of the toe-side crown portion 332 may be at least 15% of the total surface area of the crown portion 135. In still yet another example, the surface area of the toe-side crown portion 332 may be at least 20% of the surface area of the crown portion 135. In still yet another example, the surface area of the toe-side crown portion 332 may be at least 25% of the total surface area of the crown portion 135. In still yet another example, the surface area of the toe-side crown portion 332 may be at least 30% of the total surface area of the crown portion 135. In still yet another example, the surface area of the toe-side crown portion 332 may be at least 35% of the total surface area of the crown portion 135. In still yet another example, the surface area of the toe-side crown portion 332 may be at least 40% of the total surface area of the crown portion 135. The apparatus, methods, and articles of manufacture described herein are not limited in this regard.

The heel-side crown portion 333 may be bounded by the second contoured transition region 335, a heel-side perimeter 1531 of the crown portion 135, and a front perimeter 1532 of the crown portion 135. In one example, the surface area of the heel-side crown portion 333 may be at least 5% of the total surface area of the crown portion 135. In another example, the surface area of the heel-side crown portion 333 may be at least 10% of the total surface area of the crown portion 135. In yet another example, the surface area of the heel-side crown portion 333 may be at least 15% of the total surface area of the crown portion 135. In still yet another example, the surface area of the heel-side crown portion 333 may be at least 20% of the total surface area of the crown portion 135. In still yet another example, the surface area of the heel-side crown portion 333 may be at least 25% of the total surface area of the crown portion 135. In still yet another example, the surface area of the heel-side crown portion 333 may be at least 30% of the total surface area of the crown portion 135. The apparatus, methods, and articles of manufacture described herein are not limited in this regard.

In one example, the central crown portion 331 may have an outer surface area 1231 that is greater than or equal to 40% of a total outer surface area of the crown portion, the toe-side crown portion 332 may have an outer surface area 1232 that is less than or equal to 30% of the total outer surface area of the crown portion, and the heel-side crown portion 333 may have an outer surface area 1233 that is less than or equal to 15% of the total outer surface area of the crown portion. In another example, the central crown portion 331 may have an outer surface area 1231 that is greater than or equal to 50% of a total outer surface area of the crown portion, the toe-side crown portion 332 may have an outer surface area 1232 that is greater than or equal to 15% of the total outer surface area of the crown portion, and the heel-side crown portion 333 may have an outer surface area 1233 that is greater than or equal to 5% of the total outer surface area of the crown portion. In still another example, the central crown portion 331 may have an outer surface area 1231 that is greater than or equal to 40% of a total outer surface area of the crown portion, the toe-side crown portion 332 may have an outer surface area 1232 that is greater than or equal to 10% of the total outer surface area of the crown portion, and the heel-side crown portion 333 may have an outer surface area 1233 that is greater than or equal to 5% of the total outer surface area of the crown portion. The apparatus, methods, and articles of manufacture described herein are not limited in this regard.

FIG. 15 depicts a top view of the example golf club head 100 of FIG. 1 with a golf ball 1501 proximate to the face portion 175. The golf ball 1501 may be aligned with a geometric center (sweet spot) 176 of the face portion 175. The golf ball 1501 may have a diameter of about 1.68 inches. A central vertical plane 1504 may bisect the golf ball 1501 and the golf club head 100. A toe-side bounding plane 1505 bounds a toe side of the golf club head 100. A heel-side bounding plane 1506 bounds a heel side of the golf club head 100. A toe-side dividing plane 1502 bounds a toe-side of the golf ball 1501. A heel-side dividing plane 1503 bounds a toe-side of the golf ball 1501. The crown portion 135 may include a perimeter that includes the heel-side perimeter 1531, the front perimeter 1532, toe-side perimeter 1533, and the rear perimeter 951. The apparatus, methods, and articles of manufacture described herein are not limited in this regard.

Figure 16:
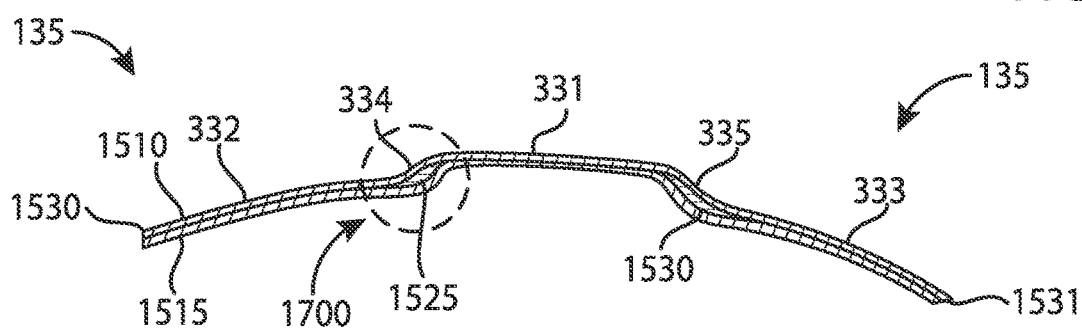
FIG. 16 depicts a cross-sectional view of an example crown portion of the example golf club head of FIG. 1 taken at section line 16-16 of FIG. 15.

FIG. 16 depicts a cross-sectional view of the crown portion 135 of the example golf club head 100 of FIG. 15 taken at section line 16-16. The crown portion 135 may include two or more layers of composite material. The crown portion 135 may include an outer layer of composite material 1510 and an inner layer of composite material 1515. The crown portion 135 may include a plurality of integral ribs. Each integral rib may include a plurality of layers of composite material. The integral ribs (e.g., generally shown as 1525, and 1530) may be disposed between the inner layer of composite material 1515 and outer layer 1510 of composite material. The integral ribs 1525 and 1530 may form the crown stiffening portion 136. The apparatus, methods, and articles of manufacture described herein are not limited in this regard.

Figure 17:
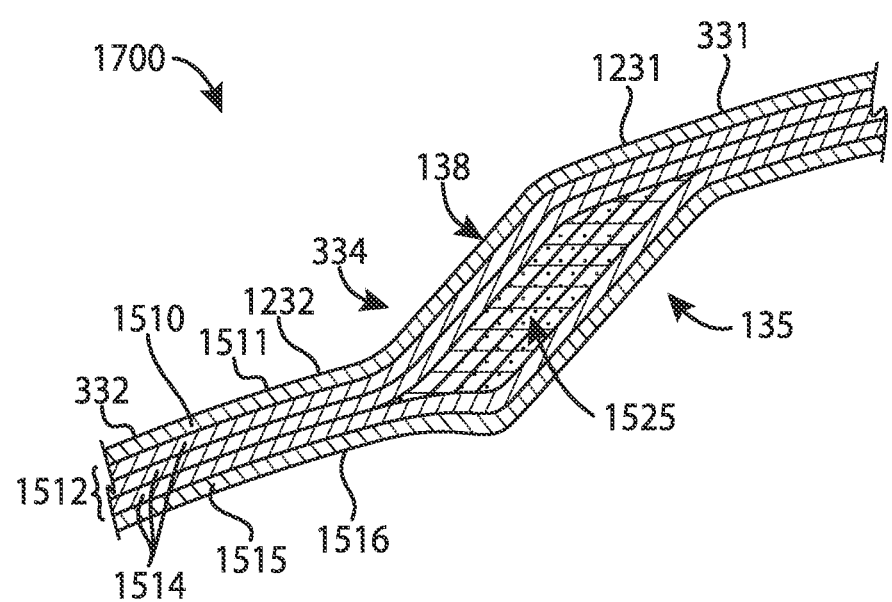
FIG. 17 depicts an enlarged view of a portion of the example crown portion of FIG. 16.

A toe-side integral rib 1525 may extend from the front perimeter 1532 of the crown portion 135 to the rear perimeter 951 of the crown portion. The toe-side integral rib 1525 may include a plurality of layers of composite material 1514, as shown in FIG. 17. The toe-side integral rib 1525 may include two or more layers of composite material 1514 disposed between the inner layer 1515 and the outer layer 1510 of the crown portion 135. The toe-side integral rib 1525 may extend rearward from the forward portion 131. The toe-side integral rib 1525 may extend rearward from a starting location between the central vertical plane 1504 and the toe-side dividing plane 1502 and terminate at an ending location between the toe-side bounding plane 1505 and the toe-side dividing plane 1502. The apparatus, methods, and articles of manufacture described herein are not limited in this regard.

A thickness of the toe-side integral rib 1525 may be equal to a thickness of the plurality of layers of composite material 1514 forming the toe-side integral rib 1525 and located between the inner layer 1515 and outer layer 1510 of the crown portion 135. In one example, the toe-side integral rib 1525 may have a maximum thickness between and including 1.0 mm and 2.0 mm. In another example, the toe-side integral rib 1525 may have a maximum thickness greater than or equal to 1.0 mm. In another example, the toe-side integral rib 1525 may have a maximum thickness greater than or equal to 2.0 mm. In yet another example, the toe-side integral rib 1525 may have a maximum thickness greater than or equal to 2.2 mm. The apparatus, methods, and articles of manufacture described herein are not limited in this regard.

FIG. 17 depicts an enlarged view of a region 1700 of the crown portion 135 depicted in FIG. 16. The crown portion 135 may include a plurality of layers of composite material 1514. The crown portion 135 may include an outer layer of composite material 1510 and an inner layer of composite material 1515. In one example, the inner layer of composite material 1515 may include a glass fiber composite material, and the outer layer of composite material 1510 may include a carbon fiber composite material. In another example, the inner layer of composite material 1515 may include a carbon fiber composite material, and the outer layer of composite material 1510 may include a glass fiber composite material. In yet another example, the inner layer of composite material 1515 may include a glass fiber composite material, and the outer layer of composite material 1510 may include a glass fiber composite material. In still another example, the inner layer of composite material 1515 may include a carbon fiber composite material, and the outer layer of composite material 1510 may include a carbon fiber composite material. The apparatus, methods, and articles of manufacture described herein are not limited in this regard.

The crown portion 135 may include a stack of composite layers forming an integral rib 1525. The integral rib 1525 may be positioned between the outer layer of composite material 1510 and the inner layer of composite material 1515. The crown portion 135 may include one or more layers of composite material 1514 arranged in parallel or substantially parallel planes. The crown portion 135 may include one or more layers of composite material 1514 that are arranged in nonparallel planes. For example, as shown in FIG. 17, the crown portion 135 may include an integral rib 1525 having a stack of composite layers arranged in planes that are nonparallel to planes associated with certain layers of composite material in the crown portion 135. Nonparallel arrangements of layers within the crown portion 135 may enhance structural integrity of the crown portion 135. In one example, shown in FIG. 17, four layers of the integral rib 1525 may contact a composite layer 1514 that is adjacent to the integral rib 1525. In another example, two or more layers of the integral rib 1525 may contact a composite layer 1514 adjacent to the integral rib 1525. The compressive strength of the crown portion 135, determined along a front-to-rear axis, may be enhanced by having layers of composite material 1514 that are arranged in nonparallel planes (i.e., nonuniform orientations). The tensile strength of the crown portion 135, determined along a front-to-rear axis, may be enhanced by having layers of composite material 1514 that are arranged in nonparallel planes (i.e., nonuniform orientations). The apparatus, methods, and articles of manufacture described herein are not limited in this regard.

The integral ribs (e.g., generally shown as 1525, 1530, and 1535) may provide embedded structural supports within the crown portion 135. Each integral rib may be located in a crown stiffening region adjacent to one or more thin portions 1035. The crown portion 135 may have contoured transition regions (e.g., generally shown as 334, and 335) between the thin portions 1035 and the thicker crown stiffening portions where the integral ribs 1525 and 1530 reside. Contoured transition regions 334 and 335 may prevent or mitigate unwanted stress concentrations within the crown portion 135 by avoiding distinct edges between thin portions 1035 and adjacent thicker portions (e.g., such as 137, 138, or 139). Stress concentrations may be undesirable as they may result in cracking or delaminating of layers of the crown portion 135 during use of the golf club head 100. For example, in an alternative embodiment having non-integral ribs attached to either an inner or outer surface of the crown portion, a distinct edge may exist at a junction formed between a non-integral rib and a surface of the crown portion 135, and that edge may introduce an unwanted stress concentration. After numerous ball strikes, presence of the stress concentration may result in cracking or delaminating of layers of the crown portion 135 proximate to the non-integral rib. This physical deterioration of the crown portion 135 may negatively impact performance of the golf club head 100. For instance, as the crown portion 135 physically deteriorates, shot-to-shot variability may increase. Shot-to-shot variability may be unacceptable to an individual who requires consistent performance from the golf club head 100. Physical deterioration of the crown portion 135 may also negatively affect appearance of the golf club head 100. For the sake of long-term durability, consistency, and appearance, it is therefore desirable to have a crown portion 135 with contoured transition regions between the thin portions 1035 and the thicker portions containing integral ribs 1525 and 1530. The apparatus, methods, and articles of manufacture described herein are not limited in this regard.

The crown portion 135 may include a plurality of composite layers 1512 positioned between the inner structural layer 1515 and the outer structural layer 1510. The term "structural layer" as used herein may describe any suitable layer or layers having any suitable shape or shapes (e.g. flat, curved, or complexly curved) and any suitable dimension or dimensions that appreciably increases the structural integrity of the crown portion 135. Together, the plurality of composite layers 1512 and the inner and outer structural layers (e.g., generally shown as 1510 and 1515) may form a crown portion 135 that, when coupled to the body portion 110 to enclose the opening in the top portion 130, may improve the ability of the golf club head 100 to withstand torsional or compressive forces imparted during impact with a golf ball, which may improve performance or reduce mishits. The apparatus, methods, and articles of manufacture described herein are not limited in this regard.

The plurality of composite layers 1512 may include a plurality of layers of composite materials in a stacked arrangement. A layer of composite material 1514 may include a layer of fabric combined with an amount of resin. The fabric may be constructed from graphite fiber (commonly referred to as "carbon fiber"), glass fiber, aramid fiber, carbon nanotubes, or any other suitable high-performance fiber, combination of fibers, or material. In some examples, the fabric may be a hybrid of two or more types of fibers, such as a hybrid fabric made of carbon fibers and aramid fibers. Examples of aramid fibers include KEVLAR, TWARON, NOMEX, NEW STAR, TECHNORA, and TEIJINCONEX fibers. The fabric may be constructed as a woven, knitted, stitched, or nonwoven (e.g. uni-directional) fabric. Examples of suitable woven fabrics include Style 1625 Bi-directional E-Glass (Item No. 1094), Twill Weave Carbon Fiber Fabric (Item No. 1069), and KEVLAR Plain Weave Fabric (Item No. 2469), all available from Fibre Glast Developments Corporation of Brookville, Ohio.

In some instances, resin may be applied to the fabric during a lamination process, either by hand or through an infusion process. In other instances, the fabric may be pre-impregnated with resin. These fabrics are commonly referred to as "prepreg" fabrics. Prepreg fabrics may require cold storage to ensure the resin does not cure prematurely. During manufacturing, heating the crown portion 135 (e.g. in an oven or autoclave) may be required to fully cure (i.e.

polymerize) the resin such that the crown portion 135 takes on desirable structural attributes as the resin hardens. The apparatus, methods, and articles of manufacture described herein are not limited in this regard.

In some examples, the resin may be a thermosetting resin, such as an epoxy resin, vinyl-ester resin, polyester resin, or other suitable resin. Resin selection may be based, at least in part, on fabric compatibility and the characteristics of the composite layers. Epoxy resins are suitable since they may be used to form a strong, lightweight composite crown portion 135 that is dimensionally stable. A suitable epoxy resin is System 2000 Epoxy Resin (Item No. 2000-A) available from Fibre Glast Developments Corporation.

The epoxy resin may be mixed with a suitable epoxy hardener, such as 2020 Epoxy Hardener (Item No. 2020-A), 2060 Epoxy Hardener (Item No. 2060-A), or 2120 Epoxy Hardener (Item No. 2120-A) from Fibre Glast Developments Corporation. Selection of an epoxy hardener may be based, at least in part, on desired pot life and working time, which may be dictated by the size and complexity of the composite crown portion 135 being manufactured. Epoxy hardener selection may also be based on desired cure temperature and cure time. An epoxy hardener may be selected that is compatible with the chosen manufacturing temperature and time. The apparatus, methods, and articles of manufacture described herein are not limited in this regard.

The crown portion 135 may be formed by any suitable process, such as a wet layup process where liquid resin is distributed over a fabric made of fibers to wet out the fabric. The liquid resin may be distributed by hand, by a resin infusion process, or by any other suitable process. The wet layup process may utilize a peel ply layer or mold release agent to prevent the composite crown portion 135 from adhering to a vacuum bag film during a vacuum bagging process. An example of a suitable peel ply layer is Peel Ply Release Fabric (Catalog No. VB-P56150), available from U.S. Composites, Inc. of West Palm Beach, Florida.

During the layup process, fabric may be trimmed to an appropriate size and then laid into a mold. Resin may then be applied to the surface of the fabric using a suitable tool, such as a roller or brush. Through a lamination process, the resin may be forced into the fabric to impregnate the fabric with resin. When prepreg fabrics are used in the layup, the step of applying resin may be omitted, since the fabric already contains a suitable amount of resin to facilitate the lamination process. A peel ply layer may be inserted between the prepreg fabric and the vacuum bag film to prevent the composite carbon crown 135 from adhering to the vacuum bag film. The apparatus, methods, and articles of manufacture described herein are not limited in this regard.

Figure 18:
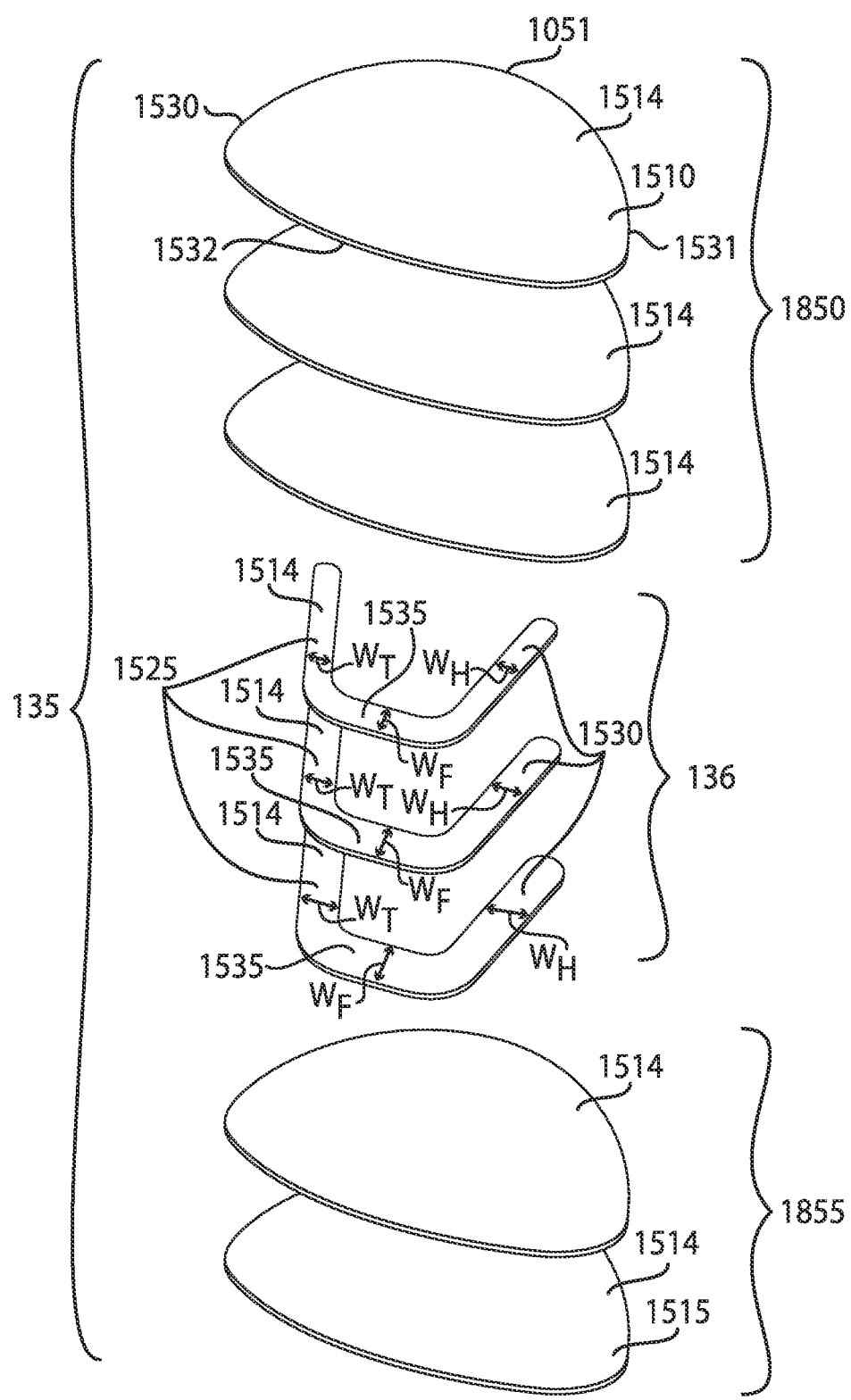
FIG. 18 depicts an exploded view of an example crown portion for the example golf club head of FIG. 1.
Figure 19:
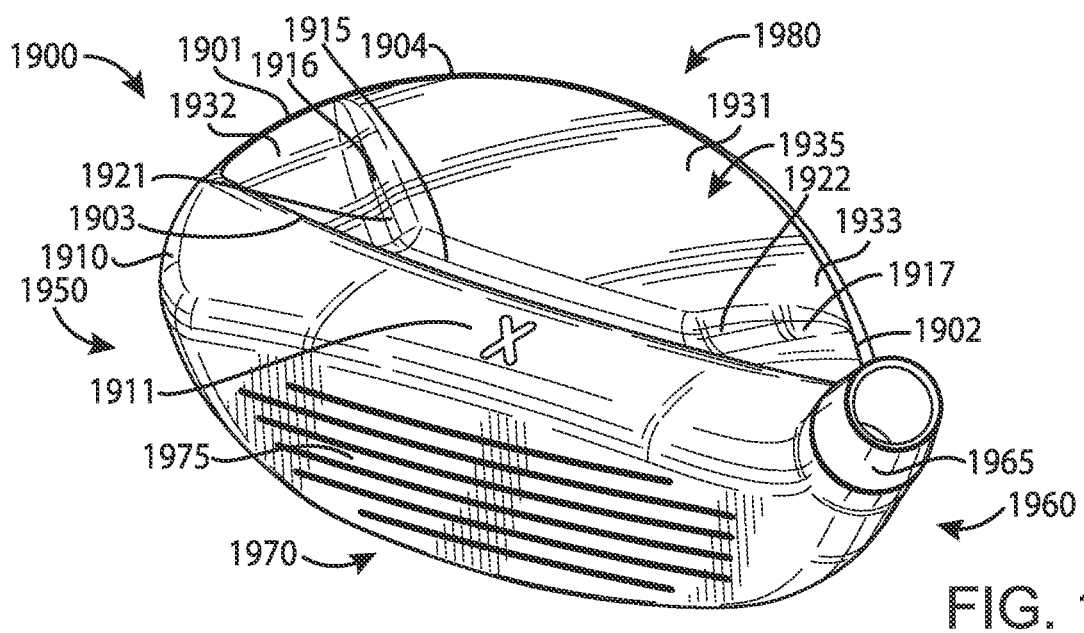
FIG. 19 depicts a top perspective view of an example golf club head according to an embodiment of the apparatus, methods, and articles of manufacture described herein.
Figure 20:
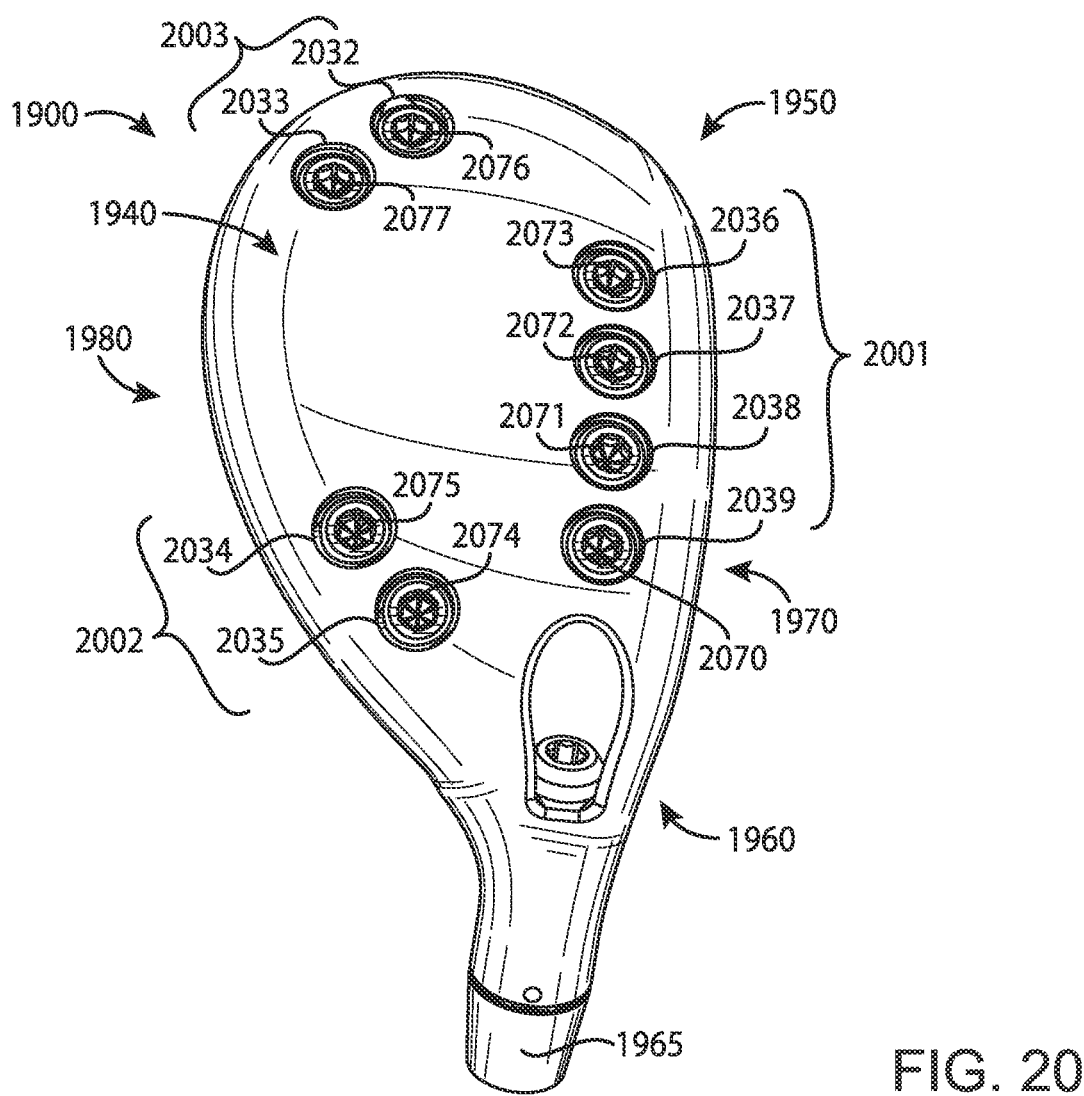
FIG. 20 depicts a bottom perspective view of the example golf club head of FIG. 19.
Figure 21:
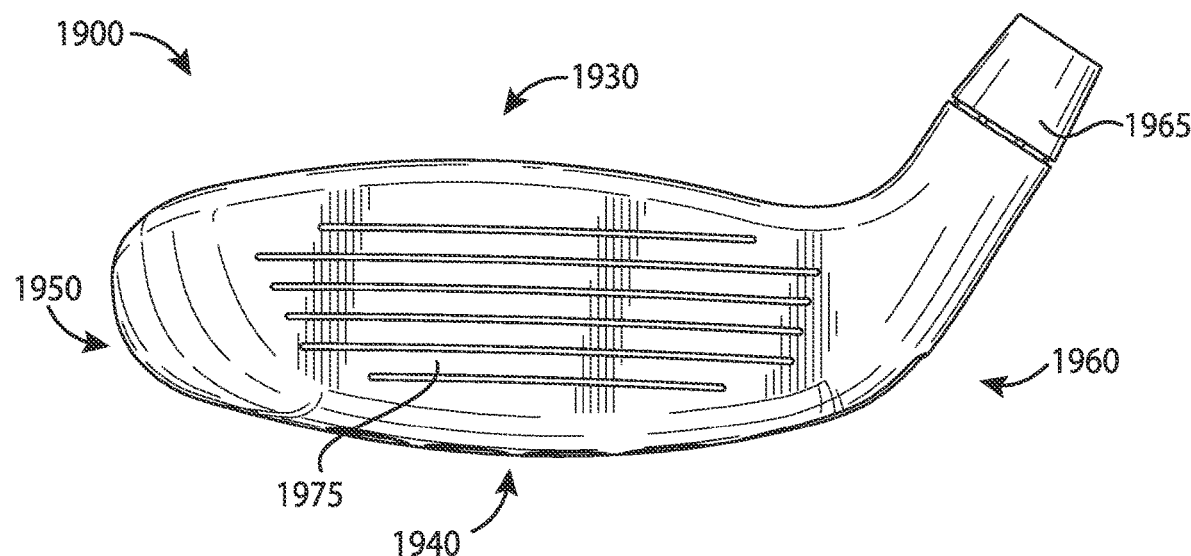
FIG. 21 depicts a front view of the example golf club head of FIG. 19.
Figure 22:
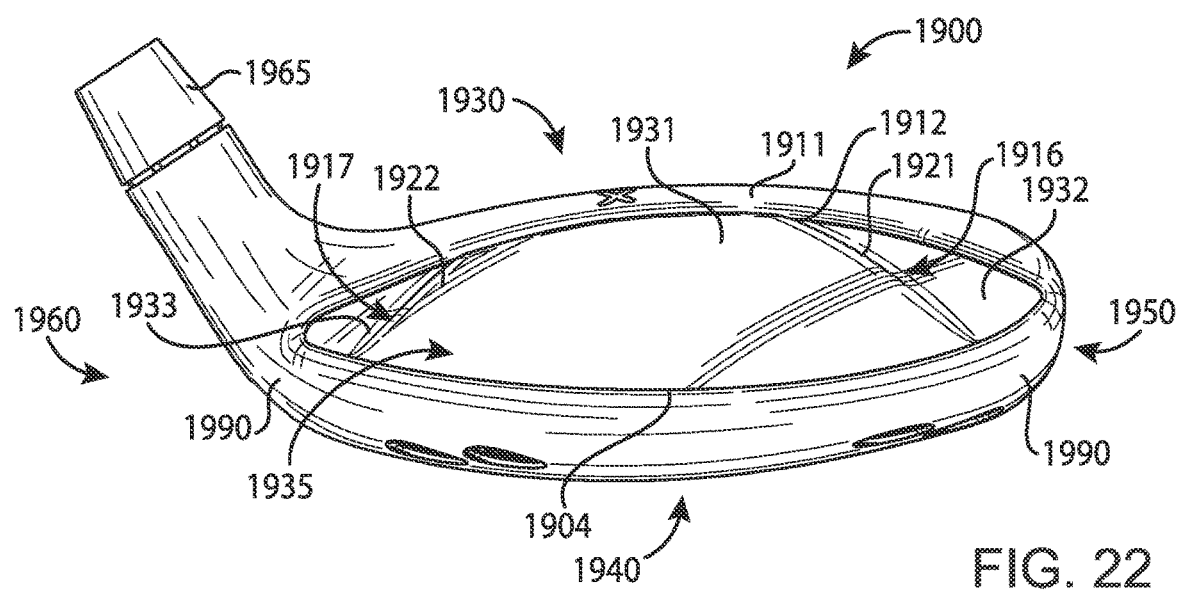
FIG. 22 depicts a rear view of the example golf club head of FIG. 19.
Figure 23:
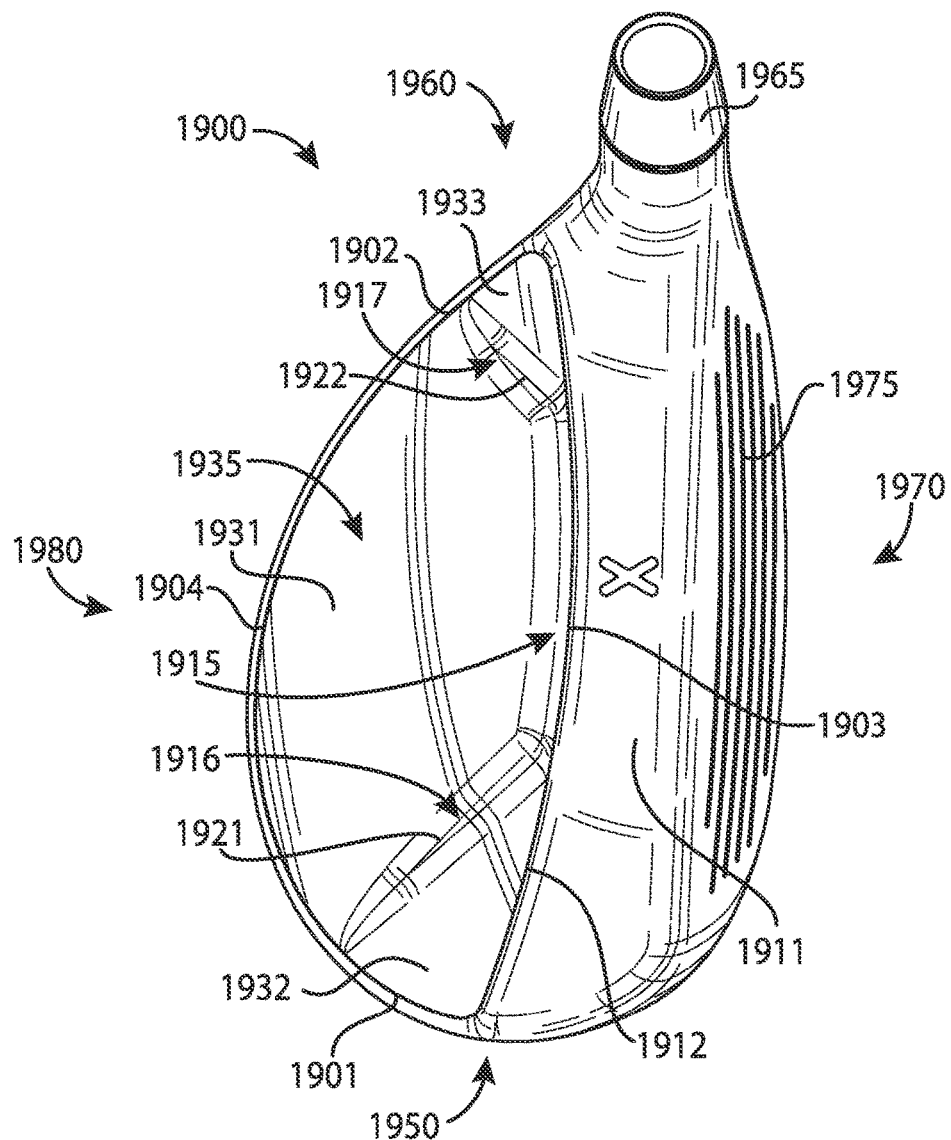
FIG. 23 depicts a top view of the example golf club head of FIG. 19.
Figure 24:
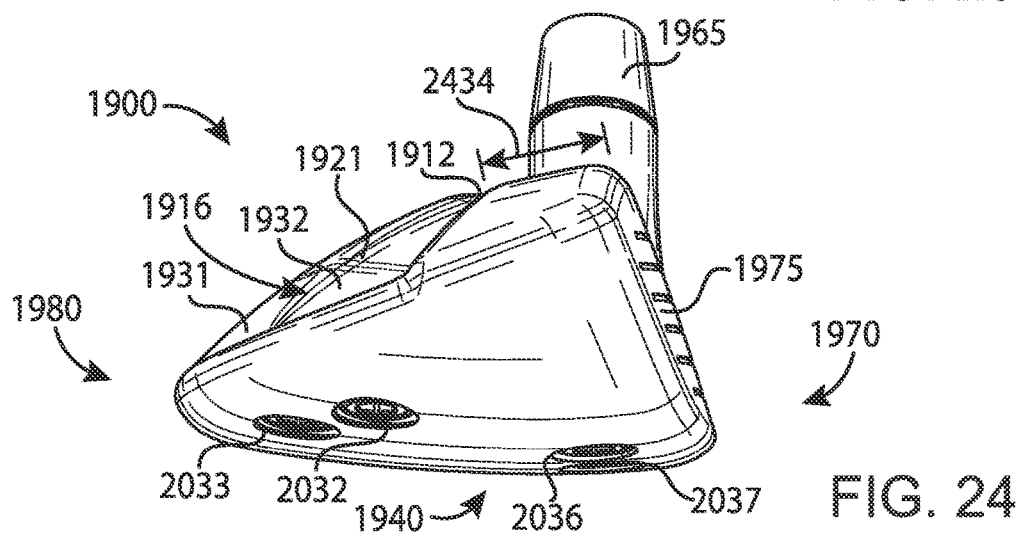
FIG. 24 depicts a toe view of the example golf club head of FIG. 19.
Figure 25:
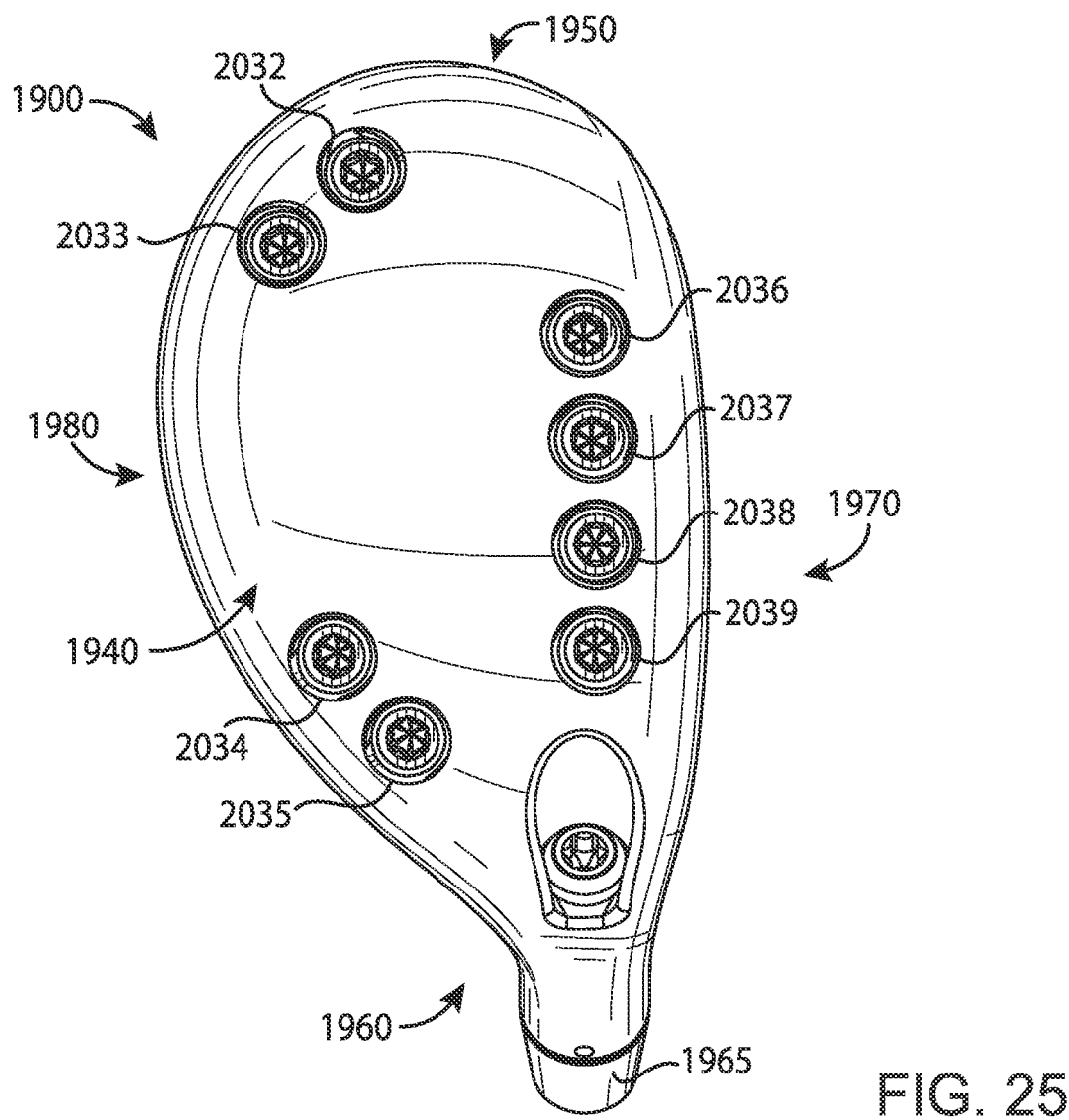
FIG. 25 depicts a bottom view of the example golf club head of FIG. 19.
Figure 26:
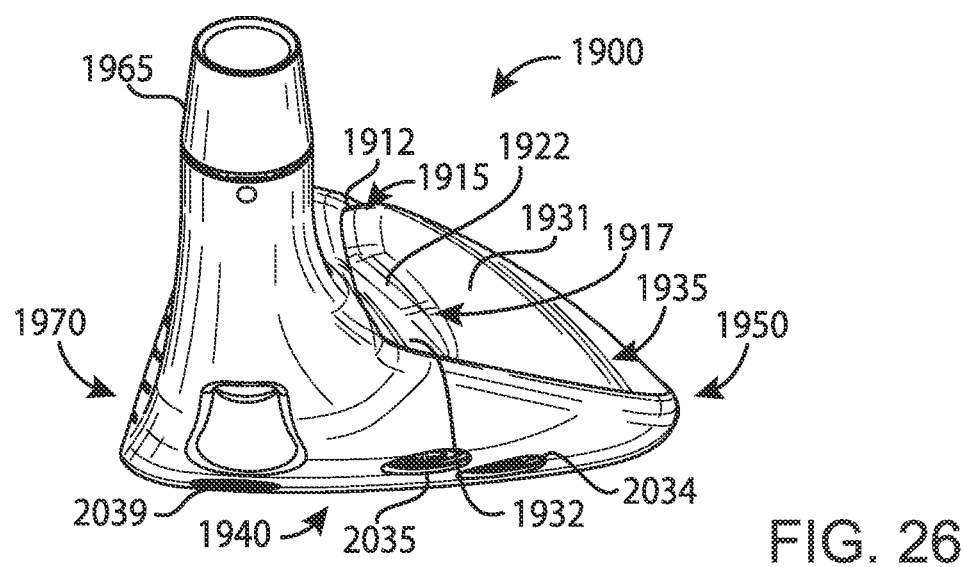
FIG. 26 depicts a heel view of the example golf club head of FIG. 19.
Figure 27:
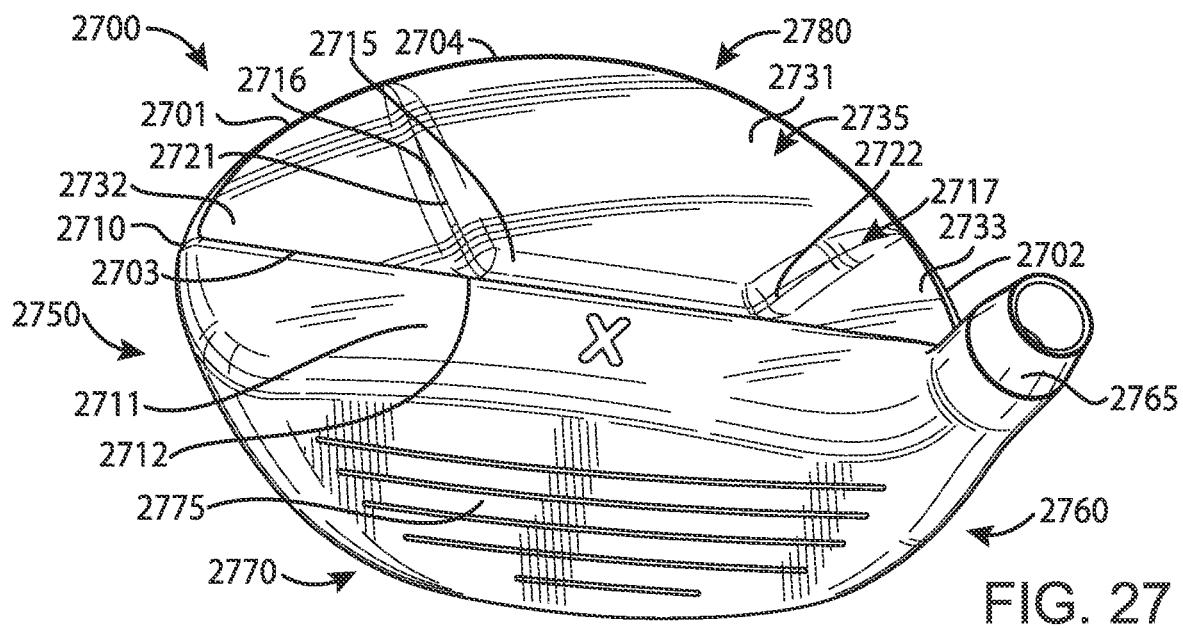
FIG. 27 is top perspective view of an example golf club head according to an embodiment of the apparatus, methods, and articles of manufacture described herein.
Figure 28:
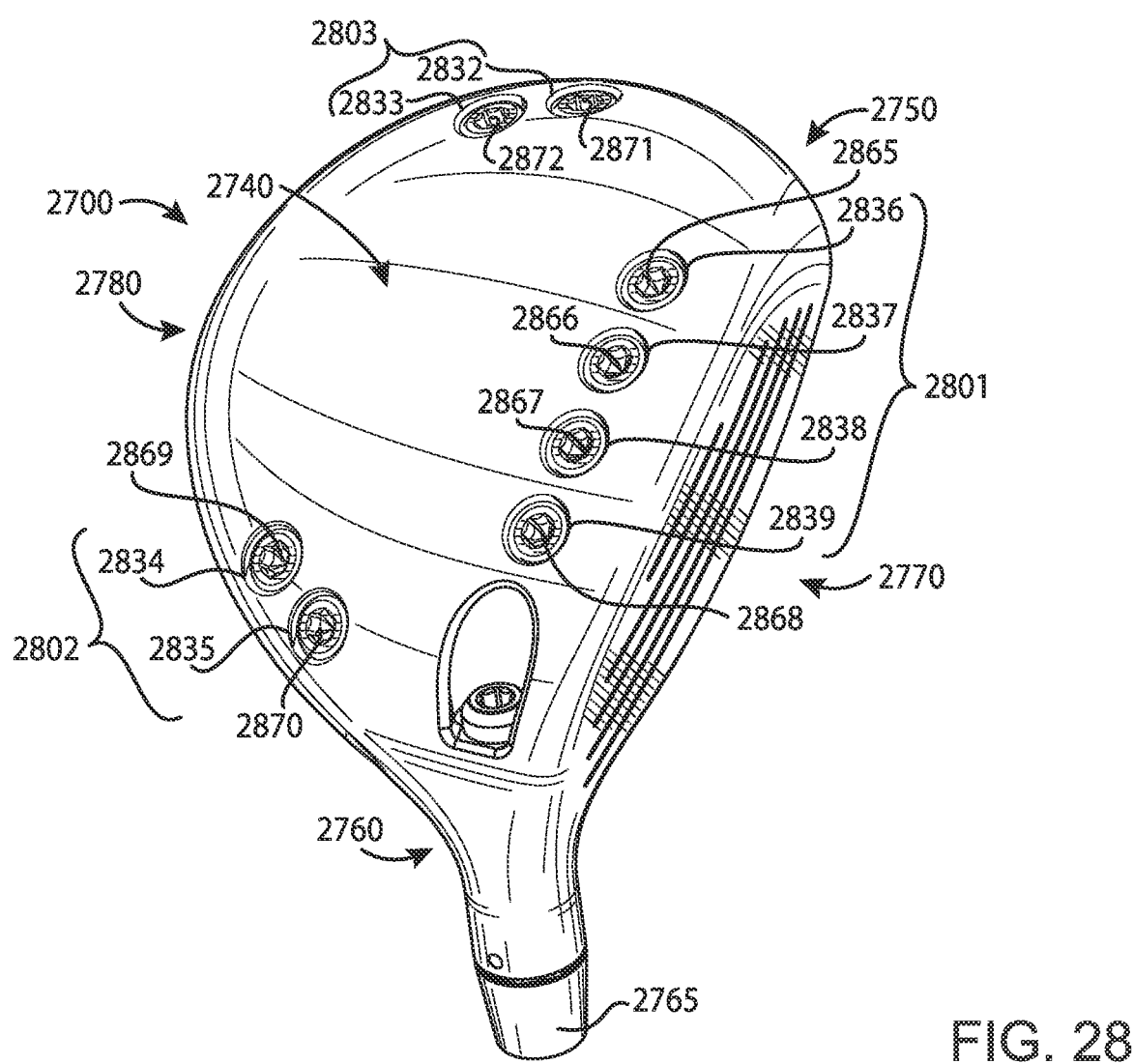
FIG. 28 depicts a bottom perspective view of the example golf club head of FIG. 27.
Figure 29:
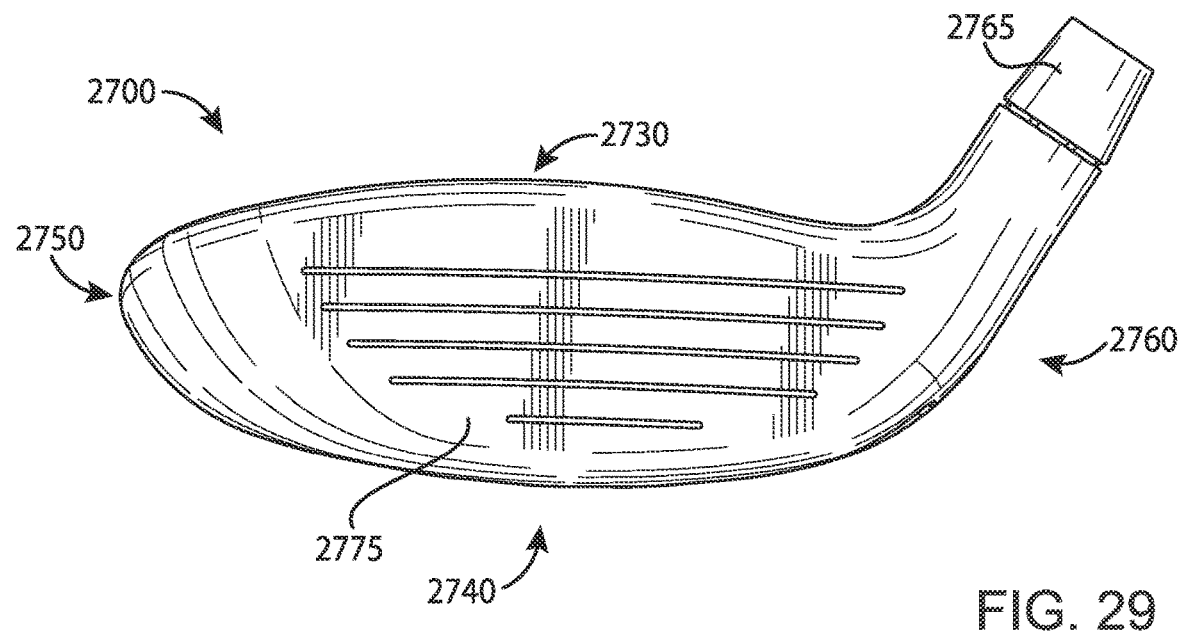
FIG. 29 depicts a front view of the example golf club head of FIG. 27.
Figure 30:
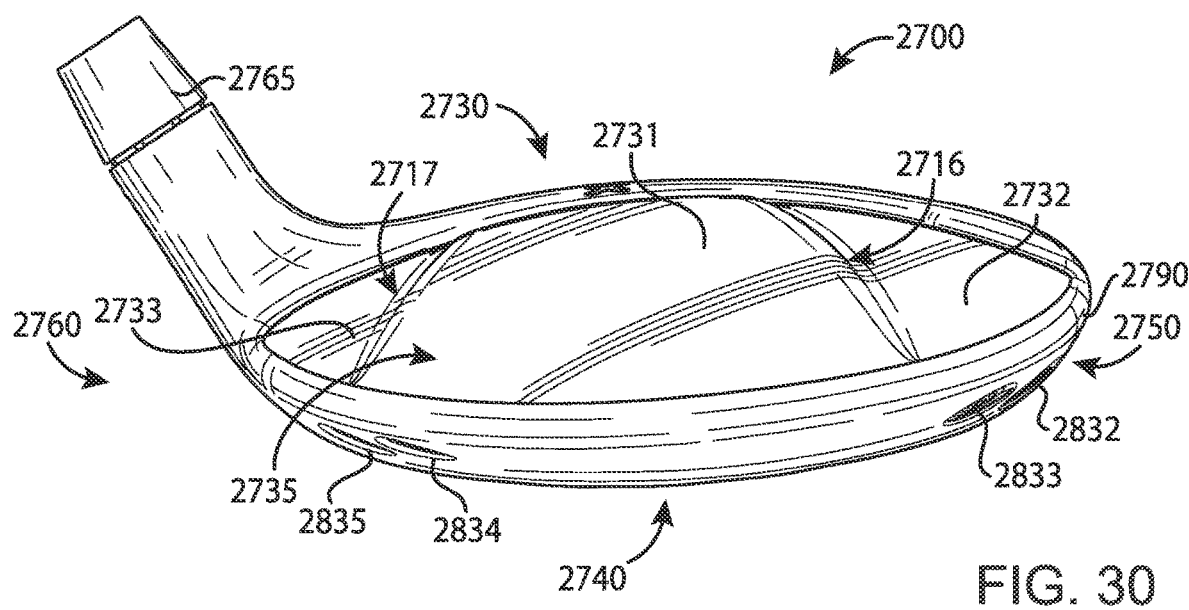
FIG. 30 depicts a rear view of the example golf club head of FIG. 27.
Figure 31:
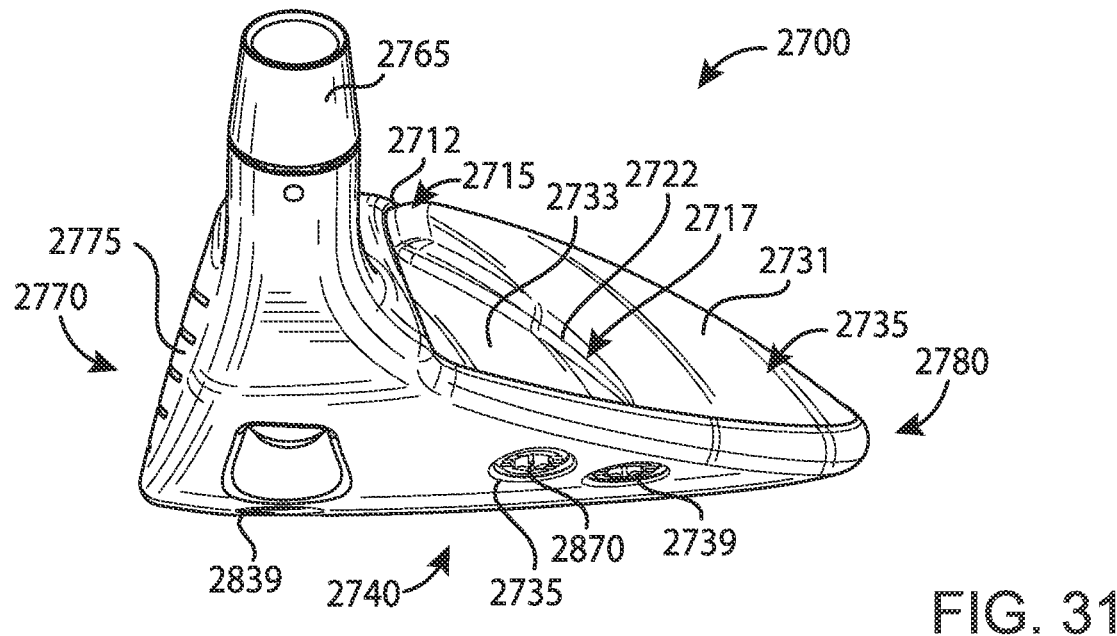
FIG. 31 depicts a heel view of the example golf club head of FIG. 27.
Figure 32:
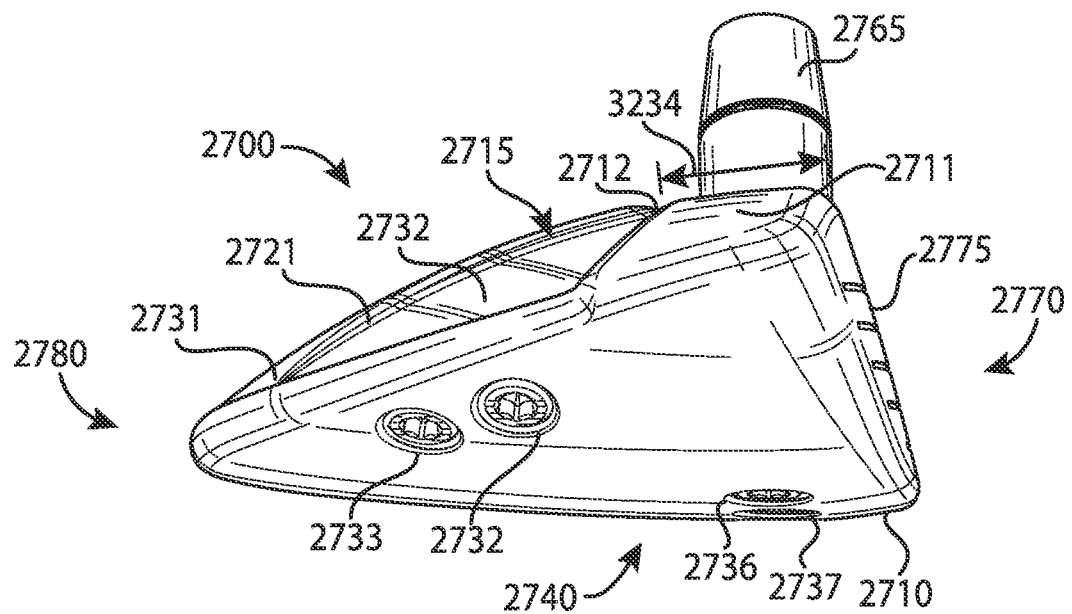
FIG. 32 depicts a toe view of the example golf club head of FIG. 27.
Figure 33:
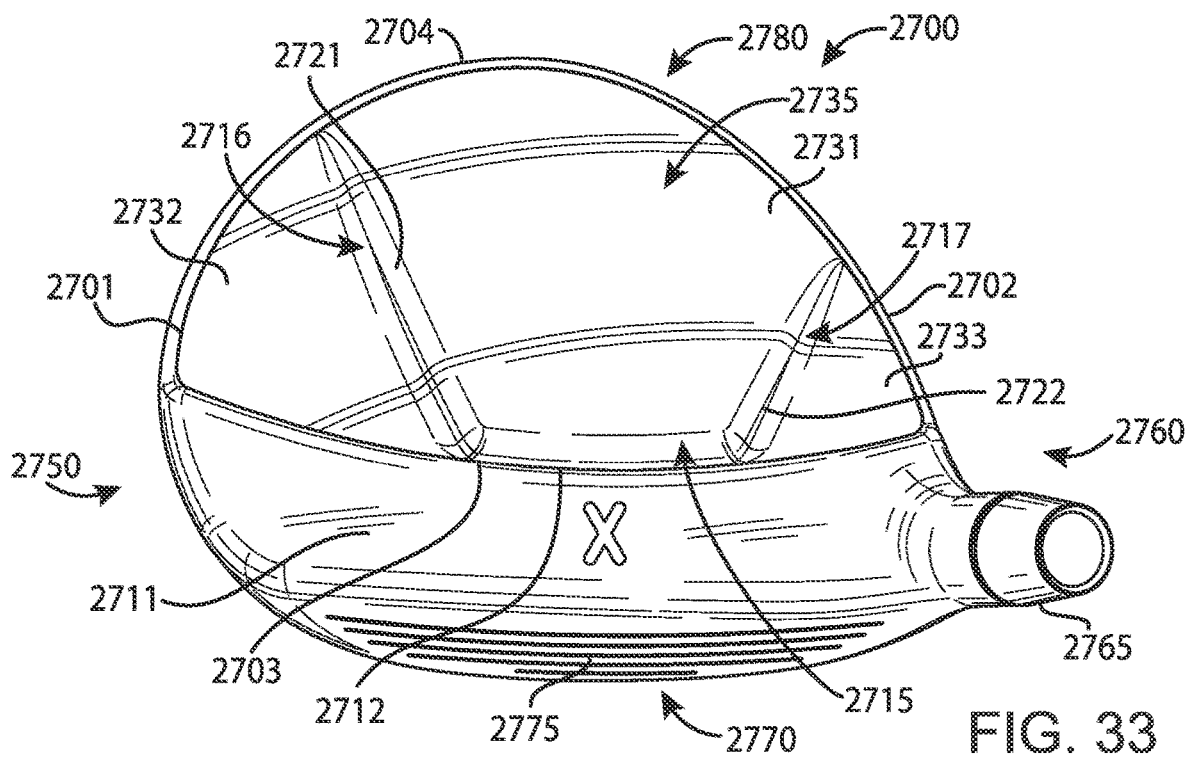
FIG. 33 depicts a top view of the example golf club head of FIG. 27.
Figure 34:
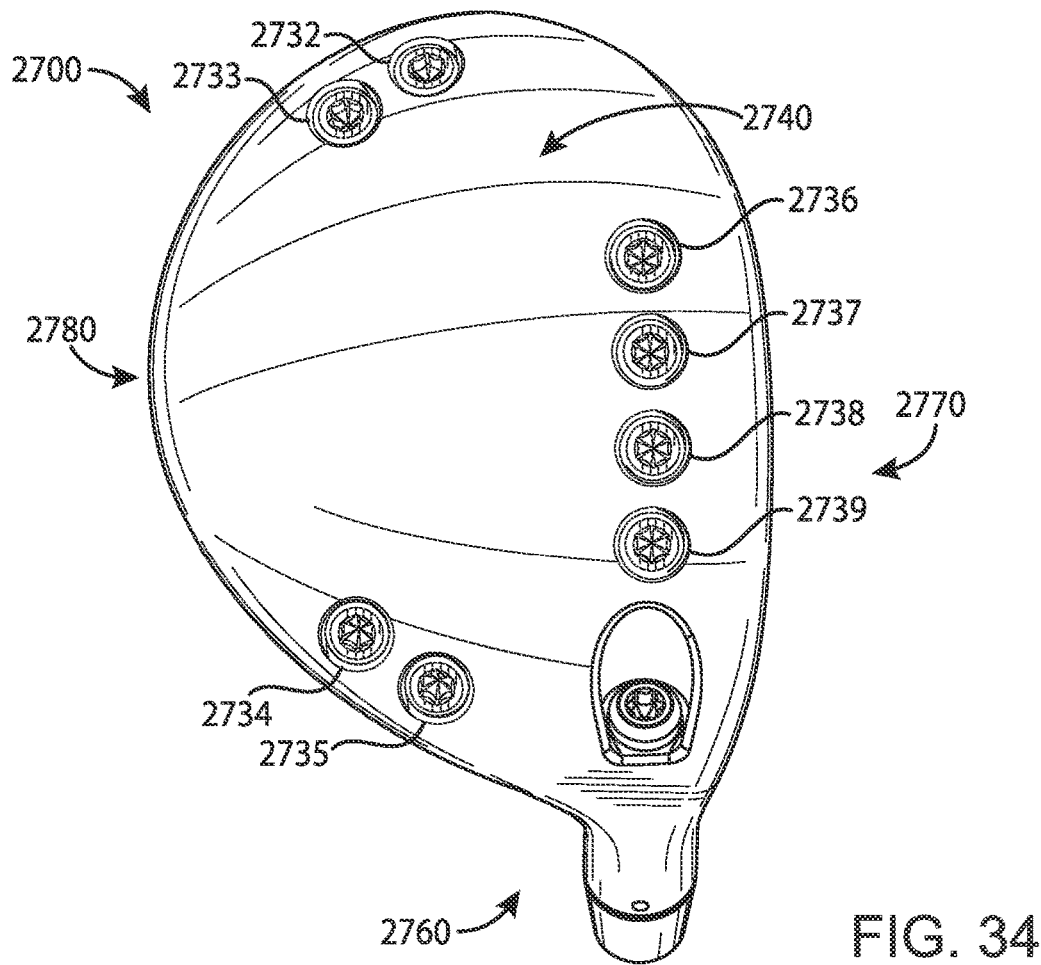
FIG. 34 depicts a bottom view of the example golf club head of FIG. 27.

FIG. 18 shows an exploded view of layers of an example crown portion 135 prior to execution of a manufacturing process that yields the contoured crown portion 135 shown in FIG. 1. The crown portion 135 may include an upper plurality of composite layers 1850, a lower plurality of composite layers 1855, and a crown stiffening portion 136 disposed between the upper and lower pluralities of composite layers. The presence of the crown stiffening portion 136 may allow lightweight thin portions 1035 to be utilized adjacent to the crown stiffening portion 136, as shown in FIG. 1. Together, the crown stiffening portion 136 and adjacent thin portions 1035 may yield a crown portion 135 that is lighter and/or stiffer than a crown portion having a uniform thickness. A thin portion 1035 may be any region in the crown portion 135 that does not include a crown stiffening portion 136. The crown stiffening portion 136 may include a plurality of layers of composite material arranged in a stacked configuration. Each layer of composite material 1514 may include a layer of fabric combined with resin. The fabric may be constructed from carbon fiber, glass fiber, aramid fiber, carbon nanotubes, or any other suitable high-performance fiber, combination of fibers, or material. In some examples, the fabric may be a hybrid of two or more types of fibers, such as a hybrid fabric made of carbon fibers and aramid fibers. The fabric may be constructed as a woven, knitted, stitched, or uni-directional fabric. The apparatus, methods, and articles of manufacture described herein are not limited in this regard.

During manufacturing of the crown portion 135, a plurality of composite layers 1514, such as those depicted in FIG. 18, may be laid in a contoured mold. Pressure may be applied to the layers 1514 to encourage bonding of adjacent layers to form the contoured composite crown portion 135. Heat may be applied to the layers to encourage bonding of adjacent layers to form the crown portion 135. Pressing the composite layers 1514 against contoured surfaces of the mold may produce a raised central crown portion 331 and contoured transition regions (e.g., generally shown as 334, and 335) adjacent to the raised central crown portion, as shown in FIG. 1. To ensure smooth transition regions adjacent to the raised central crown portion 331, each subsequent composite layer in the stack of composite layers forming the crown stiffening portion 136 may become gradually wider (e.g. in descending order in the stack) to yield smooth transition regions 334 and 335 in the manufactured crown portion 135. In the example shown in FIG. 18, each composite layer of the crown stiffening portion 136 may have a front width (wF), a heel-side width (wH), and a toe-side width (wT). In one example, a composite layer 1514 in the crown stiffening portion 136 may have a width (wF, wH, or wT) that is at least 1% greater than an adjacent composite layer 1514 in the crown stiffening portion 136. In another example, a composite layer 1514 in the crown stiffening portion 136 may have a width (wF, wH, or wT) that is at least 5% greater than an adjacent composite layer 1514 in the crown stiffening portion 136. In yet another example, a composite layer 1514 in the crown stiffening portion 136 may have a width (wF, wH, or wT) that is at least 10% greater than an adjacent composite layer 1514 in the crown stiffening portion 136. In still another example, a composite layer 1514 in the crown stiffening portion 136 may have a width (wF, wH, or wT) that is at least 15% greater than an adjacent composite layer 1514 in the crown stiffening portion 136. In yet another example, a composite layer 1514 in the crown stiffening portion 136 may have a width (wF, wH, or wT) that is at least 30% greater than an adjacent composite layer 1514 in the crown stiffening portion 136. While the above examples may describe particular percentages, the composite layer 1514 in the crown stiffening portion 136 may have a width less than 1% of an adjacent composite layer 1514 in the crown stiffening portion 136. The apparatus, methods, and articles of manufacture described herein are not limited in this regard.

The inner structural layer 1515 may include a layer of fabric combined with resin. The fabric may be constructed from carbon fiber, glass fiber, aramid fiber, carbon nanotubes, or any other suitable high-performance fiber, combination of fibers, or material. In some examples, the fabric may be a hybrid of two or more types of fibers, such as a hybrid fabric made of carbon fibers and aramid fibers. The fabric may be constructed as a woven, knitted, stitched, or uni-directional fabric. In one example, the inner structural layer 1515 may include a layer of glass fiber fabric impregnated with epoxy resin. The apparatus, methods, and articles of manufacture described herein are not limited in this regard.

The outer structural layer 1510 may include a layer of fabric combined with resin. The fabric may be constructed from carbon fiber, glass fiber, aramid fiber, carbon nanotubes, or any other suitable high-performance fiber, combination of fibers, or material. In some examples, the fabric may be a hybrid of two or more types of fibers, such as a hybrid fabric made of carbon fibers and aramid fibers. The fabric may be constructed as a woven, knitted, stitched, or uni-directional fabric. In one example, the outer structural layer 1510 may include a woven layer of KEVLAR fiber fabric impregnated with epoxy resin. The apparatus, methods, and articles of manufacture described herein are not limited in this regard.

The plurality of composite layers 1512 may include a plurality of layers of composite materials arranged in a stacked configuration. In one example, the plurality of composite layers 1512 may include two or more layers of prepreg uni-directional fabric. In another example, the plurality of composite layers 1512 may include three or more layers of prepreg uni-directional fabric. In still another example, the plurality of composite layers 1512 may include four or more layers of prepreg uni-directional fabric where four layers are arranged in a 0/90/0/90 configuration to increase tensile strength along two perpendicular axes. In another example, the plurality of composite layers 1512 may include two or more layers of prepreg uni-directional fabric where two layers are arranged in a 0/90 configuration to increase tensile strength along two perpendicular axes. The apparatus, methods, and articles of manufacture described herein are not limited in this regard.

An outer surface 1511 of the crown portion 135 may have an anti-glare finish. An outer surface of the crown portion 135 may have a medium or low gloss appearance to reduce the amount of light reflected upward at an individual's eyes when aligning the golf club head 100 with a golf ball and performing a golf shot. A relative gloss value may be determined by projecting a beam of light at a fixed intensity and angle onto the outer surface 1511 of the crown portion 135 and measuring the amount of light reflected at an equal but opposite angle upward at the individual. On a measurement scale, a specular reflectance of 0 gloss units (GU) may be associated with a perfectly matte surface, and a specular reflectance of 100 GU may be associated with a highly polished black glass material. Providing a crown portion 135 with a relatively low specular reflectance may be desirable to reduce distraction perceived by the individual of the golf club head 100, which may reduce mishits and thereby improve performance. In one example, an outer surface 1511 of the crown portion 135 may have a specular reflectance of less than 55 GU. In another example, the outer surface 1511 of the crown portion 135 may have a specular reflectance of less than 40 GU. In yet another example, the outer surface 1511 of the crown portion 135 may have a specular reflectance of less than 25 GU. In still another example, the outer surface 1511 of the crown portion 135 may have a specular reflectance of less than 10 GU. While the above examples may describe particular specular reflectance, the apparatus, methods, and article of manufacture may include the outer surface 1511 of the crown portion 135 with a specular reflectance greater than or equal to 55 GU. The apparatus, methods, and articles of manufacture described herein are not limited in this regard.

In some examples, the outer surface 1511 of the crown portion 135 may include an antireflective coating. In one example, the antireflective coating may have a specular reflectance of less than 55 GU. In another example, the antireflective coating may have a specular reflectance of less than 40 GU. In yet another example, the antireflective coating may have a specular reflectance of less than 25 GU. In still another example, the antireflective coating may have a specular reflectance of less than 10 GU. The apparatus, methods, and articles of manufacture described herein are not limited in this regard.

To encourage the inner structural layer 1515 to adhere to an adjacent internal composite layer 1514 during the manufacturing process, it may be necessary to insert a resin or film adhesive layer between the inner structural layer 1515 and the adjacent composite layer. To encourage the outer structural layer 1510 to adhere to an adjacent internal composite layer 1514 during the manufacturing process, it may be necessary to insert a resin or film adhesive layer between the outer structural layer 1510 and the adjacent composite layer. The resin or film adhesive may be an epoxy, epoxy foam, liquid resin, or any suitable film adhesive available from Collano AG, located in Germany. In one example, the crown portion 135 may include a first film adhesive layer between an inner structural layer 1515 and an adjacent composite layer 1514. The first film adhesive layer may adhere the outer structural layer 1510 to the top surface of the adjacent composite layer 1514 in the upper plurality of composite layers 1850. The crown portion 135 may include a second film adhesive film layer between the inner structural layer 1515 and an adjacent composite layer 1514. The second film adhesive layer may adhere the inner structural layer 1515 to a bottom surface of the adjacent composite layer 1514 in the lower plurality of composite layers 1855. The apparatus, methods, and articles of manufacture described herein are not limited in this regard.

FIG. 17 shows an enlarged view of a region 1700 of the cross-sectional view shown in FIG. 16. The crown portion 135 may include an integral rib 1525 disposed between the inner layer 1515 and the outer layer 1510. The integral rib 1525 may include a plurality of layers of composite material 1512. The integral rib 1525 may include two or more layers of composite material. The integral rib 1525 may include two or more layers of carbon fiber composite material. The integral rib 1525 may include three or more layers of composite material. The integral rib 1525 may include four or more layers of composite material. The integral rib 1525 may include five or more layers of composite material. The integral rib 1525 may include six or more layers of composite material. The integral rib 1525 may include seven or more layers of composite material. The integral rib 1525 may include eight or more layers of composite material. The apparatus, methods, and articles of manufacture described herein are not limited in this regard.

The integral rib may be a toe-side integral rib 1525. The toe-side integral rib 1525 may extend from a front perimeter 1532 of the crown portion 135 to a rear perimeter 951 of the crown portion 135. The toe-side integral rib 1525 may include a plurality of layers of composite material 1514. The toe-side integral rib 1525 may include two or more layers of composite material disposed between the inner layer 1515 and the outer layer 1510 of the crown portion 135. The toe-side integral rib 1525 may extend rearward from the forward portion 131. The toe-side integral rib 1525 may extend rearward from a starting location between the central vertical plane 1504 and the toe-side dividing plane 1502 and terminate at an ending location between the toe-side bounding plane 1505 and the toe-side dividing plane 1502. In one example, the toe-side integral rib 1525 may have a maximum thickness greater than or equal to 2 mm. In another example, the toe-side integral rib 1525 may have a maximum thickness greater than or equal to 2.1 mm. In yet another example, the toe-side integral rib 1525 may have a maximum thickness greater than or equal to 2.4 mm. While the above examples may describe particular thicknesses, the apparatus, methods, and article of manufacture described herein may include the toe-side integral rib 1525 with a maximum thickness of less than 2 mm. The apparatus, methods, and articles of manufacture described herein are not limited in this regard.

The crown portion 135 may include a heel-side integral rib 1530. The heel-side integral rib 1530 may extend from a front perimeter 1532 of the crown portion 135 to a rear perimeter 951 of the crown portion. The heel-side integral rib 1530 may include a plurality of layers of composite material 1514. The heel-side integral rib 1530 may include two or more layers of composite material disposed between the inner layer 1515 and the outer layer 1510 of the crown portion. The heel-side integral rib 1530 may extend rearward from the forward portion 131. The heel-side integral rib 1530 may extend rearward from a starting location between the central vertical plane 1504 and the heel-side dividing plane 1503 and terminate at an ending location between the heel-side bounding plane 1506 and the heel-side dividing plane 1503. In one example, the heel-side integral rib 1530 may have a maximum thickness greater than or equal to 2.0 mm. In another example, the heel-side integral rib 1530 may have a maximum thickness greater than or equal to 2.1 mm. In yet another example, the heel-side integral rib 1530 may have a maximum thickness greater than or equal to 2.4 mm. While the above examples may describe particular thicknesses, the apparatus, methods, and article of manufacture described herein may include the heel-side integral rib 1530 with a maximum thickness of less than 2 mm. The apparatus, methods, and articles of manufacture described herein are not limited in this regard.

The crown portion 135 may include a central integral rib 1535. The central integral rib 1535 may extend along the front perimeter 1532 of the crown portion 135. The central integral rib 1535 may extend from the toe-side integral rib 1525 to the heel-side integral rib 1530. The central integral rib 1535 may extend from a forward-most end of the toe-side integral rib 1525 to a forward-most end of the heel-side integral rib 1530. The central integral rib may extend a distance of at least 3 centimeters beside the junction 132 formed between the front perimeter 1532 of the crown portion 135 and the forward portion 131 of the top portion 130. The central integral rib 1535 may include a plurality of layers of composite material 1514. The central integral rib 1535 may include two or more layers of composite material disposed between the inner layer 1515 and the outer layer 1510 of the crown portion 135. The central integral rib 1535 may be located between the toe-side dividing plane 1502 and the heel-side dividing plane 1503. In one example, the central integral rib 1535 may have a maximum thickness greater than or equal to 2.0 mm. In another example, the central integral rib 1535 may have a maximum thickness greater than or equal to 2.1 mm. In yet another example, the central integral rib 1535 may have a maximum thickness greater than or equal to 2.4 mm. While the above examples may describe particular thicknesses, the apparatus, methods, and article of manufacture described herein may include the central integral rib 1535 with a maximum thickness of less than 2 mm. The apparatus, methods, and articles of manufacture described herein are not limited in this regard.

The integral ribs (e.g., generally shown as 1525, 1530, and 1535) may enhance the flexural strength of the crown portion 135. The integral ribs 1525, 1530, and 1535 may enhance the compressive strength of the crown portion 135. The integral ribs 1525, 1530, and 1535 may reduce outward deflection (e.g., bulging) of the crown portion 135 in response to an impact force transferred from the body portion 110 to the crown portion 135 during impact with a golf ball. The integral ribs 1525, 1530, and 1535 may reduce deflection of the crown portion 135 inward toward in the interior cavity of the golf club head 100 in response to a downward force applied to an outer surface of the crown portion 135. Inward deflection of the crown portion 135 may be easier to accurately measure in a test environment than outward deflection. In certain instances, resistance to inward deflection may correlate to resistance to outward deflection. Inward deflection may be measured by applying a downward force to an outer surface of the crown portion and measuring physical deflection of the crown portion with a suitable measuring device. In one example, when a downward force of 200 pound-force (lbf) is applied to the central crown portion 331, the central crown portion 331 may deflect less than 0.025 inch. In another example, when a downward force of 200 lbf is applied to the central crown portion 331, the central crown portion 331 may deflect less than 0.015 inch. In another example, when a downward force of 200 lbf is applied to the central crown portion 331, the central crown portion 331 may deflect less than 0.012 inch. The apparatus, methods, and articles of manufacture described herein are not limited in this regard.

Certain rules or regulations imposed by the USGA or other governing bodies may limit a spring-like effect of certain designs, materials, or constructions of golf club heads. To ensure a club head conforms with the certain rules and regulations, it may therefore be desirable to minimize spring-like effects of certain aspects of the club head. For instance, it may be desirable to minimize a spring-like effect of the crown portion 135 by reinforcing the crown portion to minimize deflection during use. The integral ribs (e.g., 1525, 1530, and 1535) may allow the crown portion 135 to resist deflection better than a similar lightweight crown portion that lacks integral ribs. In one example, the crown portion 135 with integral ribs may deflect inward about 0.012 inch whereas a crown portion without integral ribs may deflect about 0.020 inch in response to applying a downward force of 200 lbf to the respective crown portions. In another example, the crown portion 135 with integral ribs (e.g., 2715, 2716, and 2717) of a fairway wood-type golf club head 2700 may deflect inward about 0.007 inch whereas a crown portion without integral ribs of a similar golf club head may deflect about 0.013 inch in response to applying a downward force of 200 lbf to the respective crown portions. In yet another example, the crown portion 1935 with integral ribs (e.g., 1915, 1916, and 1917) of a hybrid-type golf club head 1900 may deflect about 0.005 inch whereas the crown portion without integral ribs of a similar golf club head may deflect about 0.009 inch in response to applying a downward force of 200 lbf to the respective crown portions. The apparatus, methods, and articles of manufacture described herein are not limited in this regard.

Figure 39:
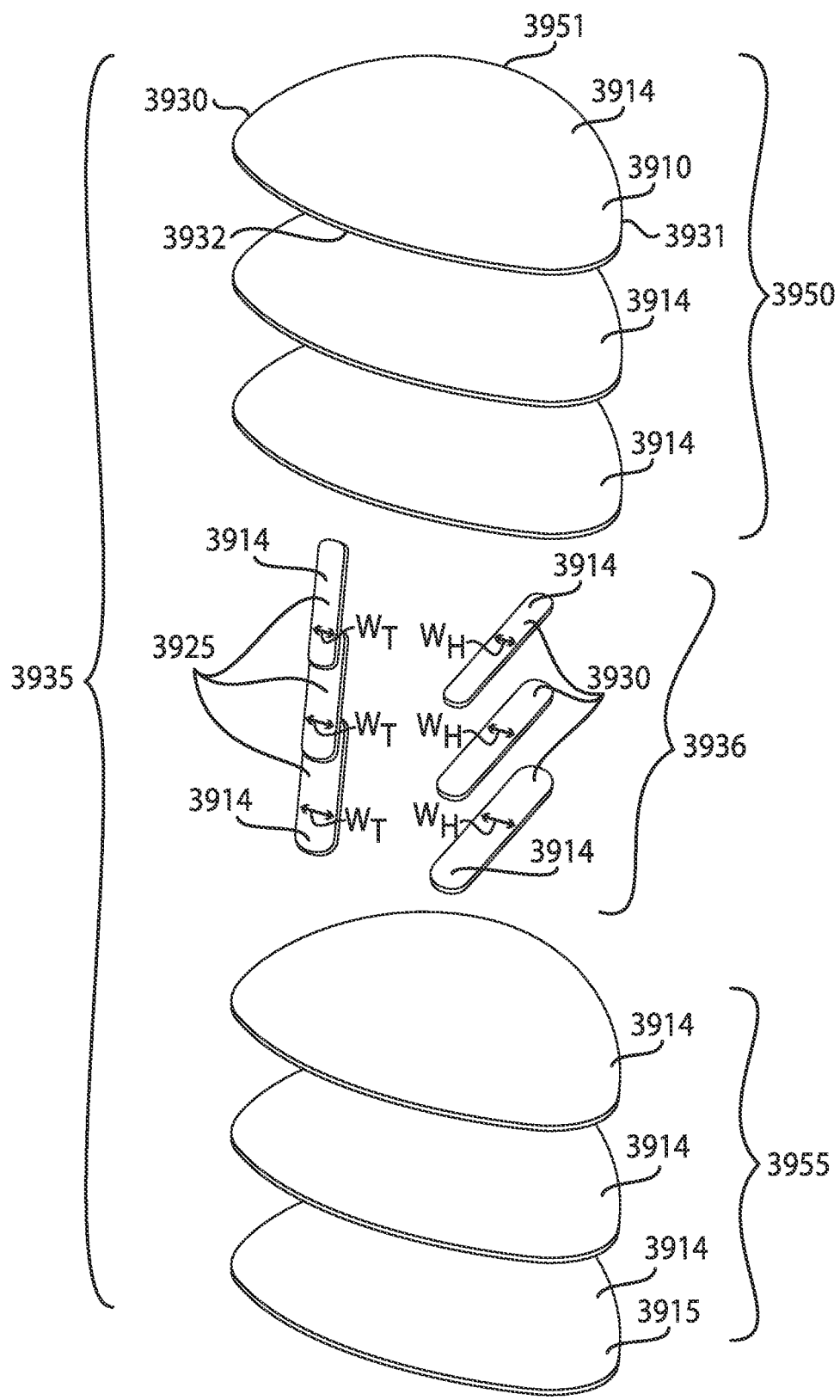
FIG. 39 depicts an exploded view of an example crown portion for an example golf club head.
Figure 40:
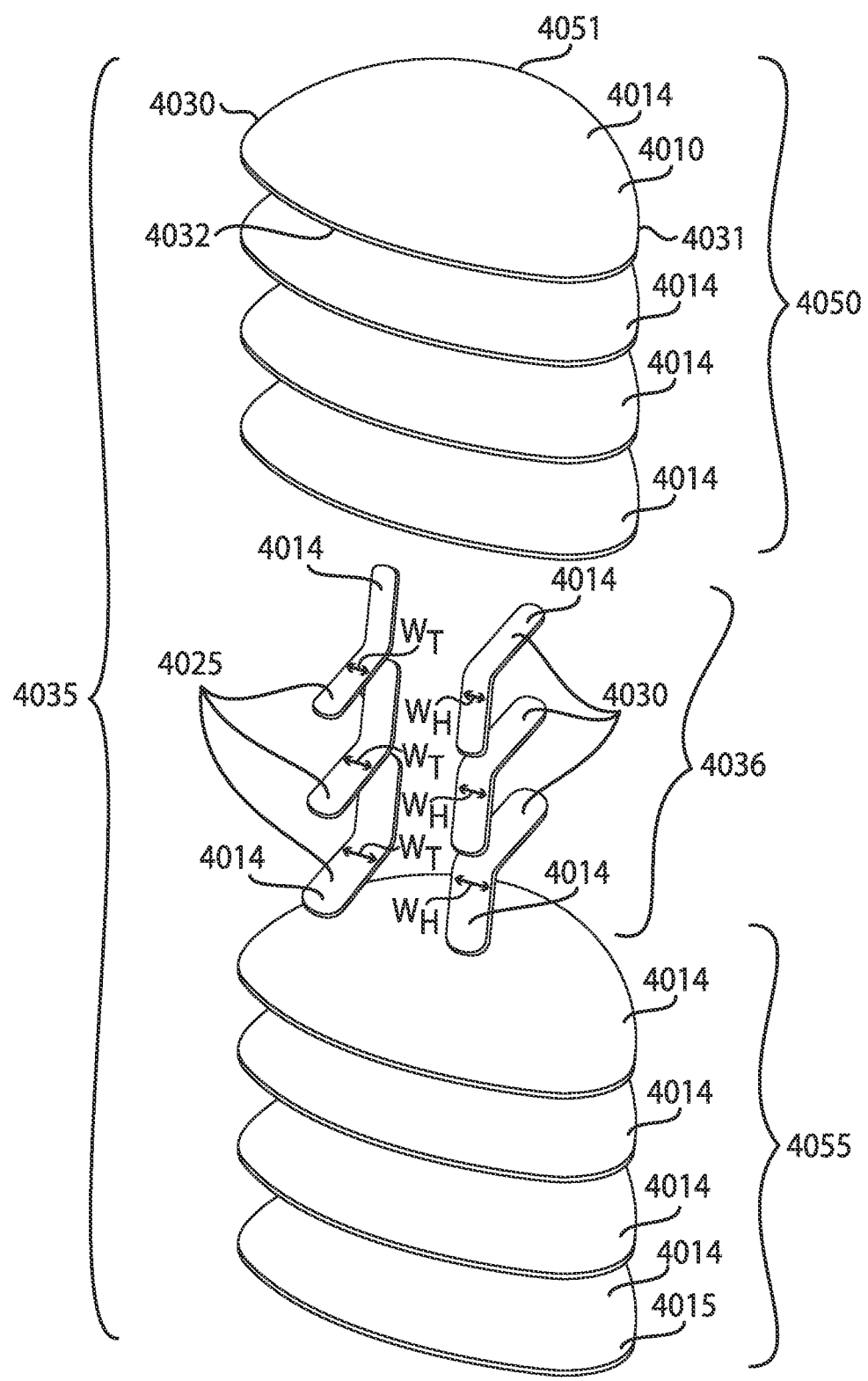
FIG. 40 depicts an exploded view of an example crown portion for an example golf club head.
Figure 41:
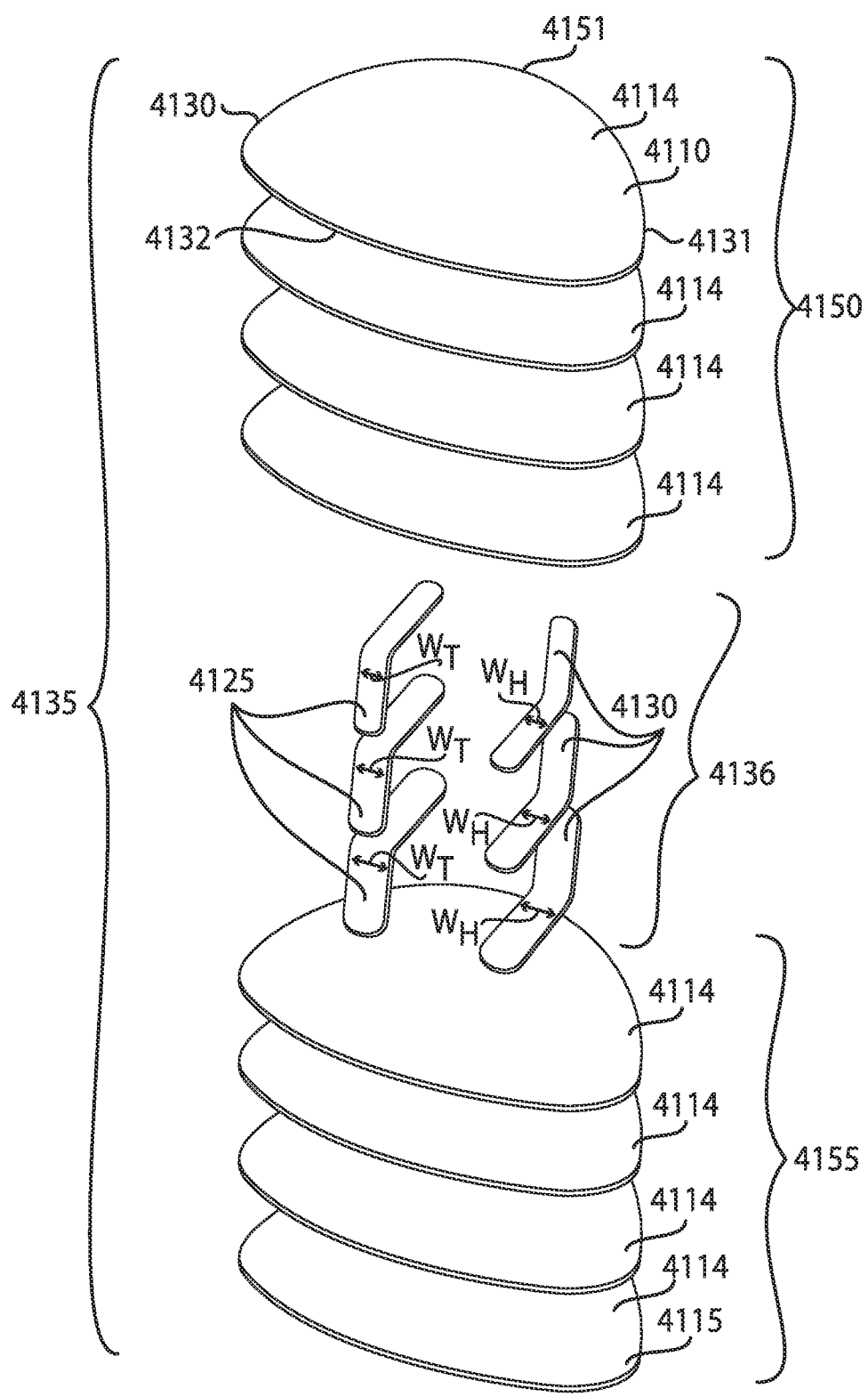
FIG. 41 depicts an exploded view of an example crown portion for an example golf club head.
Figure 42:
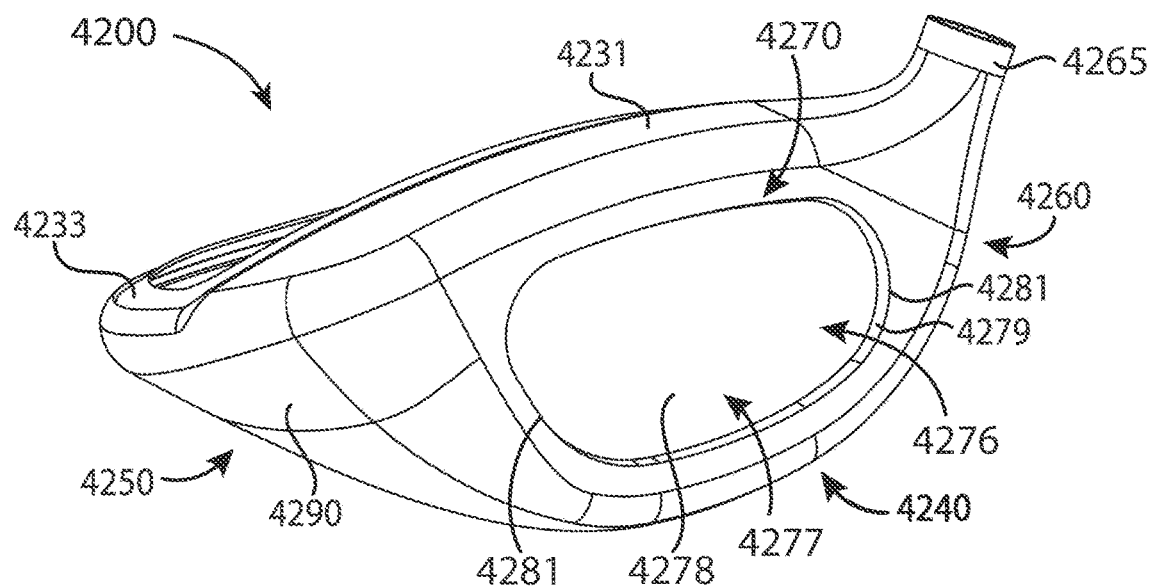
FIG. 42 is a front perspective view of an example golf club head according to an embodiment of the apparatus, methods, and articles of manufacture described herein.
Figure 43:
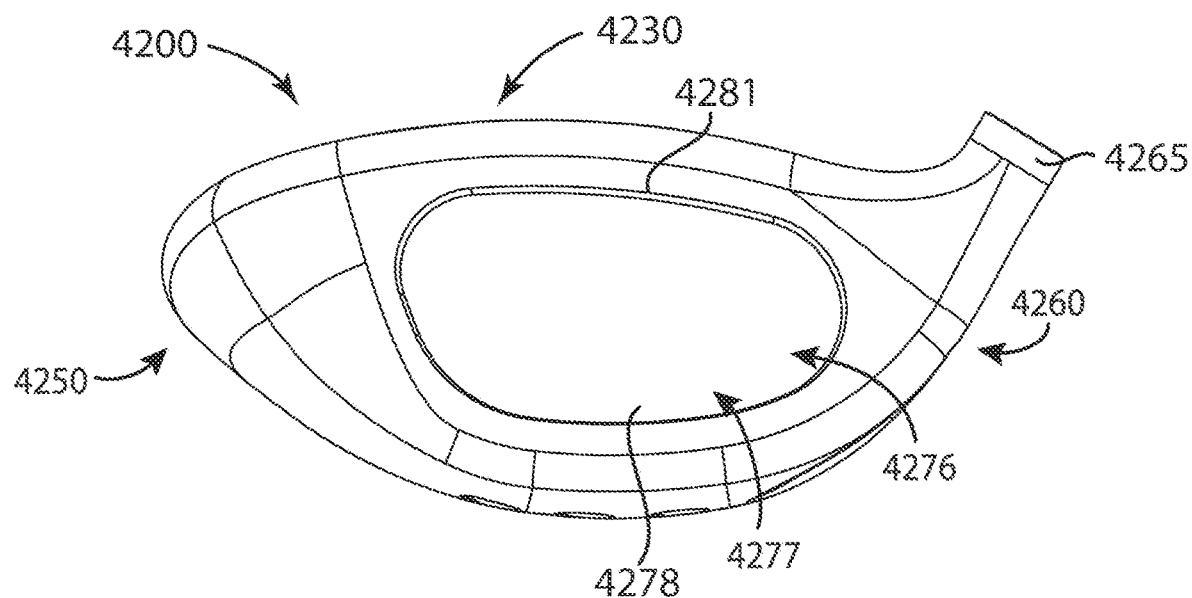
FIG. 43 depicts a front view of the example golf club head of FIG. 42.
Figure 44:
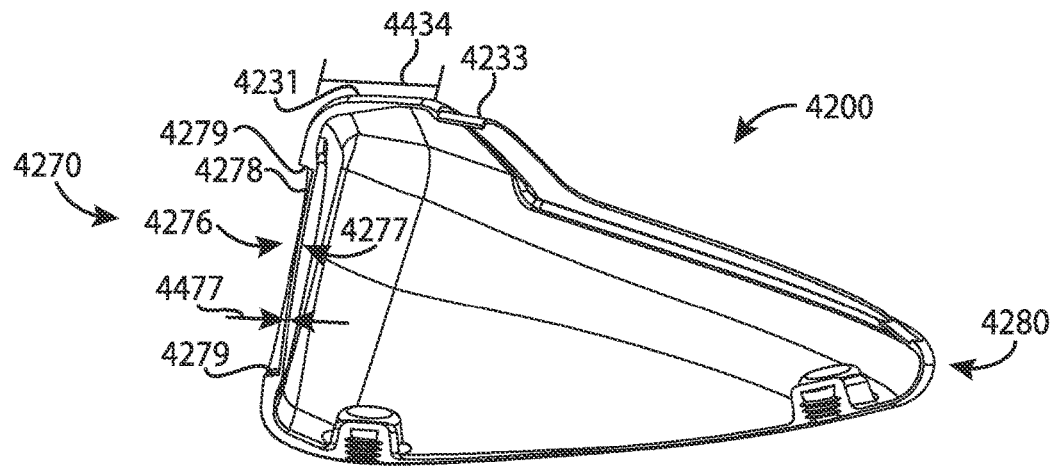
FIG. 44 depicts a side cross-sectional view of the example golf club head of FIG. 42.

In the example of FIG. 18, the crown portion 135 may include a central integral rib 1535, a toe-side integral rib 1525, and a heel-side integral rib 1530. The toe-side integral rib 1525 and the heel-side integral rib 1530 may diverge in a front-to-rear direction along the crown portion 135. In another example, as shown in FIG. 39, a toe-side integral rib 3925 and a heel-side integral rib 3930 may diverge in a front-to-rear direction along a crown portion 3935. In yet another example, a toe-side integral rib 4025 and a heel-side integral rib 4030 may converge and then diverge in a front-to-rear direction along a crown portion 4035, as shown in FIG. 40. In still another example, a toe-side integral rib 4125 and heel-side integral rib 4130 may diverge and then converge in a front-to-rear direction along a crown portion 4135, as shown in FIG. 41. In another example, the toe-side integral rib and heel-side integral rib may be substantially parallel in a front-to-rear direction along a crown portion. Although shown with substantially straight portions, the toe-side integral rib 1525 may include one or more curved portions along its length. Similarly, the heel-side rib 1530 may include one or more curved portions along its length. The apparatus, methods, and articles of manufacture described herein are not limited in this regard.

FIG. 39 shows an exploded view of layers 3914 of an example crown portion 3935 prior to executing a manufacturing process that yields a contoured crown portion. In one example, the crown portion 3935 may replace the crown portion 135 in the golf club head 100 of FIG. 1. The crown portion 3935 may include an upper plurality of composite layers 3950, a lower plurality of composite layers 3955, and a crown stiffening portion 3936 between the upper and lower pluralities of composite layers. The presence of the crown stiffening portion 3936 may allow for lightweight thin portions to be utilized adjacent to the crown stiffening portion 3936, which together may provide a crown portion 3935 that is lighter and/or stiffer than a crown portion having uniform thickness. A thin portion 1035 may be any region in the crown portion 3935 that does not include a crown stiffening portion 3936. The crown stiffening portion 3936 may include a toe-side integral rib 3925 and a heel-side integral rib 3930. The apparatus, methods, and articles of manufacture described herein are not limited in this regard.

The toe-side integral rib 3925 may be disposed between the inner layer 3915 and the outer layer 3910. The toe-side integral rib 3925 may be disposed between the upper plurality of composite layers 3950 and the lower plurality of composite layers 3955. The toe-side integral rib 3925 may include one or more layers of composite material 3914. The toe-side integral rib 3925 may include two or more layers of composite material 3914. The toe-side integral rib 3925 may extend from a front portion of the crown portion to a rear portion of the crown portion 3935. The toe-side integral rib 3925 may extend from a location at or proximate to a front perimeter 3932 of the crown portion 3935 to a location at or proximate to a rear perimeter 3951 of the crown portion 3935. The toe-side integral rib 3925 may extend from a location at or proximate to a front perimeter 3932 of the crown portion 3935 toward a toe-side perimeter 3933 of the crown portion 3935. The apparatus, methods, and articles of manufacture described herein are not limited in this regard.

The heel-side integral rib 3930 may be disposed between the inner layer 3915 and the outer layer 3910. The heel-side integral rib 3930 may be disposed between the upper plurality of composite layers 3950 and the lower plurality of composite layers 3955. The heel-side integral rib 3930 may include one or more layers of composite material 3914. The heel-side integral rib 3930 may include two or more layers of composite material 3914. The heel-side integral rib 3930 may extend from a front portion of the crown portion 3935 to a rear portion of the crown portion 3935. The heel-side integral rib 3930 may extend from a location at or proximate to a front perimeter 3932 of the crown portion 3935 to a location at or proximate to a rear perimeter 3951 of the crown portion 3935. The heel-side integral rib 3930 may extend from a location at or proximate to a front perimeter 3932 of the crown portion 3935 toward a heel-side perimeter 3931 of the crown portion 3935. The apparatus, methods, and articles of manufacture described herein are not limited in this regard.

The toe-side integral rib 3925 and the heel-side integral rib 3930 may diverge in a front-to-rear direction in the crown portion 3935. The upper plurality of composite layers 3950 may be similar to the upper plurality of composite layers 1850 described herein. The lower plurality of composite layers 3955 may be similar to the lower plurality of composite layers 1855 described herein. The outer layer 3910 may be similar to the outer layer 1810 described herein. The inner layer 3915 may be similar to the inner layer 1815 described herein. The crown portion 3935 may be incorporated into any of the golf club heads described herein (e.g. 100). The apparatus, methods, and articles of manufacture described herein are not limited in this regard.

During manufacturing of the crown portion 3935, a plurality of composite layers 3914, such as those depicted in FIG. 39, may be laid in a contoured mold. Pressure may be applied to the composite layers 3914 to encourage bonding of adjacent layers to form a contoured composite crown portion 3935. Heat may be applied to the layers 3914 to encourage bonding of adjacent layers to form the crown portion 3935. Pressing the composite layers 3914 against contoured surfaces of the mold may produce a raised central crown portion and contoured transition regions adjacent to the raised central crown portion. To ensure smooth transition regions adjacent to the raised central crown portion, each subsequent composite layer in the stack of composite layers forming the crown stiffening portion 3936 may become gradually wider (in descending order in the stack) to yield smooth transition regions in the manufactured crown portion 3935. In the example shown in FIG. 39, each composite layer of the toe-side integral rib 3925 may have a toe-side width (wT). Each composite layer of the heel-side integral rib 3930 may have a heel-side width (wH). In one example, a composite layer 3914 in the integral rib 3925 or 3930 may have a width (e.g. wH or wT) that is at least 1% greater than an adjacent composite layer 3914 in the integral rib 3925 or 3930. In another example, a composite layer 3914 in the integral rib 3925 or 3930 may have a width (e.g. wH or wT) that is at least 5% greater than an adjacent composite layer 3914 in the integral rib 3925 or 3930. In still another example, a composite layer 3914 in the integral rib 3925 or 3930 may have a width (e.g. wH or wT) that is at least 10% greater than a width of an adjacent composite layer 3914 in the integral rib 3925 or 3930. In yet another example, a composite layer 3914 in the integral rib 3925 or 3930 may have a width (wH or wT) that is at least 15% greater than an adjacent composite layer 3914 in the integral rib 3925 or 3930. In still yet another example, the composite layer 3914 in the integral rib 3925 or 3930 may have a width (wH or wT) that is at least 30% greater than an adjacent composite layer 3914 in the integral rib 3925 or 3930. The apparatus, methods, and articles of manufacture described herein are not limited in this regard.

FIG. 40 shows an exploded view of layers of an example crown portion 4035 prior to execution of a manufacturing process that yields a contoured crown portion. In one example, the crown portion 4035 may replace the crown portion 135 in the golf club head 100 of FIG. 1. The crown portion 4035 may include an upper plurality of composite layers 4050, a lower plurality of composite layers 4055, and a crown stiffening portion 4036 between the upper and lower pluralities of composite layers. The presence of the crown stiffening portion 4036 may allow for lightweight thin portions to be utilized adjacent to the crown stiffening portion 4036, which together may provide a crown portion 4035 that is lighter and/or stiffer than a crown portion with uniform thickness. A thin portion may be any region in the crown portion 4035 that does not include a crown stiffening portion 4036. The crown stiffening portion 4036 may include a toe-side integral rib 4025 and a heel-side integral rib 4030. The apparatus, methods, and articles of manufacture described herein are not limited in this regard.

The toe-side integral rib 4025 may be disposed between the inner layer 4015 and the outer layer 4010. The toe-side integral rib 4025 may be disposed between the upper plurality of composite layers 4050 and the lower plurality of composite layers 4055. The toe-side integral rib 4025 may include one or more layers of composite material 4014. The toe-side integral rib 4025 may include two or more layers of composite material 4014. The toe-side integral rib 4025 may extend from a front portion of the crown portion 4035 to a rear portion of the crown portion 4035. The toe-side integral rib 4025 may extend from a location at or proximate to a front perimeter 4032 of the crown portion 4035 to a location at or proximate to a rear perimeter 4051 of the crown portion 4035. The toe-side integral rib 4025 may extend from a location at or proximate to a front perimeter 4032 of the crown portion 4035 toward a toe-side perimeter 4033 of the crown portion 4035. The apparatus, methods, and articles of manufacture described herein are not limited in this regard.

The heel-side integral rib 4030 may be disposed between the inner layer 4015 and the outer layer 4010. The heel-side integral rib 4030 may be disposed between the upper plurality of composite layers 4050 and the lower plurality of composite layers 4055. The heel-side integral rib 4030 may include one or more layers of composite material 4014. The heel-side integral rib 4030 may include two or more layers of composite material 4014. The heel-side integral rib 4030 may extend from a front portion of the crown portion 4035 to a rear portion of the crown portion 4035. The heel-side integral rib 4030 may extend from a location at or proximate to a front perimeter 4032 of the crown portion 4035 to a location at or proximate to a rear perimeter 4051 of the crown portion 4035. The heel-side integral rib 4030 may extend from a location at or proximate to a front perimeter 4032 of the crown portion 4035 toward a heel-side perimeter 4031 of the crown portion 4035. The apparatus, methods, and articles of manufacture described herein are not limited in this regard.

The toe-side integral rib 4025 and the heel-side integral rib 4030 may converge and then diverge in a front-to-rear direction in the crown portion 4035. The toe-side integral rib 4025 may have a converging front portion and a diverging rear portion. The heel-side integral rib 4030 may have a converging front portion and a diverging rear portion. The upper plurality of composite layers 4050 may be similar to the upper plurality of composite layers 1850 described herein. The lower plurality of composite layers 4055 may be similar to the lower plurality of composite layers 1855 described herein. The outer layer 4010 may be similar to the outer layer 1810 described herein. The inner layer 4015 may be similar to the inner layer 1815 described herein. The crown portion 4035 may be incorporated into any of the golf club heads described herein (e.g. 100). The apparatus, methods, and articles of manufacture described herein are not limited in this regard.

During manufacturing of the crown portion 4035, a plurality of composite layers 4014, such as those depicted in FIG. 40, may be laid in a contoured mold. Pressure may be applied to the composite layers 4014 to encourage bonding of adjacent layers to form a contoured composite crown portion 4035. Heat may be applied to the layers 4014 to encourage bonding of adjacent layers to form the crown portion 4035. Pressing the composite layers 4014 against contoured surfaces of the mold may produce a raised central crown portion and contoured transition regions adjacent to the raised central crown portion. To ensure smooth transition regions adjacent to the raised central crown portion, each subsequent composite layer in the stack of composite layers forming the crown stiffening portion 4036 may become gradually wider (in descending order in the stack) to yield smooth transition regions in the manufactured crown portion 4035. In the example shown in FIG. 40, each composite layer of the toe-side integral rib 4025 may have a toe-side width (wT). Each composite layer of the heel-side integral rib 4030 may have a heel-side width (wH). In one example, a composite layer 4014 in the integral rib 4025 or 4030 may have a width (e.g. wH or wT) that is at least 1% greater than an adjacent composite layer 4014 in the integral rib 4025 or 4030. In another example, a composite layer 4014 in the integral rib 4025 or 4030 may have a width (e.g. wH or wT) that is at least 5% greater than an adjacent composite layer 4014 in the integral rib 4025 or 4030. In still another example, a composite layer 4014 in the integral rib 4025 or 4030 may have a width (e.g. wH or wT) that is at least 10% greater than a width of an adjacent composite layer 4014 in the integral rib 4025 or 4030. In yet another example, a composite layer 4014 in the integral rib 4025 or 4030 may have a width (wH or wT) that is at least 15% greater than an adjacent composite layer 3914 in the integral rib 4025 or 4030. In still yet another example, the composite layer 3914 in the integral rib 4025 or 4030 may have a width (wH or wT) that is at least 30% greater than an adjacent composite layer 3914 in the integral rib 4025 or 4030. The apparatus, methods, and articles of manufacture described herein are not limited in this regard.

FIG. 41 shows an exploded view of layers of an example crown portion 4135 prior to execution of a manufacturing process that yields a contoured crown portion. In one example, the crown portion 4135 may replace the crown portion 135 in the golf club head 100 of FIG. 1. The crown portion 4135 may include an upper plurality of composite layers 4150, a lower plurality of composite layers 4155, and a crown stiffening portion 4136 between the upper and lower pluralities of composite layers. The presence of the crown stiffening portion 4136 may allow for lightweight thin portions to be utilized adjacent to the crown stiffening portion 4136, which together may provide a crown portion 4135 that is lighter and/or stiffer than a crown portion with uniform thickness (e.g. 4835). A thin portion may be any region in the crown portion 4135 that does not include a crown stiffening portion 4136. The crown stiffening portion 4136 may include a toe-side integral rib 4125 and a heel-side integral rib 4130. The apparatus, methods, and articles of manufacture described herein are not limited in this regard.

The toe-side integral rib 4125 may be disposed between the inner layer 4115 and the outer layer 4110. The toe-side integral rib 4125 may be disposed between the upper plurality of composite layers 4150 and the lower plurality of composite layers 4155. The toe-side integral rib 4125 may include one or more layers of composite material 4114. The toe-side integral rib 4125 may include two or more layers of composite material 4114. The toe-side integral rib 4125 may extend from a front portion of the crown portion 4135 to a rear portion of the crown portion. The toe-side integral rib 4125 may extend from a location at or proximate to a front perimeter 4132 of the crown portion 4135 to a location at or proximate to a rear perimeter 4151 of the crown portion 4135. The toe-side integral rib 4125 may extend from a location at or proximate to a front perimeter 4132 of the crown portion 4135 toward a toe-side perimeter 4133 of the crown portion 4135. The apparatus, methods, and articles of manufacture described herein are not limited in this regard.

The heel-side integral rib 4130 may be disposed between the inner layer 4115 and the outer layer 4110. The heel-side integral rib 4130 may be disposed between the upper plurality of composite layers 4150 and the lower plurality of composite layers 4155. The heel-side integral rib 4130 may include one or more layers of composite material 4114. The heel-side integral rib 4130 may include two or more layers of composite material 4114. The heel-side integral rib 4130 may extend from a front portion of the crown portion 4135 to a rear portion of the crown portion. The heel-side integral rib 4130 may extend from a location at or proximate to a front perimeter 4132 of the crown portion 4135 to a location at or proximate to a rear perimeter 4151 of the crown portion 4135. The heel-side integral rib 4130 may extend from a location at or proximate to a front perimeter 4132 of the crown portion 4135 toward a heel-side perimeter 4131 of the crown portion 4135. The apparatus, methods, and articles of manufacture described herein are not limited in this regard.

The toe-side integral rib 4125 and the heel-side integral rib 4130 may diverge and then converge in a front-to-rear direction in the crown portion 4135. The toe-side integral rib 4125 may have a diverging front portion and a converging rear portion. The heel-side integral rib 4130 may have a diverging front portion and a converging rear portion. The upper plurality of composite layers 4150 may be similar to the upper plurality of composite layers 1850 described herein. The lower plurality of composite layers 4155 may be similar to the lower plurality of composite layers 1855 described herein. The outer layer 4110 may be similar to the outer layer 1810 described herein. The inner layer 4115 may be similar to the inner layer 1815 described herein. The crown portion 4135 may be incorporated into any of the golf club heads described herein. The apparatus, methods, and articles of manufacture described herein are not limited in this regard.

During manufacturing of the crown portion 4135, a plurality of composite layers 4114, such as those depicted in FIG. 41, may be laid in a contoured mold. Pressure may be applied to the composite layers 4114 to encourage bonding of adjacent layers to form a contoured composite crown portion 4135. Heat may be applied to the layers 4114 to encourage bonding of adjacent layers to form the crown portion 4035. Pressing the composite layers 4114 against contoured surfaces of the mold may produce a raised central crown portion and contoured transition regions adjacent to the raised central crown portion. To ensure smooth transition regions adjacent to the raised central crown portion, each subsequent composite layer in the stack of composite layers forming the crown stiffening portion 4136 may become gradually wider (in descending order in the stack) to yield smooth transition regions in the manufactured crown portion 4135. In the example shown in FIG. 41, each composite layer of the toe-side integral rib 4125 may have a toe-side width (wT). Each composite layer of the heel-side integral rib 4130 may have a heel-side width (wH). In one example, a composite layer 4114 in the integral rib (e.g. 4125, 4130) may have a width (e.g. wH or wT) that is at least 1% greater than an adjacent composite layer 4114 in the integral rib. In another example, a composite layer 4114 in the integral rib 4125 or 4130 may have a width (e.g. wH or wT) that is at least 5% greater than an adjacent composite layer 4114 in the integral rib 4125 or 4130. In still another example, a composite layer 4114 in the integral rib 4125 or 4130 may have a width (e.g. wH or wT) that is at least 10% greater than a width of an adjacent composite layer 4114 in the integral rib 4125 or 4130. In yet another example, a composite layer 4114 in the integral rib 4125 or 4130 may have a width (wH or wT) that is at least 15% greater than an adjacent composite layer 1514 in the integral rib 4125 or 4130. In still yet another example, the composite layer 4114 in the integral rib 4125 or 4130 may have a width (wH or wT) that is at least 30% greater than an adjacent composite layer 4114 in the integral rib 4125 or 4130. The apparatus, methods, and articles of manufacture described herein are not limited in this regard.

Figure 2:
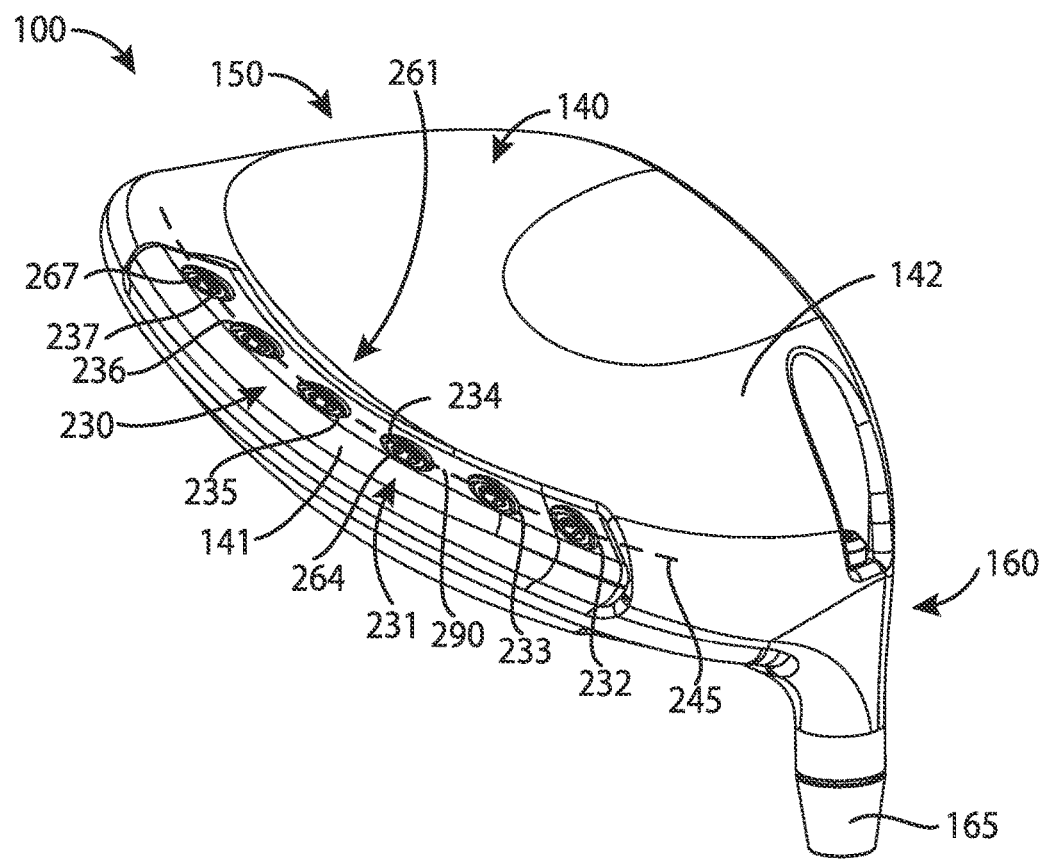
FIG. 2 depicts a bottom perspective view of the example golf club head of FIG. 1.

The body portion 110 may include a protruding portion 141, as show for example in FIG. 2. The protruding portion 141 may serve to lower the CG of the golf club head 100. The protruding portion 141 may serve to shift the CG rearward from the face portion 175 toward the rear portion 180. The protruding portion 141 may have an arcuate shape that follows a contour of the rear portion 180 of the body portion 110. The protruding portion 141 may extend from the skirt portion 190. The protruding portion 141 may extend from the bottom portion 140. The protruding portion 141 may extend from the rear portion 180. The protruding portion 141 may extend from the bottom portion 140 and the skirt portion 190. The protruding portion 141 may extend from the rear portion 180 and the bottom portion 140. The protruding portion 141 may extend from the rear portion 180 and the skirt portion 190. The protruding portion 141 may extend from the bottom portion 140, the skirt portion 190, and the rear portion 180. The apparatus, methods, and articles of manufacture described herein are not limited in this regard.

Figure 7:
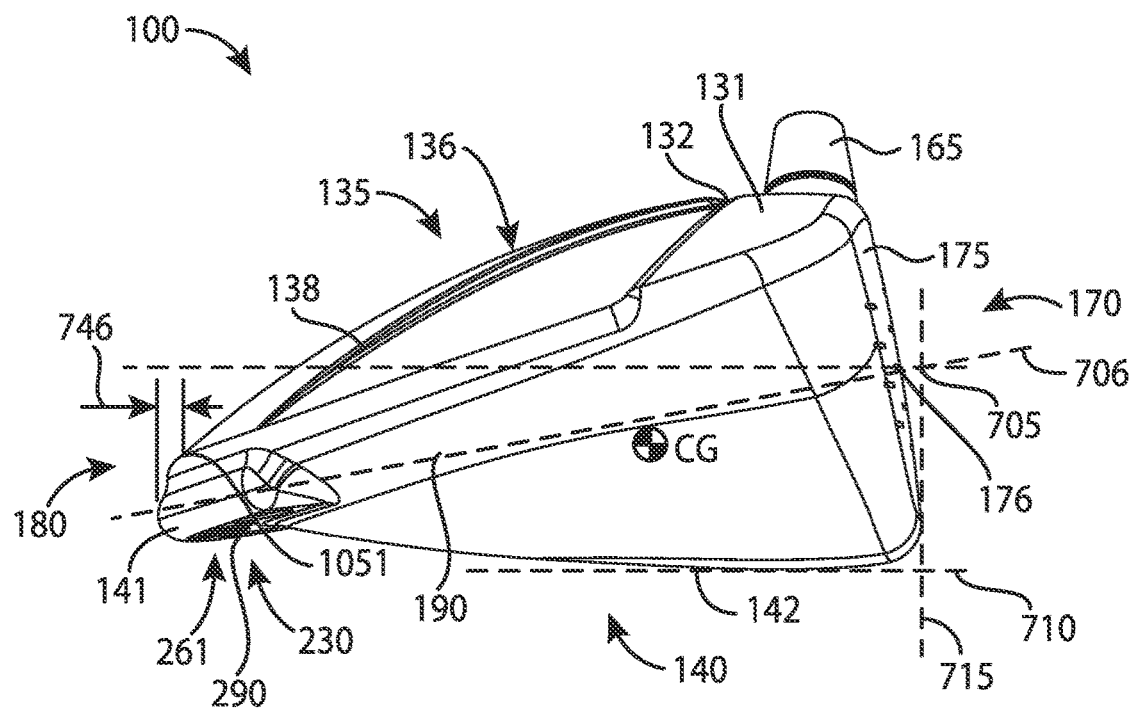
FIG. 7 depicts a toe view of the example golf club head of FIG. 1.
Figure 8:
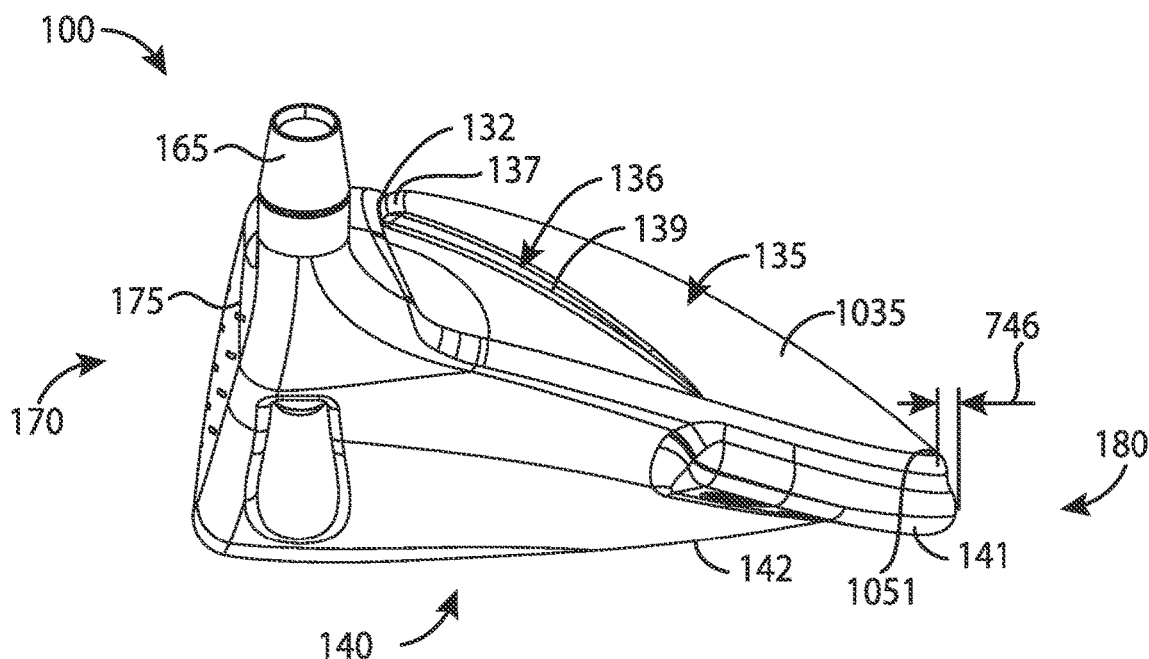
FIG. 8 depicts a heel view of the example golf club head of FIG. 1.

The protruding portion 141 may extend a distance 746 beyond a rear perimeter 951 of the crown portion 135, as shown in FIG. 7. In one example, the protruding portion 141 may extend rearward beyond a rear perimeter 951 of the crown portion 135 a distance of at least 2 mm. In another example, the protruding portion 141 may extend rearward beyond a rear perimeter 951 of the crown portion 135 a distance of at least 3 mm. In yet another example, the protruding portion 141 may extend rearward beyond a rear perimeter 951 of the crown portion 135 a distance of at least 5 mm. The protruding portion 141 may be located within a rear half of the golf club head 100. The protruding portion 141 may extend from the toe portion 150 to the heel portion 160. The apparatus, methods, and articles of manufacture described herein are not limited in this regard.

The protruding portion 141 may include a toe-side portion 281 proximate the toe portion 150. The toe-side portion 281 of the protruding portion 141 may include a toe-side perimeter portion 283 extending from the protruding portion 141 to the bottom portion 140. The protruding portion 141 may include a heel-side portion 282 proximate the heel portion 160. The heel-side portion 282 of the protruding portion 141 may include a heel-side perimeter portion 284 extending from the protruding portion 141 to the bottom portion 140. The apparatus, methods, and articles of manufacture described herein are not limited in this regard.

The neutral axis 706 of the golf club head 100 may intersect the protruding portion 141, as shown in FIG. 7. A portion of the protruding portion 141 may be located above the neutral axis 706. A portion of the protruding portion 141 may be located below the neutral axis 706. The protruding portion 141 may be concave relative to the front vertical plane 715. The protruding portion 141 may be concave relative to the front portion 170. The protruding portion 141 may be concave relative to the face portion 175. The protruding portion 141 may conform to a contour of the rear portion 180. The protruding portion 141 may have a bottom surface 290 that defines a first plane that is parallel to a second plane, where the second plane includes the neutral axis 706 and is normal to the central vertical plane 1504. The protruding portion 141 may be located within a rear third of the golf club head 100. The protruding portion 141 may be located below a horizontal mid-plane 705 of the golf club head 100. The horizontal mid-plane 705 may be parallel to and vertically offset from a ground plane 710 and may intersect the geometric center 176 of the face portion 175. The geometric center 176 may correspond to a midpoint of the face portion 175. The apparatus, methods, and articles of manufacture described herein are not limited in this regard.

Due to the location and mass of the protruding portion 141, the golf club head 100 may have a CG that is relatively low compared to other golf club heads. The low CG height may generate relatively low ball spin, which may be desirable to some individuals. In one example, the CG may be located along or proximate to a neutral axis 706 of the golf club head 100. In another example, the CG may be located below the neutral axis 706, as shown in FIG. 7. The CG may be located below and within 0.2 inch of the neutral axis 706. The CG may be located between and including about 0.1 inch and about 0.2 inch below the neutral axis 706. The CG may be located at least 0.1 inch below the neutral axis 706. The CG may be located at least 0.15 inch below the neutral axis 706. The apparatus, methods, and articles of manufacture described herein are not limited in this regard.

The protruding portion 141 may include one or more weight port regions. Each weight port region may include one or more weight ports. In one example, the protruding portion 141 may include a weight port region 230. The weight port region 230 may be formed in the bottom surface 290 of the protruding portion. The weight port region 230 may include a set of weight ports 231 (e.g., generally shown as weight ports 232, 233, 234, 235, 236, and 237). At least one of the weight ports may be formed in the toe-side portion 281 of the protruding portion 141. Two or more of the weight ports may be formed in the toe-side portion 281 of the protruding portion 141. At least one of the weight ports may be formed in the heel-side portion 282 of the protruding portion. Two or more one of the weight ports may be formed in the heel-side portion 282 of the protruding portion. Three or more of the weight ports may be formed in the heel-side portion 282 of the protruding portion. The weight ports 231 may be arranged along an arc 245. The arc 245 may follow a contour of the rear portion 180. The arc 245 may be concave relative to the front vertical plane 715. The weight port region 230 may extend more than 50% of a maximum toe-to-heel club head distance. The apparatus, methods, and articles of manufacture described herein are not limited in this regard.

The golf club head 100 may include a plurality of weight portions, shown as a set of weight portions 261 (generally shown as weight portions 262, 263, 264, 265, 266, and 267). One or more weight ports of the set of weight ports 231 may receive a weight portion. Each of the weight portions may be associated with a mass. In one example, the weight portions may be made of a tungsten-based material. In another example, the weight portions may be made of an aluminum-based material. In still another example, one or more weight ports of the set of weight ports 231 may not include a weight portion. The apparatus, methods, and articles of manufacture described herein are not limited in this regard.

As shown in FIG. 13, one or more of the weight ports (e.g. 233, 236) may include an opening that accesses an interior volume of the golf club head 100, which may facilitate adding a filler material to the interior volume of the golf club head 100. In one example, the interior volume of the golf club head 100 may be fully filled with filler material. In another example, the interior volume of the golf club head 100 may be partially filled with filler material. In yet another example, the interior volume of the golf club head may not be filled with filler material. The apparatus, methods, and articles of manufacture described herein are not limited in this regard.

The filler material may be an elastic polymer or elastomer material (e.g., a viscoelastic urethane polymer material such as Sorbothane® material manufactured by Sorbothane, Inc., Kent, Ohio), a thermoplastic elastomer material (TPE), a thermoplastic polyurethane material (TPU), and/or other suitable types of materials to absorb shock, isolate vibration, and/or dampen noise. In another example, the filler material may be a high density ethylene copolymer ionomer, a fatty acid modified ethylene copolymer ionomer, a highly amorphous ethylene copolymer ionomer, an ionomer of ethylene acid acrylate terpolymer, an ethylene copolymer comprising a magnesium ionomer, an injection moldable ethylene copolymer that may be used in conventional injection molding equipment to create various shapes, an ethylene copolymer that can be used in conventional extrusion equipment to create various shapes, and/or an ethylene copolymer having high compression and low resilience similar to thermoset polybutadiene rubbers. For example, the ethylene copolymer may include any of the ethylene copolymers associated with DuPont™ High-Performance Resin (HPF) family of materials (e.g., DuPont™ HPF AD1172, DuPont™ HPF AD1035, DuPont® HPF 1000 and DuPont™ HPF 2000), which are manufactured by E.I. du Pont de Nemours and Company of Wilmington, Delaware. The DuPont™ HPF family of ethylene copolymers are injection moldable and may be used with conventional injection molding equipment and molds, provide low compression, and provide high resilience. The apparatus, methods, and articles of manufacture described herein are not limited in this regard.

The characteristics (e.g., density, shape, volume, size, color, dimensions, depth, diameter, materials of construction, mass, method of formation, etc.) and/or any other properties of each weight portion of the plurality of weight portions and each weight port of the plurality of weight ports may be similar in any respect to any weight portion and weight port, respectively, of any of the golf club heads described herein. In one example, the weight ports and the weight portions of the golf club head of FIGS. 1-14 may have greater dimensions (e.g., length, width, diameter, depth, etc.) than any of the weight ports and/or weight portions, respectively, described herein. The apparatus, methods, and articles of manufacture described herein are not limited in this regard.

The set of weight portions 261 (e.g., generally shown as weight portions 262, 263, 264, 265, 266, and 267) may have similar or different masses. By using weight portions having similar or different masses in each of the weight ports, the overall mass in the weight port region 230 and/or the mass distribution in the weight port region 230 may be adjusted to generally optimize and/or adjust the swing weight, center of gravity, moment of inertia, and/or an overall feel of the golf club head 100 for an individual using the golf club head 100. In one example, the set of weight portions 261 may collectively have a mass of at least 8 grams. In another example, the set of weight portions 261 may collectively have a mass of at least 12 grams. In yet another example, the set of weight portions 261 may collectively have a mass of between and including 8 grams and 13 grams. In still yet another example, the set of weight portions 261 may collectively have a mass of between and including 12 grams and 16 grams. In still yet another example, the set of weight portions 261 may collectively have a mass of between and including 15 grams and 19 grams. In still yet another example, the set of weight portions 261 may collectively have a mass of between and including 18 grams and 22 grams. While the above examples may describe particular masses, the apparatus, methods, and articles of manufacture described herein may include the set of weight portions 261 to have an aggregate mass of less than 8 grams or an aggregate mass of greater than 19 grams. Further, the protruding portion 141, in combination with the set of weight portions 261, may have a mass of at least 15 grams. In another example, the protruding portion 141, in combination with the set of weight portions 261, may have a mass of at least 18 grams. In yet another example, the protruding portion 141, in combination with the set of weight portions 261, may have a mass of at least 24 grams. While the above examples may describe particular masses, the apparatus, methods, and articles of manufacture described herein may include the protruding portion 141 in combination with the set of weight portions 261 to have an aggregate mass of less than 15 grams. The apparatus, methods, and articles of manufacture described herein are not limited in this regard.

One or more of the weight ports 231 may have an axis that is tilted rearward of vertical. As shown by way of example in FIG. 9, the weight port 236 may have an axis 936 that is tilted rearward of vertical by an angle 938. This rearward tilted orientation of the weight port 236, relative to the front vertical plane 715, may allow the weight portion 266 to be positioned lower than if the weight port 236 were perpendicular to the bottom portion 140. The rearward tilted orientation of the weight port 236 may lower the CG of the golf club head 100. The rearward tilted orientation of the weight port 236 may shift the CG of the golf club head 100 rearward. In one example, the angle 938 may be at least 5 degrees. In another example, the angle 938 may be at least 10 degrees. In yet another example, the angle 938 may be at least 15 degrees. While the above examples may describe particular angles, the apparatus, methods, and article of manufacture may include the weight port 236 having a rearward tilted orientation of less than 5 degrees. The apparatus, methods, and articles of manufacture described herein are not limited in this regard.

The outer surface 142 and/or the inner surface 144 of the bottom portion 140 may include one or more inner support portions (not shown) and/or one or more outer support portion (not shown). The bottom portion 140 may have a thickness 145 of less than 1 mm. The bottom portion 140 may have a thickness 145 of less than 0.7 mm. The bottom portion 140 may have a thickness 145 of less than 0.6 mm. The apparatus, methods, and articles of manufacture described herein are not limited in this regard.

Certain regions of the interior of the body portion 110 of the golf club head 100 may include an elastic polymer material or an elastomer material, which may be referred to herein as the filler material. The filler material may dampen vibration, dampen noise, lower the center of gravity and/or provide a better feel and sound in response to the golf club head 100 striking a golf ball. The golf club head 100, may have one or more interior regions that may include a filler material as described herein. In one example, the filler material may be injected into the body portion 110 from one or more of the weight ports (e.g., generally shown as weight ports 232, 233, 234, 235, 236, and 237) as described herein. The apparatus, methods, and articles of manufacture described herein are not limited in this regard.

Although the crown portion 135 is depicted in conjunction with a driver-type golf club head in certain figures, it is not limited in this regard. The crown portion 135 may be resized for use in hybrid-type golf clubs as shown, for example, in FIGS. 19-26 and fairway wood-type golf clubs as shown, for example, in FIGS. 27-34. Any of the golf club heads described herein may include a crown portion with a crown stiffening portion as described herein. Any of the golf club heads described herein may include a crown portion with one or more integral ribs as described herein. Any of the golf club heads described herein may include a crown portion with a toe-side crown portion and a heel-side crown portion as described herein. Any of the golf club heads described herein may include a crown portion with a central crown portion, toe-side crown portion, and heel-side crown portion as described herein. Any of the golf club heads described herein may include a crown portion with one or more contoured transition regions as described herein. Any of the golf club heads described herein may include a multi-level crown portion as described herein. Any of the golf club heads described herein may include a raised central crown portion as described herein. Any of the golf club heads described herein may include a crown portion with multi-layer composite construction as described herein. The apparatus, methods, and articles of manufacture described herein are not limited in this regard.

In the example of FIGS. 19-26 and 37, the hybrid-type golf club head 1900 may include a body portion 1910 with a top portion 1930, a crown portion 1935, a bottom portion 1940, a toe portion 1950, a heel portion 1960, a front portion 1970, and a rear portion 1980. The bottom portion 1940 may include a skirt portion 1990 defined as a side portion of the golf club head 1900 between the top portion 1930 and the bottom portion 1940 excluding the front portion 1970 and extending across a periphery of the golf club head 1900 from the toe portion 1950, around the rear portion 1980, and to the heel portion 1960. Alternatively, the golf club head 1900 may not include the skirt portion 1990. The front portion 1970 may include a face portion 1975 to engage a golf ball (not shown). The face portion 1975 may be either integral to the body portion 1910 or a separate face portion that is coupled (e.g. welded) to the front portion 1970 to enclose an opening in the front portion 1970. The body portion 1910 may also include a hosel portion 1965 configured to receive a shaft portion. The hosel portion 1965 may be similar in many respects to any of the hosel portions described herein. The hosel portion 1965 may include an interchangeable hosel sleeve. Alternatively, the body portion 1910 may include a bore instead of the hosel portion 1965. The body portion 1910 may be made partially or entirely from any of the materials described herein. Further, the golf club head 1900 may be any type of golf club head having a club head volume similar to the club head volume of any of the golf club heads described herein. The apparatus, methods, and articles of manufacture described herein are not limited in this regard.

The top portion 1930 may include a forward portion 1911 extending between the front portion 1970 and the crown portion 1935. In one example, the forward portion 1911 may extend a distance 2434 of at least 12 mm in a front-to-rear direction. In another example, the forward portion 1911 may extend a distance 2434 of at least 16 mm in a front-to-rear direction. In yet another example, the forward portion 1911 may extend a distance 2434 of at least 20 mm in a front-to-rear direction. While the above examples may describe particular distances, the apparatus, methods, and articles of manufacture described herein may include a forward portion extending a distance less than 12 mm in a front-to-rear direction. The forward portion 1911 may enhance structural integrity of the golf club head 1900 and resist rearward deflection of the front portion 1970 during impact with a golf ball. The apparatus, methods, and articles of manufacture described herein are not limited in this regard.

The crown portion 1935 may include a central crown portion 1931. The crown portion 1935 may include a toe-side crown portion 1932. The crown portion 1935 may include a heel-side crown portion 1933. A first contoured transition region 1921 may separate the central crown portion 1931 and the toe-side crown portion 1932. A second contoured transition region 1922 may separate the central crown portion 1931 and the heel-side crown portion 1933. The crown portion 1935 may include a central integral rib 1915, a toe-side integral rib 1916, and a heel-side integral rib 1917. The central integral rib 1915 may be disposed within the crown portion 1935 proximate to a front perimeter 1903 of the crown portion. The toe-side integral rib 1916 may be disposed within the crown portion 1935 proximate to the first contoured transition region 1921. The heel-side integral rib 1917 may be disposed within the crown portion 1935 proximate to the second contoured transition region 1922. The toe-side crown portion 1932 may be bounded by a front perimeter 1903 of the crown portion 1935, a toe-side perimeter 1901 of the crown portion, and the first contoured transition region 1921. The heel-side crown portion 1933 may be bounded by the front perimeter 1903, a heel-side perimeter 1902 of the crown portion, and the second contoured transition region 1922. The central crown portion 1931 may extend between the first contoured transition region 1921 and the second contoured transition region 1922. The central crown portion 2731 may be bounded by a rear perimeter 1904 of the crown portion. In one example, the central crown portion 1931 may have a surface area greater than 2 square inches. In another example, the central crown portion 1931 may have a surface area between and including 2 and 4 square inches. In yet another example, the central crown portion 1931 may have a surface area between and including 2.2 and 3.5 square inches. In still another example, the central crown portion 1931 may have a surface area between and including 2.5 and 3.2 square inches. In one example, the toe-side crown portion 1932 may have a surface area between and including 0.2 and 1.5 square inches. In another example, the toe-side crown portion 1932 may have a surface area between and including 0.2 and 1.2 square inches. In yet another example, the toe-side crown portion 1932 may have a surface area between and including 0.3 and 0.8 square inches. In still another example, the toe-side crown portion 1932 may have a surface area between and including 0.4 and 0.5 square inches. While the above examples may describe particular surface areas, the apparatus, methods, and articles of manufacture described herein may include the toe-side crown portion 1932 having a surface area greater than 4 square inches. The apparatus, methods, and articles of manufacture described herein are not limited in this regard.

Figure 37:
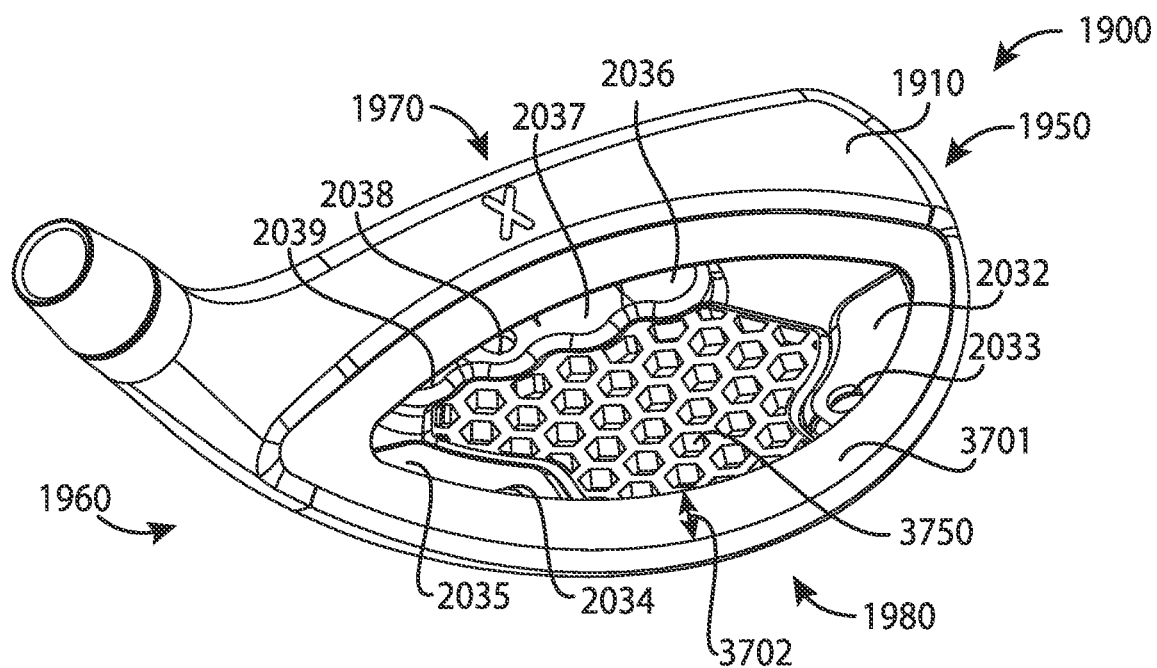
FIG. 37 depicts a rear perspective view of the example golf club head of FIG. 19 prior to attachment of a crown portion.

In the example in FIG. 37, the hybrid-type golf club head 1900 is shown prior to attachment of the crown portion 1935. The crown portion 1935 may be attached to a shoulder portion 3701 of the top portion 1930. The shoulder portion 3701 may extend along all or a portion of the opening in the top portion 1930. The shoulder portion 3701 may support the crown portion 1935. In one example, the shoulder portion 3701 may extend a distance 3702 of at least 2 mm inward toward the opening in the top portion 1930. In another example, the shoulder portion 3701 may extend a distance 3702 of at least 6 mm. In yet another example, the shoulder portion 3701 may extend a distance 3702 of at least 8 mm. In still another example, the shoulder portion 3701 may extend a distance 3702 of between and including 2 mm and 8 mm. While the above examples may describe particular distances, the apparatus, methods, and articles of manufacture described herein may include a shoulder portion 3701 that extends a distance 3702 less than 2 mm inward toward the opening in the top portion 1930. The shoulder portion 3701 may be a continuous portion encircling the opening in the top portion 1930. Alternately, the shoulder portion 3701 may include one or more discrete shoulder portions arranged to support the crown portion 1935. In another example, the shoulder portion 3701 may include a plurality of tabs arranged to support the crown portion 1935. In still another example, the shoulder portion 3701 may be omitted, and the crown portion 1935 may be adhered to an outer surface of the top portion 1930 or to an inner surface of the top portion 1930. In yet another example, the shoulder portion 3701 may be omitted, and the crown portion 1935 may include a protrusion extending from a bottom surface of the crown portion 1935 that provides an interference fit with a perimeter edge of the opening. The apparatus, methods, and articles of manufacture described herein are not limited in this regard.

As shown in FIG. 37, an insert 3750 may be provided within an interior region of the golf club head 1900. The insert 3750 may dampen vibrations within the golf club head 1900 resulting from impact with a golf ball, which may improve sound or feel perceived by an individual. The insert 3750 may be an elastic polymer or elastomer material (e.g., a viscoelastic urethane polymer material such as Sorbothane® material manufactured by Sorbothane, Inc., Kent, Ohio), a thermoplastic elastomer material (TPE), a thermoplastic polyurethane material (TPU), and/or other suitable types of materials to absorb shock, isolate vibration, and/or dampen noise. In another example, the insert 3750 may be a high density ethylene copolymer ionomer, a fatty acid modified ethylene copolymer ionomer, a highly amorphous ethylene copolymer ionomer, an ionomer of ethylene acid acrylate terpolymer, an ethylene copolymer comprising a magnesium ionomer, an injection moldable ethylene copolymer that may be used in conventional injection molding equipment to create various shapes, an ethylene copolymer that can be used in conventional extrusion equipment to create various shapes, and/or an ethylene copolymer having high compression and low resilience similar to thermoset polybutadiene rubbers. For example, the ethylene copolymer may include any of the ethylene copolymers associated with DuPont™ High-Performance Resin (HPF) family of materials (e.g., DuPont™ HPF AD1172, DuPont™ HPF AD1035, DuPont® HPF 1000 and DuPont™ HPF 2000), which are manufactured by E.I. du Pont de Nemours and Company of Wilmington, Delaware. The DuPont™ HPF family of ethylene copolymers are injection moldable and may be used with conventional injection molding equipment and molds, provide low compression, and provide high resilience. The apparatus, methods, and articles of manufacture described herein are not limited in this regard.

The insert 3750 may be bonded, attached and/or connected to the golf club head 1900 by a bonding portion (not shown) to improve adhesion and/or mitigate delamination between the body portion of the golf club head 1900 and the insert 3750. In one example, the insert 3750 may be bonded, attached, and/or connected to an interior surface of the bottom portion 1940. The bonding portion may be a bonding agent, an epoxy, a combination of bonding agents, a bonding structure or attachment device, a combination of bonding structures and/or attachment devices, and/or a combination of one or more bonding agents, one or more bonding structures and/or one or more attachment devices. In one example, the bonding portion may be low-viscosity, organic, solvent-based solutions and/or dispersions of polymers and other reactive chemicals such as MEGUM™, ROBOND™, and/or THIXON™ materials manufactured by the Dow Chemical Company, Auburn Hills, Michigan. In another example, the bonding portion may be LOCTITE® materials manufactured by Henkel Corporation, Rocky Hill, Connecticut. The apparatus, methods, and articles of manufacture are not limited in this regard.

The golf club head 1900 may include a set of weight ports (e.g. 2032-2039) located in a bottom portion 1940 of the golf club head 1900. Each weight port may contain a weight portion (e.g. 2070-2077). The set of weight ports may include a first plurality of weight ports 2001, a second plurality of weight ports 2002, and a third plurality of weight ports 2003. The first set of weight ports 2001 may be located closer to the front portion 1970 than the rear portion 1980. The second set of weight ports 2002 may be located closer to the heel portion 1960 than the toe portion 1950. The second set of weight ports 2002 may be located closer to the rear portion 1980 than the front portion 1970. The second set of weight ports 2002 may be located closer to the rear portion 1980 than the first set of weight ports 2001. The second set of weight ports 2002 may have at least one weight port that is closer to the toe portion 1950 than any weight port of the first set of weight ports 2001. The third set of weight ports 2003 may be located closer to the toe portion 1950 than the heel portion 1960. The third set of weight ports 2003 may be located closer to the rear portion 1980 than the front portion 1970. The third set of weight ports 2003 may be located closer to the rear portion 1980 than the first set of weight ports 2001. The third set of weight ports 2003 may have a weight port that is closer to the heel portion 1960 than any weight port of the first set of weight ports 2001. The first set of weight ports 2001 may include one or more weight portions having a mass greater than or equal to about 3.5 grams. The first set of weight ports 2001 may include one or more weight portions having a mass greater than or equal to about 4 grams. The second set of weight ports 2002 may include one or more weight portions having a mass greater than or equal to about 0.5 gram. The second set of weight ports 2002 may include one or more weight portions having a mass greater than or equal to about 0.75 gram. The third set of weight ports 2003 may include one or more weight portions having a mass greater than or equal to about 0.5 gram. The third set of weight ports 2003 may include one or more weight portions having a mass greater than or equal to about 0.75 gram. The second set of weight ports 2002 and third set of weight ports 2003 may collectively have an equal number of weight ports as the first set of weight ports 2001. The apparatus, methods, and articles of manufacture are not limited in this regard.

As shown in FIG. 37, the insert 3750 may extend from the first set of weight ports 2001 toward the rear portion 1980 of the golf club head 1900. The insert 3750 may extend from the first set of weight ports 2001 to the rear portion 1980 of the golf club head 1900. The insert 3750 may extend between the second set of weight ports 2002 and the third set of weight ports 2003. The insert 3750 may extend between the first set of weight ports 2001, the second set of weight ports 2002, and the third set of weight ports 2003. The insert 3750 may include a plurality of hexagonal holes that extend through or partially through the thickness of the insert 3750. The hexagonal holes may be arranged on the insert 3750 to define a pattern similar to a honeycomb pattern. The apparatus, methods, and articles of manufacture described herein are not limited in this regard.

In the example of FIGS. 27-34 and 38, the fairway wood-type golf club head 2700 may include a body portion 2710 with a top portion 2730, a crown portion 2735, a bottom portion 2740, a toe portion 2750, a heel portion 2760, a front portion 2770, and a rear portion 2780. The bottom portion 2740 may include a skirt portion 2790 defined as a side portion of the golf club head 2700 between the top portion 2730 and the bottom portion 2740 excluding the front portion 2770 and extending across a periphery of the golf club head 2700 from the toe portion 2750, around the rear portion 2780, and to the heel portion 2760. Alternatively, the golf club head 2700 may not include the skirt portion 2790. The front portion 2770 may include a face portion 2775 to engage a golf ball (not shown). The face portion 2775 may be either integral to the body portion 2710 or a separate face portion that is coupled (e.g., welded) to the front portion 2770 to enclose an opening in the front portion 2770. The body portion 2710 may also include a hosel portion 2765 configured to receive a shaft portion. The hosel portion 2765 may be similar in many respects to any of the hosel portions described herein. The hosel portion 2765 may include an interchangeable hosel sleeve. Alternatively, the body portion 2710 may include a bore instead of the hosel portion 2765. The body portion 2710 may be made partially or entirely from any of the materials described herein. Further, the golf club head 2700 may be any type of golf club head having a club head volume similar to the club head volume of any of the golf club heads described herein. The apparatus, methods, and articles of manufacture are not limited in this regard.

The top portion 2730 may include a forward portion 2711 extending between the front portion 2770 and the crown portion 2735. In one example, the forward portion 2711 may extend a distance 3234 of at least 12 mm in a front-to-rear direction. In another example, the forward portion 1911 may extend a distance 3234 of at least 16 mm in a front-to-rear direction. In yet another example, the forward portion 2711 may extend a distance 3234 of at least 20 mm in a front-to-rear direction. While the above examples may describe particular distances, the apparatus, methods, and articles of manufacture described herein may include a forward portion extending a distance less than 12 mm in a front-to-rear direction. The forward portion 2711 may enhance structural integrity of the golf club head 2700 and resist rearward deflection of the front portion 2770 during impact with a golf ball. The apparatus, methods, and articles of manufacture described herein are not limited in this regard.

The crown portion 2735 may include a central crown portion 2731. The crown portion 2735 may include a toe-side crown portion 2732. The crown portion 2735 may include a heel-side crown portion 2733. A first contoured transition region 2721 may separate the central crown portion 2731 and the toe-side crown portion 2732. A second contoured transition region 2722 may separate the central crown portion 2731 and the heel-side crown portion 2733. The crown portion 2735 may include a central integral rib 2715. The crown portion 2735 may include a toe-side integral rib 2716. The crown portion 2735 may include a heel-side integral rib 2717. The central integral rib 2715 may be disposed within the crown portion 2735 proximate to a front perimeter 2703 of the crown portion. The toe-side integral rib 2716 may be disposed within the crown portion 2735 proximate to the first contoured transition region 2721. The heel-side integral rib 2717 may be disposed within the crown portion 2735 proximate to the second contoured transition region 2722. The apparatus, methods, and articles of manufacture are not limited in this regard.

The central crown portion 2731 may extend between the first contoured transition region 2721 and the second contoured transition region 2722. The central crown portion 2731 may be bounded by a rear perimeter 2704 of the crown portion 2735. The central crown portion 2731 may be bounded by the front perimeter 2703 of the crown portion 2735. The central crown portion 2731 may be raised relative to the toe-side crown portion 2732. The central crown portion 2731 may be raised relative to the heel-side crown portion 2733. In one example, the central crown portion 2731 may have a surface area greater than 3 square inches. In another example, the central crown portion 2731 may have a surface area between and including 2.5 and 6 square inches. In yet another example, the central crown portion 2731 may have a surface area between and including 3.0 and 4.5 square inches. In still another example, the central crown portion 2731 may have a surface area between and including 3.2 and 4.2 square inches. The apparatus, methods, and articles of manufacture are not limited in this regard.

The toe-side crown portion 2732 may be bounded by a front perimeter 2703 of the crown portion 2735. The toe-side crown portion 2732 may be bounded by a toe-side perimeter 2701 of the crown portion 2735. The toe-side crown portion 2732 may be bounded by the first contoured transition region 2721. In one example, the toe-side crown portion 2732 may have a surface area between and including 0.4 and 2.3 square inches. In another example, the toe-side crown portion 2732 may have a surface area between and including 0.8 and 1.5 square inches. In yet another example, the toe-side crown portion 2732 may have a surface area between and including 1.0 and 1.4 square inches. In still another example, the toe-side crown portion 2732 may have a surface area between and including 1.1 and 1.3 square inches. While the above examples may describe particular surface areas, the apparatus, methods, and articles of manufacture described herein may include the toe-side crown portion 2732 having a surface area greater than 2.3 square inches. The apparatus, methods, and articles of manufacture are not limited in this regard.

The heel-side crown portion 2733 may be bounded by the front perimeter 2703 of the crown portion 2735. The heel-side crown portion 2733 may be bounded by a heel-side perimeter 2702 of the crown portion 2735. The heel-side crown portion 2733 may be bounded by the second contoured transition region 2722. In one example, the heel-side crown portion 2733 may have a surface area less than 2 square inches. In another example, the heel-side crown portion 2733 may have a surface area between and including 0.2 and 1 square inches. In yet another example, the heel-side crown portion 2733 may have a surface area between and including 0.2 and 0.8 square inches. In still another example, the heel-side crown portion 2733 may have a surface area between and including 0.3 and 0.6 square inches. While the above examples may describe particular surface areas, the apparatus, methods, and articles of manufacture described herein may include the heel-side crown portion 2733 having a surface area greater than 2 square inches. The apparatus, methods, and articles of manufacture described herein are not limited in this regard.

Figure 38:
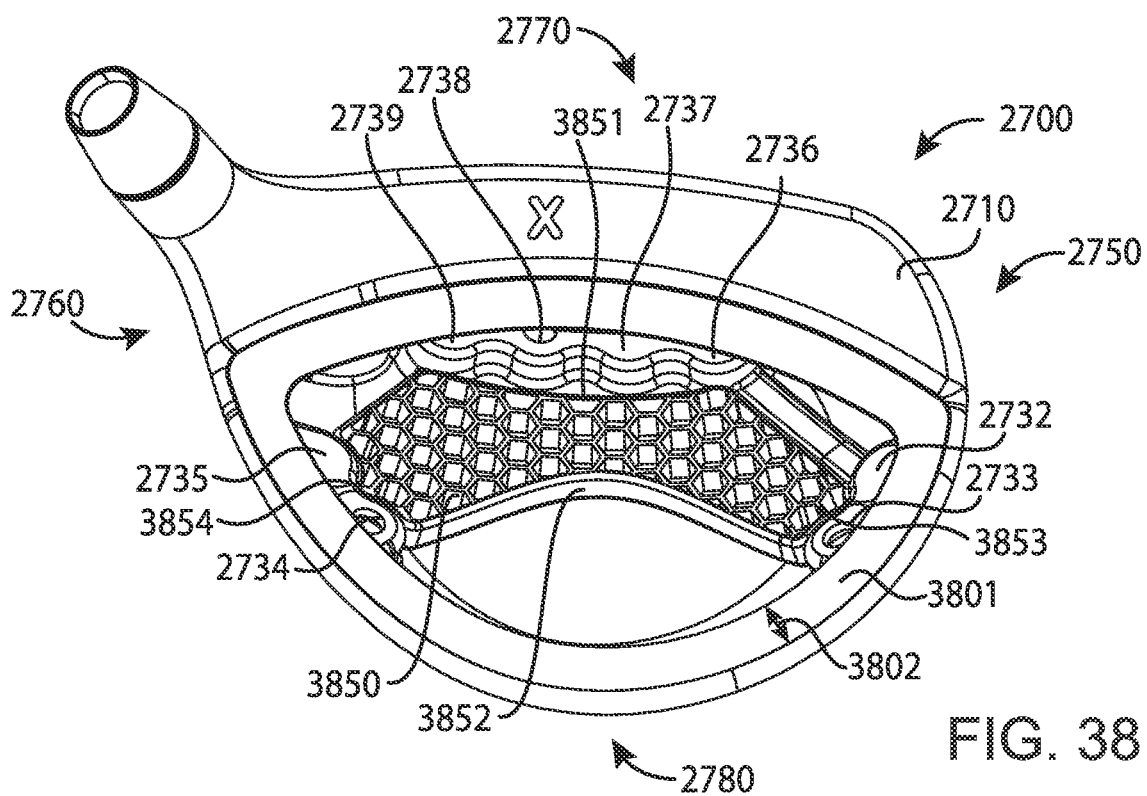
FIG. 38 depicts a rear perspective view of the example golf club head of FIG. 27 prior to attachment of a crown portion.

As shown in FIG. 38, an insert 3850 may be provided within an interior region of the golf club head 2700. The insert 3850 may dampen vibrations within the golf club head 2700 resulting from impact with a golf ball, which may improve sound or feel perceived by an individual. The insert 3850 may be an elastic polymer or elastomer material (e.g., a viscoelastic urethane polymer material such as Sorbothane® material manufactured by Sorbothane, Inc., Kent, Ohio), a thermoplastic elastomer material (TPE), a thermoplastic polyurethane material (TPU), and/or other suitable types of materials to absorb shock, isolate vibration, and/or dampen noise. In another example, the insert 3850 may be a high density ethylene copolymer ionomer, a fatty acid modified ethylene copolymer ionomer, a highly amorphous ethylene copolymer ionomer, an ionomer of ethylene acid acrylate terpolymer, an ethylene copolymer comprising a magnesium ionomer, an injection moldable ethylene copolymer that may be used in conventional injection molding equipment to create various shapes, an ethylene copolymer that can be used in conventional extrusion equipment to create various shapes, and/or an ethylene copolymer having high compression and low resilience similar to thermoset polybutadiene rubbers. For example, the ethylene copolymer may include any of the ethylene copolymers associated with DuPont™ High-Performance Resin (HPF) family of materials (e.g., DuPont™ HPF AD1172, DuPont™ HPF AD1035, DuPont® HPF 1000 and DuPont™ HPF 2000), which are manufactured by E.I. du Pont de Nemours and Company of Wilmington, Delaware. The DuPont™ HPF family of ethylene copolymers are injection moldable and may be used with conventional injection molding equipment and molds, provide low compression, and provide high resilience. The apparatus, methods, and articles of manufacture described herein are not limited in this regard.

The insert 3850 may be bonded, attached and/or connected to the golf club head 2700 by a bonding portion (not shown) to improve adhesion and/or mitigate delamination between the body portion of the golf club head 2700 and the insert 3850. In one example, the insert 3850 may be bonded, attached and/or connected to an interior surface of the bottom portion 2740. The bonding portion may be a bonding agent, an epoxy, a combination of bonding agents, a bonding structure or attachment device, a combination of bonding structures and/or attachment devices, and/or a combination of one or more bonding agents, one or more bonding structures and/or one or more attachment devices. In one example, the bonding portion may be low-viscosity, organic, solvent-based solutions and/or dispersions of polymers and other reactive chemicals such as MEGUM™, ROBOND™, and/or THIXON™ materials manufactured by the Dow Chemical Company, Auburn Hills, Michigan. In another example, the bonding portion may be LOCTITE® materials manufactured by Henkel Corporation, Rocky Hill, Connecticut. The apparatus, methods, and articles of manufacture are not limited in this regard.

The golf club head 2700 may include a set of weight ports (e.g. 2832-2839) located in a bottom portion 2740 of the golf club head 2700. The set of weight ports may include a first plurality of weight ports 2801. The set of weight ports may include a second plurality of weight ports 2802. The set of weight ports may include a third plurality of weight ports 2803. Each weight port of the set of weight ports may contain a weight portion (e.g. 2865-2872). The first set of weight ports 2801 may be located closer to the front portion 2770 than the rear portion 2780. The second set of weight ports 2802 may be located closer to the heel portion 2760 than the toe portion 2750. The second set of weight ports 2802 may be located closer to the rear portion 2780 than the front portion 2770. At least one weight port of the second set of weight ports 2802 may be located closer to the heel portion 2760 than any of the weight ports of the first set of weight ports 2801. The second set of weight ports 2802 may be located closer to the heel portion 2760 than any of the weight ports of the first set of weight ports 2801. The third set of weight ports 2803 may be located closer to the toe portion 2750 than the heel portion 2760. The third set of weight ports 2803 may be located closer to the rear portion 2780 than the front portion 2770. At least one weight port of the third set of weight ports 2803 may be located closer to the toe portion 2750 than any of the weight ports of the first set of weight ports 2801. The third set of weight ports 2803 may be located closer to the toe portion 2750 than any of the weight ports of the first set of weight ports 2801. The apparatus, methods, and articles of manufacture are not limited in this regard.

The first set of weight ports 2801 may include one or more weight portions having a mass greater than or equal to about 3.5 grams. The first set of weight ports 2801 may include one or more weight portions having a mass greater than or equal to about 4 grams. The second set of weight ports 2802 may include one or more weight portions having a mass greater than or equal to about 0.5 gram. The second set of weight ports 2802 may include one or more weight portions having a mass greater than or equal to about 0.75 gram. The third set of weight ports 2803 may include one or more weight portions having a mass greater than or equal to about 0.5 gram. The third set of weight ports 2803 may include one or more weight portions having a mass greater than or equal to about 0.75 gram. The apparatus, methods, and articles of manufacture are not limited in this regard.

As shown in FIG. 38, for example, the insert 3850 may extend from the first set of weight ports 2801 toward the rear portion 2780 of the golf club head 2700. The insert 3850 may extend between the second set of weight ports 2802 and the third set of weight ports 2803. The insert 3850 may have a front surface 3851 that abuts the first set of weight ports 2801. The insert 3850 may have a heel-side surface 3854 that abuts the second set of weight ports 2802. The insert 3850 may have a toe-side surface 3853 that abuts the third set of weight ports 2803. The insert 3850 may have a rear surface 3852 that extends between the second set of weight ports 2802 and the third set of weight ports 2803. The rear surface 3852 of the insert 3850 may be concave relative to the rear portion 2780 of the golf club head 2700. The insert 3850 may extend to the first set of weight ports 2801, the second set of weight ports 2802, and the third set of weight ports 2803. The insert 3850 may include a plurality of hexagonal holes that extend through or partially through the thickness of the insert 3850. The plurality of hexagonal holes may be arranged on the insert 3850 to define a pattern similar to a honeycomb pattern. The apparatus, methods, and articles of manufacture described herein are not limited in this regard.

Figure 35:
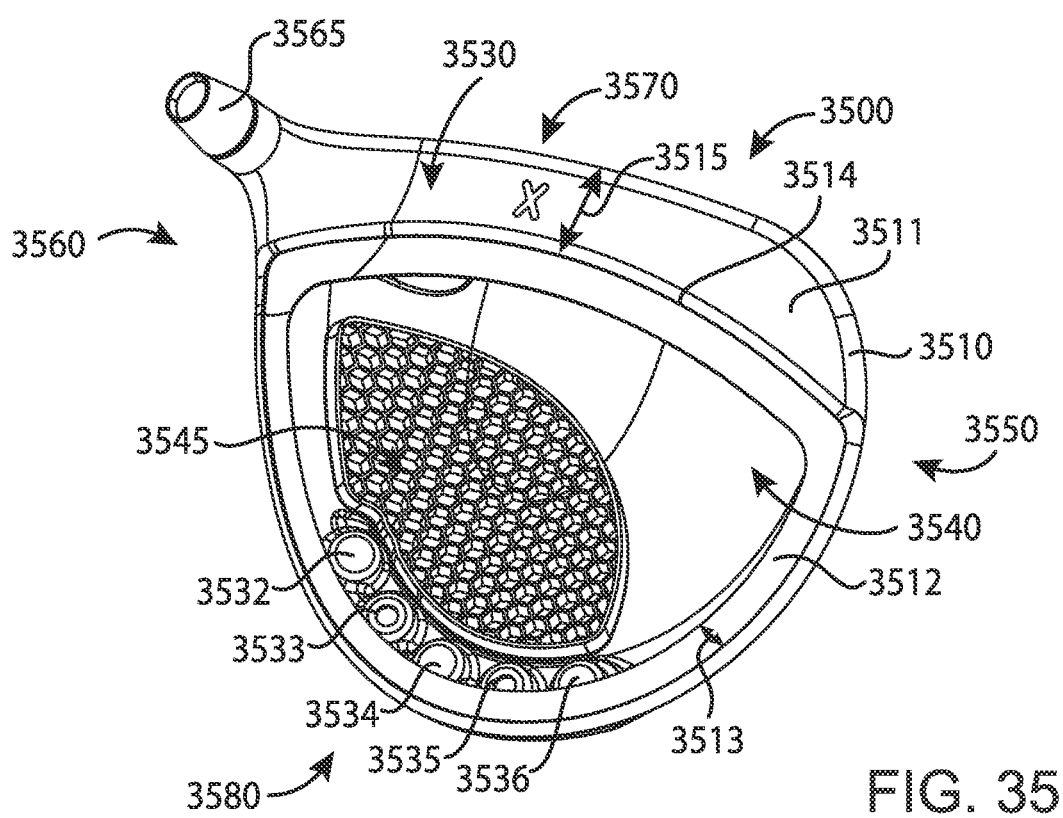
FIG. 35 is top perspective view of an example golf club head prior to attachment of a crown portion and according to an embodiment of the apparatus, methods, and articles of manufacture described herein.

In the example of FIG. 35, a golf club head 3500 is shown prior to attachment of a crown portion to a body portion 3510. The body portion 3510 may include a top portion 3530, a bottom portion 3540, a toe portion 3550, a heel portion 3560, a front portion 3570, and a rear portion 3580. The bottom portion 3540 may include a skirt portion defined as a side portion of the golf club head 3500 between the top portion 3530 and the bottom portion 3540 excluding the front portion 3570 and extending across a periphery of the golf club head 3500 from the toe portion 3550, around the rear portion 3580, and to the heel portion 3560. Alternatively, the golf club head 3500 may not include the skirt portion. The front portion 3570 may include a face portion to engage a golf ball. The face portion may be integral to the body portion 3510 or may be a separate face portion that is coupled (e.g., welded) to the front portion 3570 to enclose an opening in the front portion 3570. The body portion 3510 may also include a hosel portion 3565 configured to receive a shaft portion (similar to the example shaft portion 6512 shown in FIG. 65). The hosel portion 3565 may be similar in many respects to any of the hosel portions described herein. The hosel portion 3565 may include an interchangeable hosel sleeve. Alternatively, the body portion 3510 may include a bore instead of the hosel portion 3565. The body portion 3510 may be made partially or entirely from any of the materials described herein. Further, the golf club head 3500 may be any type of golf club head having a club head volume similar to the club head volume of any of the golf club heads described herein. In one example, the golf club head may have a club head volume less than 460 cubic centimeters. In another example, the golf club head may have a club head volume greater than 460 cubic centimeters. In still another example, the golf club head may have a club head volume greater than 500 cubic centimeters. The apparatus, methods, and articles of manufacture described herein are not limited in this regard.

The top portion 3530 may include a forward portion 3511. In one example, the forward portion 3511 may extend a distance 3515 of at least 12 mm in a front-to-rear direction. In another example, the forward portion 3511 may extend a distance 3515 of at least 16 mm in a front-to-rear direction. In yet another example, the forward portion 3511 may extend a distance 3515 of at least 20 mm in a front-to-rear direction. While the above examples may describe particular distances, the apparatus, methods, and articles of manufacture described herein may include a forward portion extending a distance less than 12 mm in a front-to-rear direction. The forward portion 3511 may enhance structural integrity of the golf club head 3500 and resist rearward deflection of the front portion 3570 during impact with a golf ball. The apparatus, methods, and articles of manufacture described herein are not limited in this regard.

The golf club head 3500 can include a crown portion similar to any of the crown portions described herein (e.g. 135, 3935, 4035, 4135). The crown portion may include one or more integral ribs. The crown portion may include one or more thin portions. The crown portion may include one or more crown stiffening regions. The crown portion may be a separate piece that may be attached to the top portion 3530. The crown portion may enclose a top opening in the top portion 3530. The crown portion may be constructed from one or more materials, and those materials may be the same or different from the material of the body portion 3510. In one example, the crown portion may be at least partially constructed from a composite material such as a fiber-based composite material. The crown portion may be attached to a shoulder portion 3512 of the top portion 3530. The apparatus, methods, and articles of manufacture described herein are not limited in this regard.

The shoulder portion 3512 may extend along the top opening in the top portion. The shoulder portion 3512 may support the crown portion. In one example, the shoulder portion 3512 that may extend a distance 3513 of at least 2 mm inward toward the top opening in the top portion 3530. In another example, the shoulder portion 3512 may extend a distance 3513 of at least 6 mm. In yet another example, the shoulder portion 3512 may extend a distance 3513 of at least 8 mm. While the above examples may describe particular distances, the apparatus, methods, and articles of manufacture described herein may include a shoulder portion 3512 may extend a distance less than 2 mm inward toward the opening in the top portion 3530. The shoulder portion 3512 may be a continuous portion encircling the top opening in the top portion 3530. Alternately, the shoulder portion 3512 may include one or more discrete shoulder portions arranged to support the crown portion. In another example, the shoulder portion 3512 may include a plurality of tabs arranged to support the crown portion. In still another example, the shoulder portion 3512 may be omitted, and the crown portion may be adhered to an outer surface of the top portion 3530. In yet another example, the shoulder portion 3512 may be omitted, and the crown portion may include a protrusion extending from a bottom surface of the crown portion that provides an interference fit with a perimeter edge of the opening. The apparatus, methods, and articles of manufacture described herein are not limited in this regard.

The golf club head 3500 may include a set of weight ports (e.g. 3532-3536) in the bottom portion 3540. The weight ports may be located proximate to the rear portion. The weight ports may be arranged in a row extending from the toe portion 3550 to the heel portion 3560. The row may be an arc that is concave relative to the front portion 3570. The row may be an arc that follows a contour of the rear portion 3580. Each weight port may be adapted to receive a weight portion. One or more of the weight ports (e.g. 3532-3536) may include an opening suitable for introducing a filler to the interior volume of the golf club head 3500. The filler may be similar to any of the filler materials described herein. The apparatus, methods, and articles of manufacture described herein are not limited in this regard. The apparatus, methods, and articles of manufacture described herein are not limited in this regard.

The golf club head 3500 may include an insert 3545 that is similar in material to any of the inserts described herein. As shown in FIG. 35, the insert 3545 may be located on an inner surface of the bottom portion 3540 of the golf club head 3500. The insert 3545 may extend from a set of weight ports (e.g. 3532-3536) in the bottom portion 3540 toward the front portion 3570. The insert 3545 may be adjacent to one or more of the weight ports. The insert 3545 may contact one or more of the weight ports. The insert 3545 may dampen vibrations from one or more of the weight ports. The insert 3545 may dampen vibrations from the bottom portion 3540. The apparatus, methods, and articles of manufacture described herein are not limited in this regard.

Figure 36:
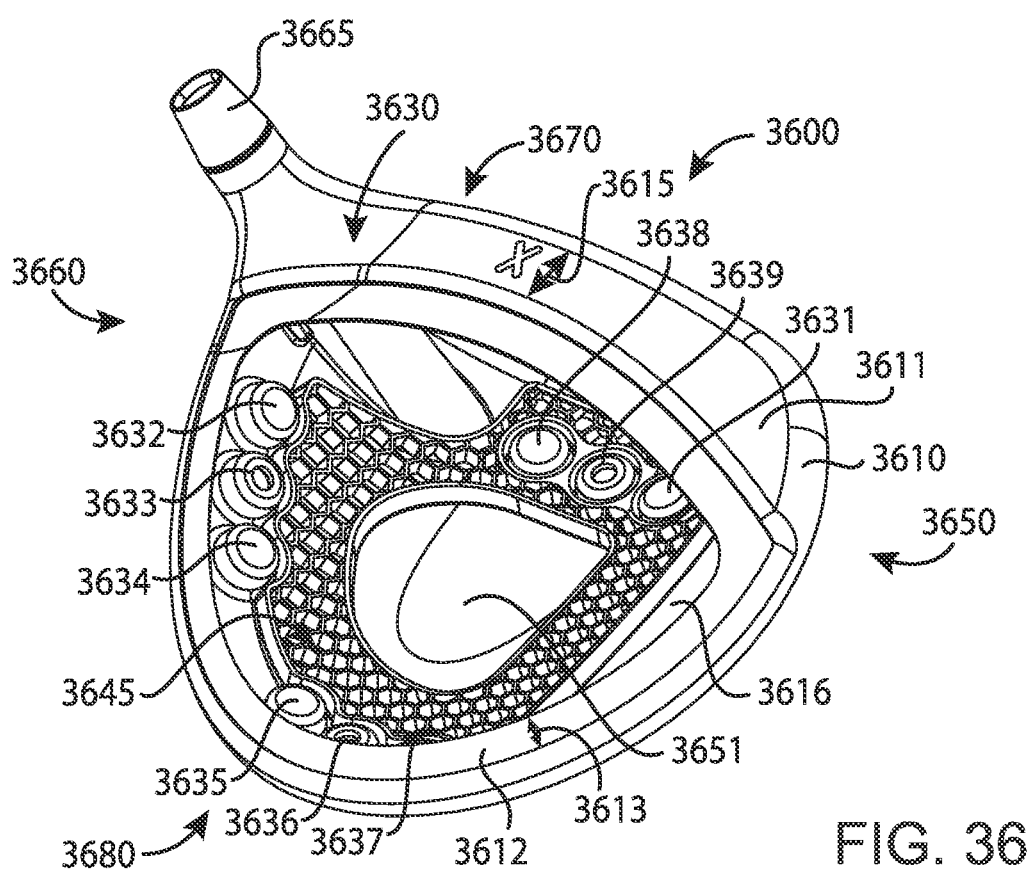
FIG. 36 is top perspective view of an example golf club head prior to attachment of a crown portion and according to an embodiment of the apparatus, methods, and articles of manufacture described herein.

In the example of FIG. 36, a golf club head 3600 is shown prior to attachment of a crown portion to a body portion 3610. The body portion 3610 may include a top portion 3630, a bottom portion 3640, a toe portion 3650, a heel portion 3660, a front portion 3670, and a rear portion 3680. The bottom portion 3640 may include a skirt portion defined as a side portion of the golf club head 3600 between the top portion 3630 and the bottom portion 3640 excluding the front portion 3570 and extending across a periphery of the golf club head 3600 from the toe portion 3650, around the rear portion 3680, and to the heel portion 3660. Alternatively, the golf club head 3600 may not include the skirt portion. The front portion 3670 may include a face portion to engage a golf ball. The face portion may be integral to the body portion 3610 or may be a separate face portion that is coupled (e.g., welded) to the front portion 3670 to enclose an opening in the front portion 3570. The body portion 3610 may also include a hosel portion 3665 configured to receive a shaft portion (similar to the example shaft portion 6512 shown in FIG. 65). The hosel portion 3665 may be similar in many respects to any of the hosel portions described herein. The hosel portion 3665 may include an interchangeable hosel sleeve. Alternatively, the body portion 3610 may include a bore instead of the hosel portion 3665. The body portion 3610 may be made partially or entirely from any of the materials described herein. Further, the golf club head 3600 may be any type of golf club head having a club head volume similar to the club head volume of any of the golf club heads described herein. In one example, the golf club head may have a club head volume less than 460 cubic centimeters. In another example, the golf club head may have a club head volume greater than 460 cubic centimeters. In still another example, the golf club head may have a club head volume greater than 500 cubic centimeters. The apparatus, methods, and articles of manufacture described herein are not limited in this regard.

The top portion 3630 may include a forward portion 3611. In one example, the forward portion 3611 may extend a distance 3615 of at least 12 mm in a front-to-rear direction. In another example, the forward portion 3611 may extend a distance 3615 of at least 16 mm in a front-to-rear direction. In yet another example, the forward portion 3611 may extend a distance 3615 of at least 20 mm in a front-to-rear direction. While the above examples may describe particular distances, the apparatus, methods, and articles of manufacture described herein may include a forward portion extending a distance less than 12 mm in a front-to-rear direction. The forward portion 3611 may enhance structural integrity of the golf club head 3600 and resist rearward deflection of the front portion 3670 during impact with a golf ball. The apparatus, methods, and articles of manufacture described herein are not limited in this regard.

The golf club head 3600 can include a crown portion similar to any of the crown portions described herein (e.g. 135, 3935, 4035, 4135). The crown portion may include one or more integral ribs. The crown portion may include one or more thin portions. The crown portion may include one or more crown stiffening regions. The crown portion may be a separate piece that may be attached to the top portion 3630. The crown portion may enclose a top opening in the top portion 3630. The crown portion may be constructed from one or more materials, and those materials may be the same or different from the material of the body portion 3610. In one example, the crown portion may be at least partially constructed from a composite material such as a fiber-based composite material. The crown portion may be attached to a shoulder portion 3612 of the top portion 3630. The apparatus, methods, and articles of manufacture described herein are not limited in this regard.

The shoulder portion 3612 may extend along the top opening in the top portion. The shoulder portion 3612 may support the crown portion. In one example, the shoulder portion 3612 that may extend a distance 3613 of at least 2 mm inward toward the top opening in the top portion 3630. In another example, the shoulder portion 3612 may extend a distance 3613 of at least 6 mm. In yet another example, the shoulder portion 3612 may extend a distance 3613 of at least 8 mm. While the above examples may describe particular distances, the apparatus, methods, and articles of manufacture described herein may include a shoulder portion 3612 may extend a distance less than 2 mm inward toward the opening in the top portion 3630. The shoulder portion 3612 may be a continuous portion encircling the top opening in the top portion 3630. Alternately, the shoulder portion 3512 may include one or more discrete shoulder portions arranged to support the crown portion. In another example, the shoulder portion 3612 may include a plurality of tabs arranged to support the crown portion. In still another example, the shoulder portion 3612 may be omitted, and the crown portion may be adhered to an outer surface of the top portion 3630. In yet another example, the shoulder portion 3612 may be omitted, and the crown portion may include a protrusion extending from a bottom surface of the crown portion that provides an interference fit with a perimeter edge of the opening. The apparatus, methods, and articles of manufacture described herein are not limited in this regard.

The golf club head 3600 may include a set of weight ports (e.g. 3631-3639) in the bottom portion 3640. Each weight port may be adapted to receive a weight portion. The set of weight ports may include a first set of weight ports (e.g. 3631, 3638, 3639). The set of weight ports may include a second set of weight ports (e.g. 3632-3634). The set of weight ports may include a third set of weight ports (e.g. 3635-3637). The first set of weight ports may be arranged in a row extending from the toe portion 3650 to the heel portion 3660. The first set of weight ports may be located closer to the front portion 3670 than the rear portion 3680. The first set of weight ports may include at least two weight ports. The first set of weight ports may include three or more weight ports. The second set of weight ports may be located closer to the heel portion 3660 than the toe portion 3650. The second set of weight ports may be located closer to the rear portion 3680 than the front portion 3670. The second set of weight ports may include at least two weight ports. The second set of weight ports may include three or more weight ports. The third set of weight ports may be located closer to the toe portion 3650 than the heel portion 3660. The third set of weight ports may be located closer to the rear portion 3680 than the front portion 3670. The third set of weight ports may include at least two weight ports. The third set of weight ports may include three or more weight ports. The apparatus, methods, and articles of manufacture described herein are not limited in this regard.

One or more of the weight ports (e.g. 3631-3639) may include an opening suitable for introducing a filler material to the interior volume of the golf club head 3600. The filler material may be similar to any of the filler materials described herein. The apparatus, methods, and articles of manufacture described herein are not limited in this regard.

The golf club head 3600 may include an insert 3645 that is similar in material to any of the inserts described herein. The insert 3645 may be provided within an interior region of the golf club head 3600. As shown in FIG. 36, the insert 3645 may be located adjacent to an inner surface of the bottom portion 3640 of the golf club head 3500. The insert 3645 may dampen vibrations within the golf club head 3600 resulting from impact with a golf ball, which may improve sound or feel perceived by an individual. The insert 3645 may be adjacent to one or more of the weight ports (e.g. 3631-3639). The insert 3645 may surround one or more of the weight ports (e.g. 3631-3639). The insert 3645 may surround the first set of weight ports. The insert 3645 may abut the second set of weight ports. The insert 3645 may abut the third set of weight ports. The insert 3645 may extend from the first set of weight ports to the second set of weight ports. The insert 3645 may extend from the first set of weight ports to the third set of weight ports. The insert may extend from the second set of weight ports to the third set of weight ports. The apparatus, methods, and articles of manufacture described herein are not limited in this regard.

The insert 3645 may include a central opening 3651. The central opening 3651 may improve weight distribution of the insert 3645 within the golf club head 3600. The size and location of the central opening 3651 in the insert 3645 may increase MOI of the golf club head 3600 by reducing weight in a central sole region of the golf club head 3600. The central opening 3651 may have an area that is greater than or equal to about 10% of a total interior surface area 3616 of the bottom portion of the golf club head. The central opening 3651 may have an area that is greater than or equal to about 15% of a total interior surface area 3616 of the bottom portion of the golf club head. The central opening 3651 may have an area that is greater than or equal to about 20% of a total interior surface area 3616 of the bottom portion of the golf club head. The central opening 3651 may have an area that is greater than or equal to about 25% of a total interior surface area 3616 of a sole portion of the golf club head. The apparatus, methods, and articles of manufacture described herein are not limited in this regard.

Certain regions of the interior of the body portion may include an elastic polymer material or an elastomer material similar to any of the golf club heads described herein. The filler material may dampen vibration, dampen noise, lower the center of gravity and/or provide a better feel and sound for the golf club head when striking a golf ball (not shown). The golf club head may have one or more interior regions that may include a filler material as described herein. In one example, the filler material may be injected into the body portion from one or more of the weight ports as described herein. The apparatus, methods, and articles of manufacture described herein are not limited in this regard.

In the example of FIGS. 42-48, a golf club head 4200 may include a body portion 4210 with a top portion 4230, a crown portion 4235, a bottom portion 4240, a toe portion 4250, a heel portion 4260, a front portion 4270, and a rear portion 4280. The bottom portion 4240 may include a skirt portion 4290 defined as a side portion of the golf club head 4200 between the top portion 4230 and the bottom portion 4240 excluding the front portion 4270 and extending across a periphery of the golf club head 4200 from the toe portion 4250, around the rear portion 4280, and to the heel portion 4260. Alternatively, the golf club head 4200 may not include the skirt portion 4290. The front portion 4270 may include a face portion 4275 to engage a golf ball. The face portion 4275 may be a separate face portion that is coupled (e.g., welded) to the golf club head 4200. The body portion 4210 may also include a hosel portion 4265 configured to receive a shaft portion (similar to the example shaft portion 6512 shown in FIG. 65). The hosel portion 4265 may be similar in many respects to any of the hosel portions described herein. The hosel portion 4265 may include an interchangeable hosel sleeve. Alternatively, the body portion 4210 may include a bore instead of the hosel portion 4265. The body portion 4210 may be made partially or entirely of an aluminum-based material, a magnesium-type material, a steel-based material, a titanium-based material, any combination thereof, or any other suitable material. In another example the body portion 4210 may be made partially or entirely of a non-metal material such as a ceramic material, a composite material, any combination thereof, or any other suitable material. The apparatus, methods, and articles of manufacture described herein are not limited in this regard.

The golf club head 4200 may have a club head volume greater than or equal to 300 cubic centimeters (cm3 or cc). In one example, the golf club head 4200 may be about 460 cc. Alternatively, the golf club head 4200 may have a club head volume less than or equal to 300 cc. In particular, the golf club head 4200 may have a club head volume between 100 cc and 200 cc. The club head volume of the golf club head 4200 may be determined by using the weighted water displacement method (i.e., Archimedes Principle). For example, procedures defined by golf standard organizations and/or governing bodies such as the United States Golf Association (USGA) and/or the Royal and Ancient Golf Club of St. Andrews (R&A) may be used for measuring the club head volume of the golf club head 4200. Although FIG. 42 may depict a particular type of club head (e.g., a driver-type club head), the apparatus, methods, and articles of manufacture described herein may be applicable to other types of club head (e.g., a fairway wood-type club head, a hybrid-type club head, an iron-type club head, a putter-type club head, etc.). The apparatus, methods, and articles of manufacture described herein are not limited in this regard.

In the examples described herein, the face portion (e.g. 175, 1975, 2775) may be a separate portion that is installed in a front opening in the front portion (e.g. 170, 1970, 2770) and joined to the golf club head (e.g. 100, 1900, 2700) to enclose the front opening. Alternately, the face portion (e.g. 175, 1975, 2775) may be an integral part of the golf club head (e.g. 100, 1900, 2700), such as part of a common casting. In another example, shown in FIGS. 42-48, a front portion 4270 of a golf club head 4200 may include a front pocket 4276 configured to receive a separate face portion 4275. In another example, shown in FIG. 51, a front portion 5170 of a golf club head 5100 may include a front pocket portion 5176 configured to receive a separate face portion 5175 and a filler material 5199 in a face cavity 5198 located between an interior wall 5178 of the front pocket and the face portion 5175. In another example, shown in FIG. 52, a front portion 5270 of a golf club head 5200 may include a front pocket 5276 configured to receive a separate face portion 5275 and a polymer insert 5211 in a face cavity 5298 located between an interior wall 5278 of the front pocket and the face portion 5275. In another example, shown in FIG. 53, a front portion 5370 of a golf club head 5300 may include a front pocket portion 5376 configured to receive a separate face portion 535, a polymer insert 5311, a filler material 5399 in a face cavity 5398 located between an interior wall 5278 of the front pocket and the face portion 5375. The apparatus, methods, and articles of manufacture described herein are not limited in this regard.

A face portion 4275 may be positioned in the front pocket 4276. The face portion 4275 may include a front surface 4291, a rear surface 4293, a side surface, a front perimeter edge, and a rear perimeter edge. The face portion 4275 may be joined (e.g. welded) to the side wall 4279 of the front pocket portion. The apparatus, methods, and articles of manufacture described herein are not limited in this regard.

The front pocket 4276 may be defined by an interior wall 4278 and a side wall 4279. The interior wall 4278 may have an interior surface 4277. The front pocket 4276 may have an outer perimeter edge 4281. The front pocket 4276 may serve as an assembly aid that allows the face portion 4275 to be easily and accurately positioned relative to the front portion 4270 during a joining process, such as a welding process where the face portion 4275 is welded to the front portion 4270. By accurately positioning the face portion 4275 relative to the front portion 4270 during the joining process, time and expense associated with subsequent finishing processes, such as sanding or polishing processes, may be reduced. Also, variability between manufactured golf club heads may be reduced for improved consistency of performance. An interior wall 4278 of the front pocket 4276 may reinforce and support the face portion 4275 during impact with a golf ball. The front pocket 4276 may improve the structural integrity of the golf club head 4200. The front pocket 4276 may improve the performance of the golf club head 4200. The apparatus, methods, and articles of manufacture described herein are not limited in this regard.

The front pocket 4276 may be defined by an interior wall 4278 and a side wall 4279. An outer perimeter edge 4281 may circumscribe the front pocket 4276. An interior surface 4277 of the front pocket 4276 may be a surface of the interior wall 4278. The interior wall 4278 may extend in a heel-to-toe direction. The interior wall 4278 may extend in a bottom-to-top direction. The interior wall 4278 may have a thickness 4477 extending in a front-to-rear direction. In one example, the interior wall 4278 may have a thickness 4477 of between and including 0.020 inch and 0.030 inch. In another example, the interior wall 4278 may have a thickness 4477 of less than 0.030 inch. In another example, the interior wall 4278 may have a thickness 4477 of less than or equal to 0.035 inch. The apparatus, methods, and articles of manufacture described herein are not limited in this regard.

The interior wall 4278 of the front pocket 4276 may be made partially or entirely of an aluminum-based material, a magnesium-type material, a steel-based material, a titanium-based material, any combination thereof, or any other suitable material. In another example, the interior wall 4278 of the front pocket 4276 may be made partially or entirely of a non-metal material such as a ceramic material, a composite material, any combination thereof, or any other suitable material. The material of the interior wall 4278 of the front pocket 4276 may have a density of at least 4 grams per cubic centimeter. The material of the interior wall 4278 of the front pocket 4276 may have a density of at least 4.4 grams per cubic centimeter. The material of the interior wall 4278 of the front pocket 4276 may have a density of at least 4.5 grams per cubic centimeter. The material of the interior wall 4278 of the front pocket 4276 may the same material as a body portion 4210 of the golf club head. The material of the interior wall 4278 of the front pocket 4276 may be a different material than the body portion 4210 of the golf club head 4200. The apparatus, methods, and articles of manufacture described herein are not limited in this regard.

Figure 48:
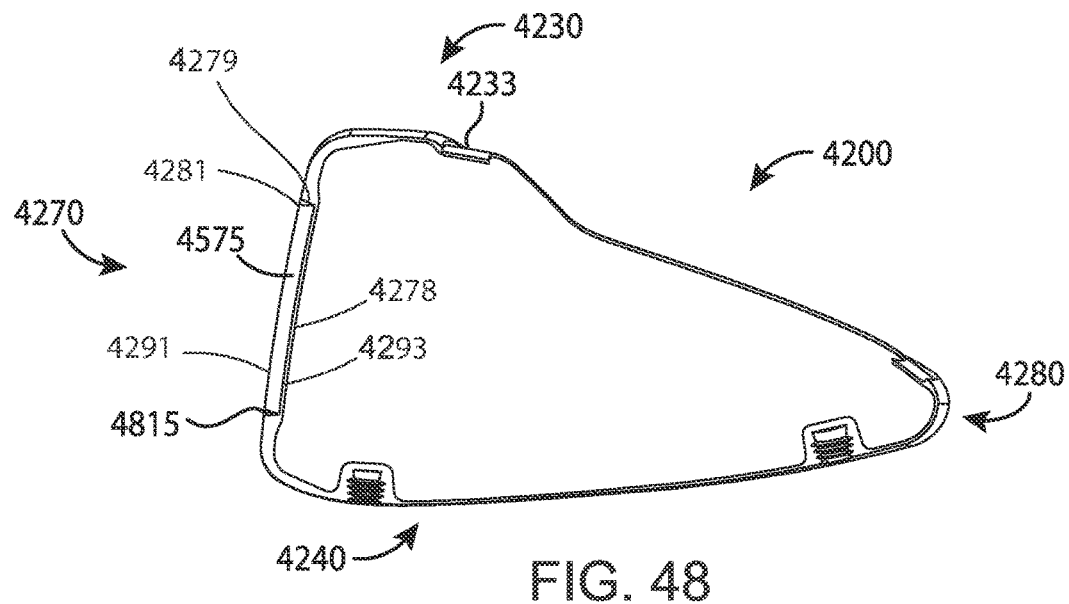
FIG. 48 depicts a side cross-sectional view of the example golf club head of FIG. 42.

In one example, a gap 4815 may exist between an outer perimeter edge 4281 of the face portion 4275 and the outer perimeter edge 4281 of the front pocket 4276, as shown in FIG. 48. During manufacturing, the gap 4815 may be entirely or partially filled with weld material during a welding process in which the face portion 4575 is joined to the front portion 4270. A sanding or polishing process may follow in which excess weld material is removed to produce a smooth surface across the front portion 4270 of the golf club head 4200. The apparatus, methods, and articles of manufacture described herein are not limited in this regard.

Figure 45:
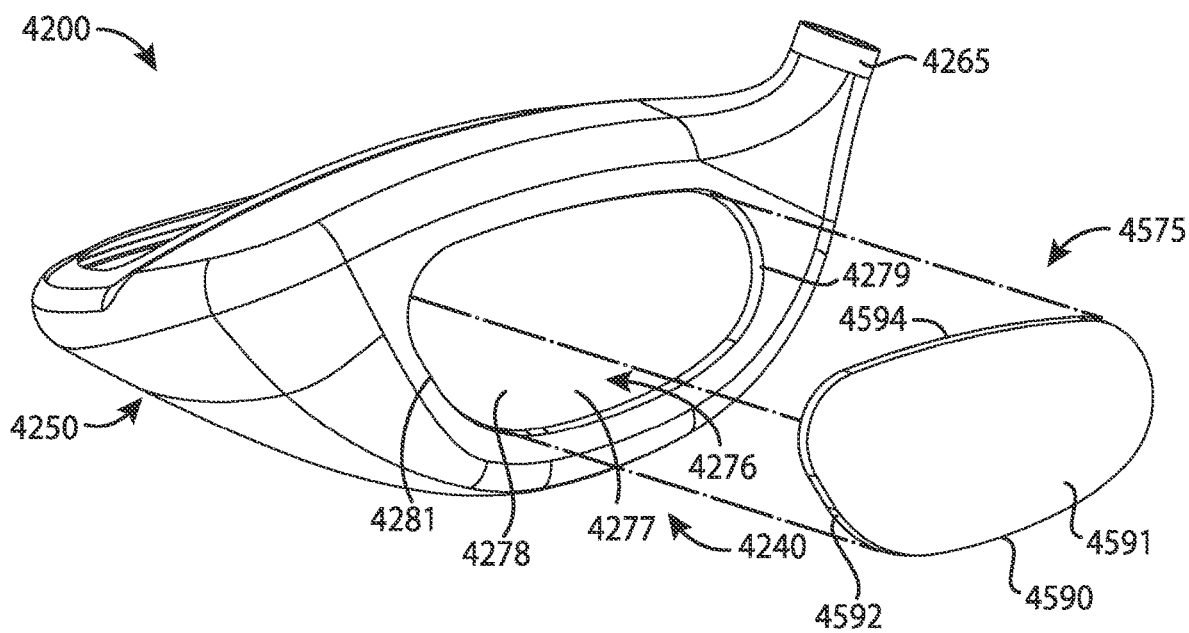
FIG. 45 depicts an exploded view of the example golf club head of FIG. 42.
Figure 46:
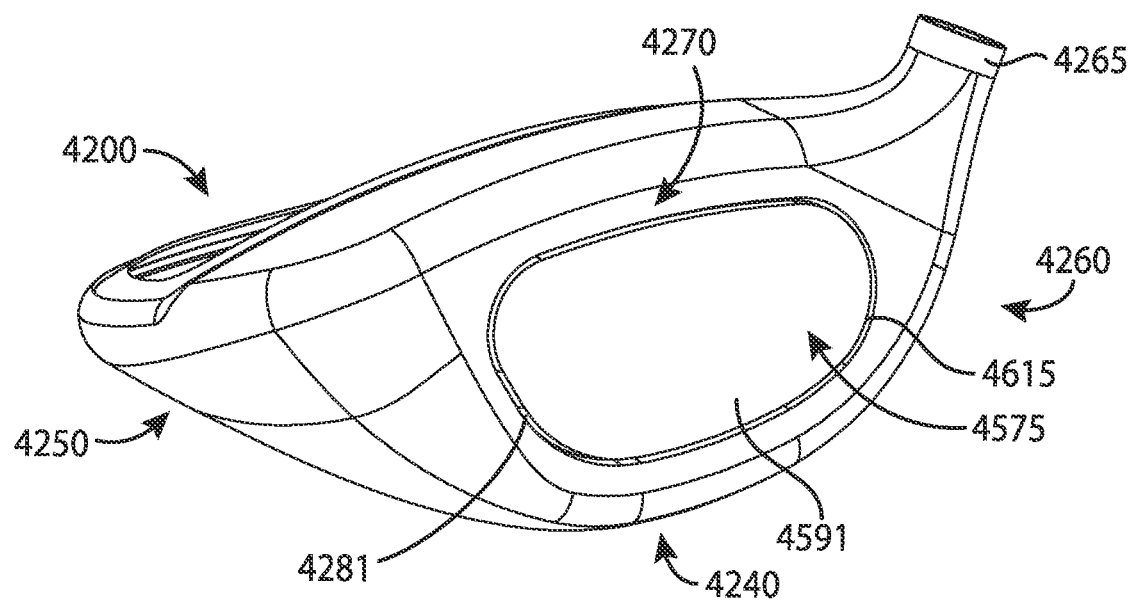
FIG. 46 depicts a front perspective view of the example golf club head of FIG. 42.
Figure 47:
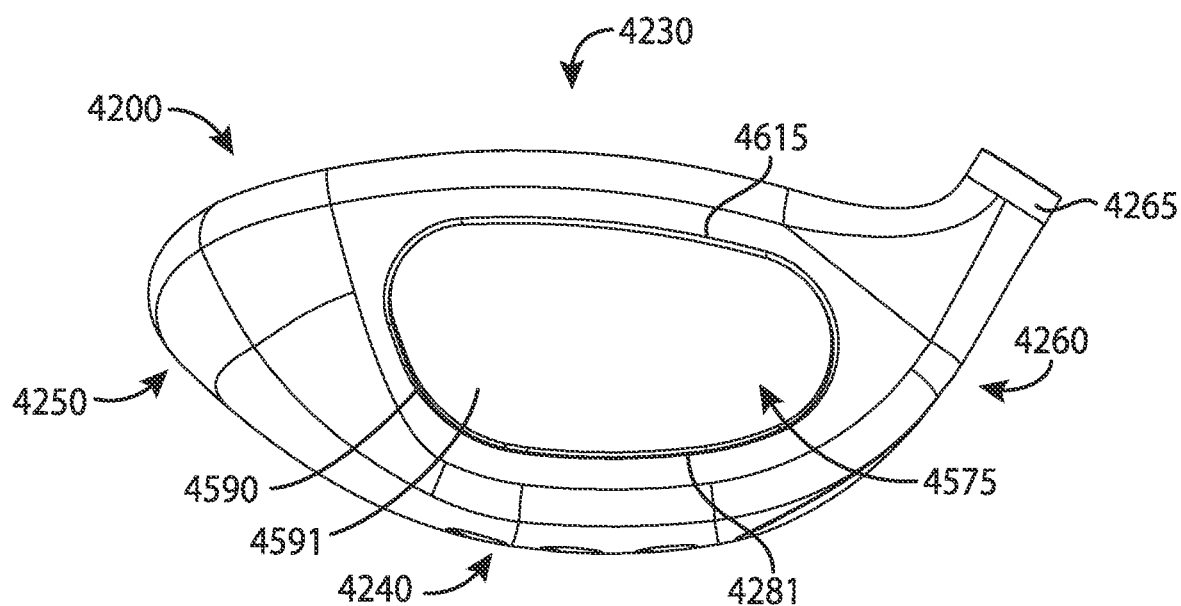
FIG. 47 depicts a front view of the example golf club head of FIG. 42.

The face portion 4575 may include a front surface 4591, a side surface 4592, a rear surface 4593, a front perimeter edge 4590, and a rear perimeter edge 4594, as shown in FIG. 45. In one example, the face portion 4575 may have a thickness between and including 0.075 and 0.125 inch. In another example, the face portion 4575 may have a thickness between and including 0.090 and 0.110 inch. In another example, the face portion 4575 may have a thickness of less than 0.115 inch. In yet another example, the face portion 4575 may have a thickness of less than 0.125 inch. The apparatus, methods, and articles of manufacture described herein are not limited in this regard.

The face portion 4575 may be made partially or entirely of an aluminum-based material, a magnesium-type material, a steel-based material, a titanium-based material, any combination thereof, or any other suitable material. In another example, face portion 4575 may be made partially or entirely of a non-metal material such as a ceramic material, a composite material, any combination thereof, or any other suitable material. The material of the face portion 4575 may have a density of at least 4 grams per cubic centimeter. The material of the face portion 4575 may have a density of at least 4.4 grams per cubic centimeter. The material of the face portion 4575 may have a density of at least 4.5 grams per cubic centimeter. The material of the face portion 4575 may have a higher density than the material of the interior wall 4278 of the front pocket 4276. The material of the face portion 4275 may have a higher yield strength than the material of the interior wall 4278 of the front pocket 4276. For example, the material of the face portion 4575 may have a yield strength that is at least 40% higher than the material of the interior wall 4278 of the front pocket 4276. In another example, the material of the face portion 4575 may have a yield strength that is at least 45% higher than the material of the interior wall 4278 of the front pocket 4276. The apparatus, methods, and articles of manufacture described herein are not limited in this regard.

The entire rear surface of the face portion 4575 may contact the interior wall 4278 of the front pocket 4276, as shown in FIG. 48. In another example, only a portion of the rear surface of the face portion 4275 may contact the interior wall 4278 of the front pocket 4276. In another example shown in FIG. 50, the rear surface of the face portion 5075 may not contact the interior wall 5078 of the front pocket portion 5076 and an empty volume 5098 may exist between the rear surface of the face portion 5075 and the interior wall 5078. In another example shown in FIG. 51, the rear surface of the face portion 5175 may not contact the interior wall 5178 of the front pocket portion 5176, and a filler material 5199 may partially or entirely fill a volume 5198 between the interior wall and the rear surface of the face portion 5175. The apparatus, methods, and articles of manufacture described herein are not limited in this regard.

Figure 50:
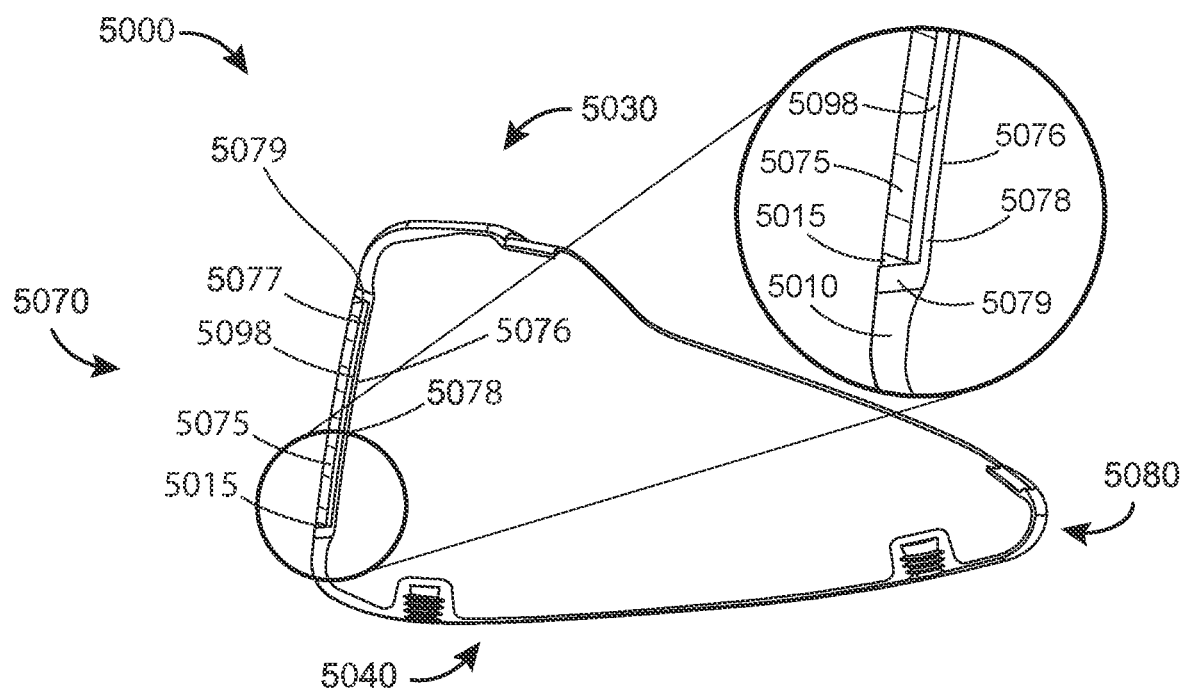
FIG. 50 depicts a side cross-sectional view of an example golf club head according to an embodiment of the apparatus, methods, and articles of manufacture described herein.

In examples where the rear surface of the face portion only partially contacts the interior wall or does not contact the interior wall, a face cavity may exist within the front pocket between the rear surface of the face portion and the interior wall of the front pocket. As shown in FIG. 50, for example, the face cavity 5098 may extend in a front-to-rear direction from the rear surface of the face portion 5075 to the interior wall 5078 of the front pocket. In one example, the face cavity may have a depth, measured front-to-rear, between and including 0.020 inch and 0.250 inch. In another example, the face cavity may have a depth, measured front-to-rear, between and including 0.030 inch and 0.110 inch. In yet another example, the face cavity may have a depth, measure front-to-rear, of less than 0.030 inch. In still another example, the face cavity may have a depth, measured front-to-rear, of greater than 0.250 inch. The apparatus, methods, and articles of manufacture described herein are not limited in this regard.

Figure 51:
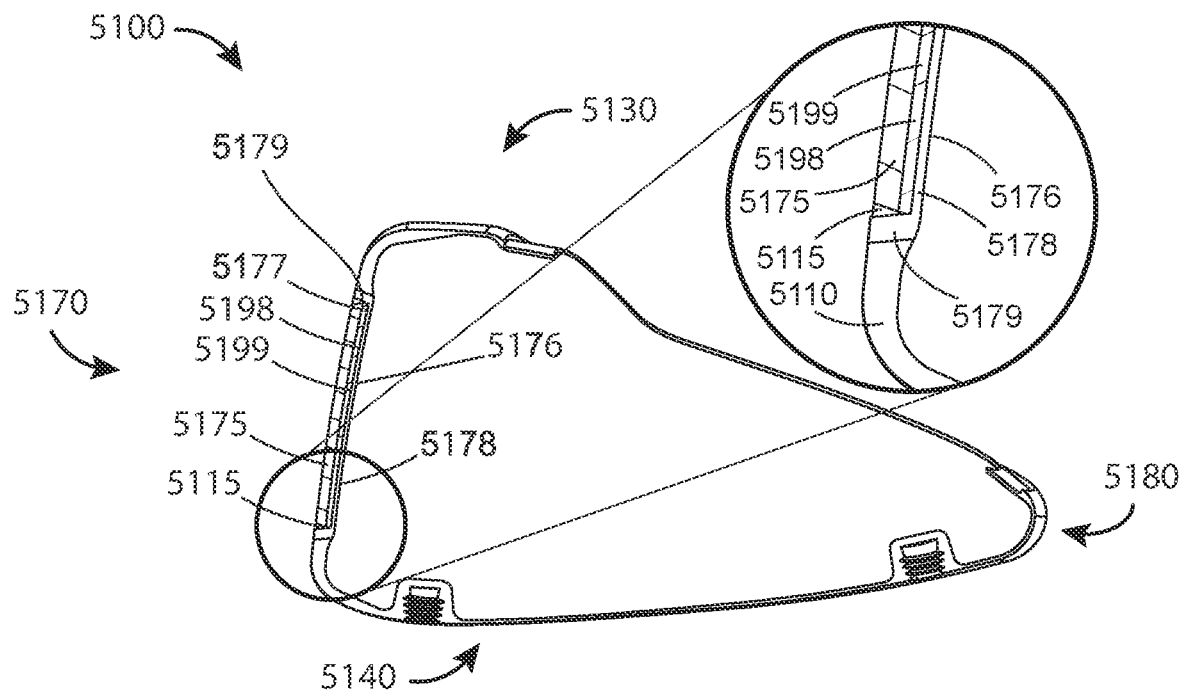
FIG. 51 depicts a side cross-sectional view of an example golf club head according to an embodiment of the apparatus, methods, and articles of manufacture described herein.
Figure 53:
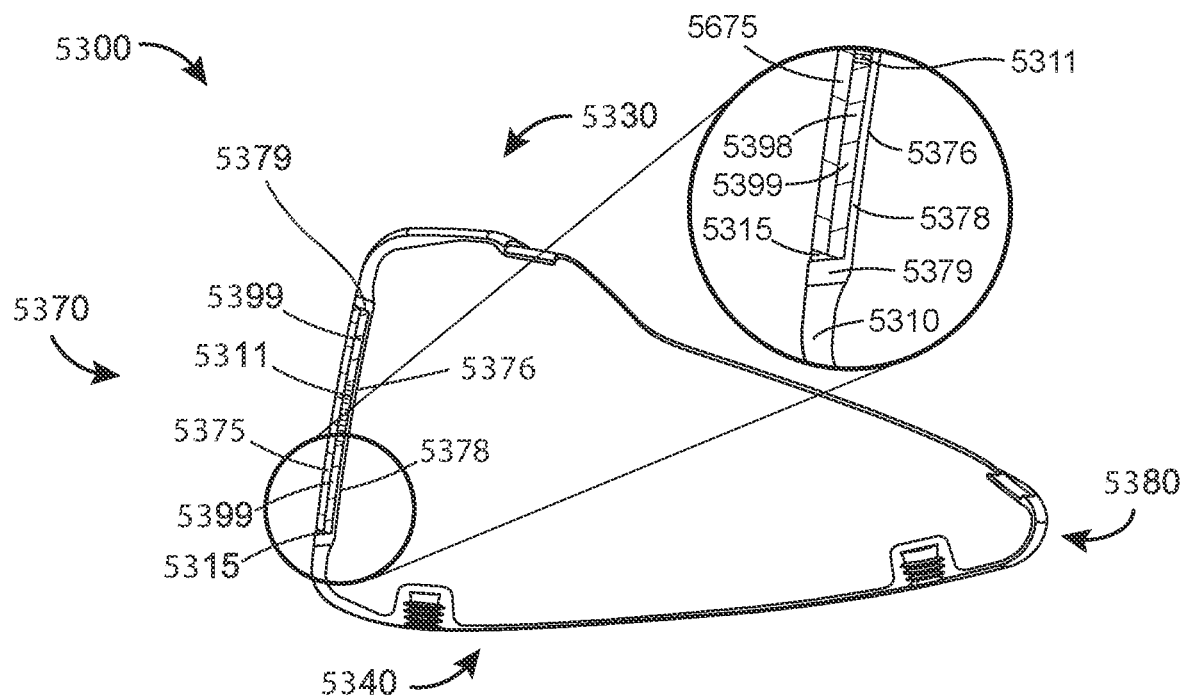
FIG. 53 depicts a side cross-sectional view of an example golf club head according to an embodiment of the apparatus, methods, and articles of manufacture described herein.
Figure 54:
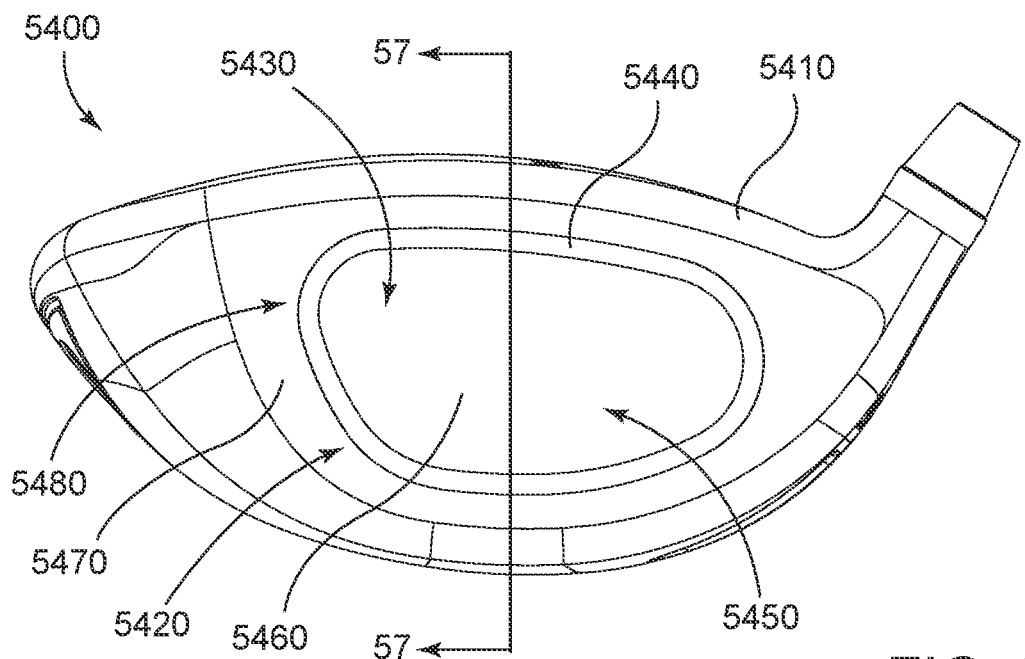
FIG. 54 depicts a front view of an example golf club head according to an embodiment of the apparatus, methods, and articles of manufacture described herein.

The face cavity may include a filler material. The filler material may support the face portion and limit rearward deflection of the face portion. The filler material may dampen vibration resulting from impact with a golf ball. The filler material may effectively reduce measured CT values across the face portion and ensure compliance with certain rules or regulations. As shown in FIG. 51, the face cavity 5198 may be filled with filler material 5199. In another example, the face cavity may be partially filled with filler material. In another example, the face cavity may not be filled with filler material, as shown in FIG. 50. In another example, the face cavity may include a polymer insert 5311 and filler material 5399, as shown in FIG. 53. The apparatus, methods, and articles of manufacture described herein are not limited in this regard.

The filler material may be an elastic polymer or elastomer material (e.g., a viscoelastic urethane polymer material such as Sorbothane® material manufactured by Sorbothane, Inc., Kent, Ohio), a thermoplastic elastomer material (TPE), a thermoplastic polyurethane material (TPU), and/or other suitable types of materials to absorb shock, isolate vibration, and/or dampen noise. In another example, the filler material may be a high density ethylene copolymer ionomer, a fatty acid modified ethylene copolymer ionomer, a highly amorphous ethylene copolymer ionomer, an ionomer of ethylene acid acrylate terpolymer, an ethylene copolymer comprising a magnesium ionomer, an injection moldable ethylene copolymer that may be used in conventional injection molding equipment to create various shapes, an ethylene copolymer that can be used in conventional extrusion equipment to create various shapes, and/or an ethylene copolymer having high compression and low resilience similar to thermoset polybutadiene rubbers. For example, the ethylene copolymer may include any of the ethylene copolymers associated with DuPont™ High-Performance Resin (HPF) family of materials (e.g., DuPont™ HPF AD1172, DuPont™ HPF AD1035, DuPont® HPF 1000 and DuPont™ HPF 2000), which are manufactured by E.I. du Pont de Nemours and Company of Wilmington, Delaware. The DuPont™ HPF family of ethylene copolymers are injection moldable and may be used with conventional injection molding equipment and molds, provide low compression, and provide high resilience. The apparatus, methods, and articles of manufacture described herein are not limited in this regard.

The filler material may be added to the front pocket 4276 prior to joining the face portion 4575 to the front portion 4270. Alternately, the filler material may be added to the face cavity after joining the face portion 4575 to the front portion 4270. In examples where the filler material is added to the face cavity after the face portion 4575 is installed in the front pocket 4276, the filler material may be added to the front pocket 4276 through one or more access holes. An access hole may extend through any bounding surface of the face cavity. For instance, the access hole may extend from the interior volume of the golf club head 4200 through the interior wall 4278 of the front pocket 4276. Alternately, the access hole may be provided through the side wall 4279 of the front pocket 4276 or through the face portion 4575. One or more port holes may be provided to allow air to escape from the face cavity during the filling process. A port hole may extend through any bounding surface of the face cavity. The apparatus, methods, and articles of manufacture described herein are not limited in this regard.

The filler material may be a liquid, solid, gas, or combination thereof. In one example, the filler material may be a solid filler material with gas bubbles trapped within the solid filler material. In another example, the filler material may be a solution of liquid filler material having suspended solid particles. Where the filler material includes a liquid or gaseous filler material, the face cavity may be a sealed cavity to avoid loss of the filler material. Where the filler material includes a liquid or gaseous filler material, the contents of the face cavity may be pressurized to a pressure greater than atmospheric pressure. In one example, the filler material may be pressurized to a pressure of between and including 1.1 atm and 25 atm. In another example, the filler material may be pressurized to a pressure of between and including 1.1 atm and 10 atm. In another example, the filler material may be pressurized to a pressure of between and including 1.1 atm and 5 atm. In another example, the filler material may be pressurized to a pressure of greater than 1 atm. The apparatus, methods, and articles of manufacture described herein are not limited in this regard.

Figure 49:
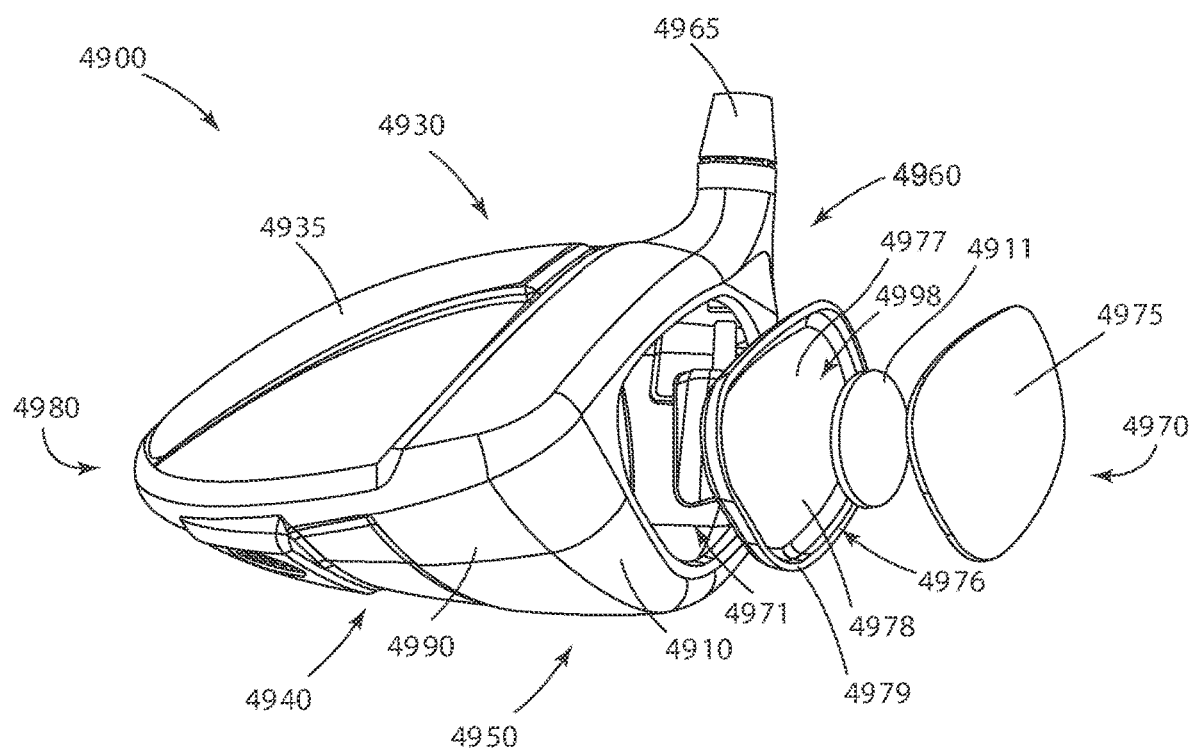
FIG. 49 depicts a front perspective view of an example golf club head according to an embodiment of the apparatus, methods, and articles of manufacture described herein.

In the example of FIG. 49, a golf club head 4900 may include a body portion 4910 with a top portion 4930, a crown portion 4935, a bottom portion 4940, a toe portion 4950, a heel portion 4960, a front portion 4970, and a rear portion 4980. The bottom portion 4940 may include a skirt portion 4990 defined as a side portion of the golf club head 4900 between the top portion 4930 and the bottom portion 4940 excluding the front portion 4970 and extending across a periphery of the golf club head 4900 from the toe portion 4950, around the rear portion 4980, and to the heel portion 4960. Alternatively, the golf club head 4900 may not include the skirt portion 4990. The front portion 4970 may include a face portion 4975 to engage a golf ball. The face portion 4975 may be a separate face portion that is coupled (e.g., welded) to the golf club head 4900. The body portion 4910 may also include a hosel portion 4965 configured to receive a shaft portion (similar to the example shaft portion 6512 shown in FIG. 65). The hosel portion 4965 may be similar in many respects to any of the hosel portions described herein. The hosel portion 4965 may include an interchangeable hosel sleeve. Alternatively, the body portion 4910 may include a bore instead of the hosel portion 4965. The body portion 4910 may be made partially or entirely of an aluminum-based material, a magnesium-type material, a steel-based material, a titanium-based material, any combination thereof, or any other suitable material. In another example the body portion 4910 may be made partially or entirely of a non-metal material such as a ceramic material, a composite material, any combination thereof, or any other suitable material. The apparatus, methods, and articles of manufacture described herein are not limited in this regard.

The golf club head 4900 may have a club head volume greater than or equal to 300 cubic centimeters (cm3 or cc). In one example, the golf club head 4900 may be about 460 cc. Alternatively, the golf club head 4900 may have a club head volume less than or equal to 300 cc. In particular, the golf club head 4900 may have a club head volume between 100 cc and 200 cc. The club head volume of the golf club head 4900 may be determined by using the weighted water displacement method (i.e., Archimedes Principle). For example, procedures defined by golf standard organizations and/or governing bodies such as the United States Golf Association (USGA) and/or the Royal and Ancient Golf Club of St. Andrews (R&A) may be used for measuring the club head volume of the golf club head 4900. Although FIG. 49 may depict a particular type of club head (e.g., a driver-type club head), the apparatus, methods, and articles of manufacture described herein may be applicable to other types of club head (e.g., a fairway wood-type club head, a hybrid-type club head, an iron-type club head, a putter-type club head, etc.). The apparatus, methods, and articles of manufacture described herein are not limited in this regard.

The golf club head 4900 may include a front opening 4971 in the front portion 4970. A front pocket portion 4976 may enclose the front opening 4971. The front pocket portion 4976 may include a front pocket 4977 defined by an interior wall 4978 and a side wall 4979. A polymer insert 4911 may be positioned in the front pocket 4977. The polymer insert 4911 may be positioned between the face portion 4975 and the interior wall 4978 of the front pocket portion 4976. The polymer insert 4911 may extend from the face portion 4975 to the interior wall 4978 of the front pocket portion 4976. The polymer insert 4911 may be compressed between the face portion 4975 and the interior wall 4978 of the front pocket portion 4976. The polymer insert 4911 may be disk-shaped or any other suitable shape. The polymer insert 4911 may include any of the polymer materials described herein. The apparatus, methods, and articles of manufacture described herein are not limited in this regard.

A face portion 4975 may be positioned in the front pocket 4977. The face portion 4975 may include a front surface, a rear surface, a side surface, a front perimeter edge, and a rear perimeter edge. The face portion 4975 may be joined (e.g. welded) to the side wall 4979 of the front pocket portion. The polymer insert 4911 may provide structural support between the interior wall 4978 of the front pocket portion 4976 and the face portion 4975 and thereby support the face portion and limit inward deflection of the face portion during a ball strike. The apparatus, methods, and articles of manufacture described herein are not limited in this regard.

The front pocket 4977 may serve as an assembly aid that allows the face portion 4975 to be easily and accurately positioned relative to the front portion 4970 during a joining process, such as a welding process where the face portion 4975 is welded to the front portion 4970. By accurately positioning the face portion 4975 relative to the front portion 4970 during the joining process, time and expense associated with subsequent finishing processes, such as sanding or polishing processes, may be reduced. Also, variability between manufactured golf club heads may be reduced for improved consistency of performance. An interior wall 4978 of the front pocket 4977 may reinforce and support the face portion 4975 during impact with a golf ball. The front pocket 4977 and polymer insert 4911 may improve the structural integrity of the golf club head 4900. The front pocket 4977 and polymer insert 4911 may improve the performance of the golf club head 4900. The apparatus, methods, and articles of manufacture described herein are not limited in this regard.

The front pocket 4977 may be defined by an interior surface and a side surface. An outer perimeter edge may circumscribe the front pocket 4977. The interior surface of the front pocket may be a surface of the interior wall 4978. The interior wall 4978 may extend in a heel-to-toe direction. The interior wall 4978 may have a thickness extending in a front-to-rear direction. In one example, the interior wall 4978 may have a thickness of between and including 0.020 inch and 0.030 inch. In another example, the interior wall 4978 may have a thickness of less than 0.030 inch. The apparatus, methods, and articles of manufacture described herein are not limited in this regard.

The interior wall 4978 of the front pocket portion 4976 may be made partially or entirely of an aluminum-based material, a magnesium-type material, a steel-based material, a titanium-based material, any combination thereof, or any other suitable material. In another example, the interior wall 4978 of the front pocket portion 4976 may be made partially or entirely of a non-metal material such as a ceramic material, a composite material, any combination thereof, or any other suitable material. The material of the interior wall 4978 of the front pocket portion 4976 may have a density of at least 4 grams per cubic centimeter. The material of the interior wall 4978 of the front pocket portion 4976 may have a density of at least 4.5 grams per cubic centimeter. The material of the interior wall 4978 of the front pocket portion 4976 may be the same material as a body portion 4910 of the golf club head 4900. The material of the interior wall 4978 of the front pocket portion 4976 may be a different material than the body portion 4910 of the golf club head 4900. The apparatus, methods, and articles of manufacture described herein are not limited in this regard.

In one example, the face portion 4975 may have a thickness between and including 0.075 and 0.125 inch. In another example, the face portion 4975 may have a thickness between and including 0.090 and 0.110 inch. In another example, the face portion 4975 may have a thickness of less than or equal to 0.125 inch. In another example, the face portion 4975 may have a thickness of less than or equal to 0.115 inch. The apparatus, methods, and articles of manufacture described herein are not limited in this regard.

The face portion 4975 may be made partially or entirely of an aluminum-based material, a magnesium-type material, a steel-based material, a titanium-based material, any combination thereof, or any other suitable material. In another example, face portion 4975 may be made partially or entirely of a non-metal material such as a ceramic material, a composite material, any combination thereof, or any other suitable material. The material of the face portion 4975 may have a density of at least 4 grams per cubic centimeter. The material of the face portion 4975 may have a density of at least 4.5 grams per cubic centimeter. The material of the face portion 4975 may have a higher density than the material of the interior wall 4978 of the front pocket portion 4976. The material of the face portion 4975 may have a higher yield strength than the material of the interior wall of the front pocket. For example, the material of the face portion 4975 may have a yield strength at least 40% higher than the yield strength of a material of the interior wall 4978 of the front pocket. The apparatus, methods, and articles of manufacture described herein are not limited in this regard.

In one example, the polymer insert may contact the entire rear surface of the face portion 4975. In another example, shown in FIG. 49, the polymer insert 4911 may contact a portion of the rear surface of the face portion 4975. In another example, the rear surface of the face portion may not directly contact the polymer insert within the front pocket. In examples where the rear surface of the face portion only partially contacts the polymer insert 4911 or does not contact the polymer insert 4911, a face cavity may exist within the front pocket 4977 between the rear surface of the face portion 4975 and the interior wall 4978 of the front pocket portion 4976. In one example, the face cavity may have a depth, measured front-to-rear, between and including 0.020 inch and 0.250 inch. In another example, the face cavity may have a depth, measured front-to-rear, between and including 0.030 inch and 0.110 inch. In another example, the face cavity may have a depth, measure front-to-rear, of less than 0.110 inch. In another example, the face cavity may have a depth, measure front-to-rear, of less than 0.030 inch. In still another example, the face cavity may have a depth, measured front-to-rear, of greater than 0.250 inch. The apparatus, methods, and articles of manufacture described herein are not limited in this regard.

The face cavity 4998 may include filler material. In one example, the face cavity 4998 may be fully filled with filler material. In another example, the face cavity 4998 may be partially filled with filler material. The filler material may be injected around a perimeter of the polymer insert 4911. The filler material may have a higher durometer than material of the polymer insert 4911. The filler material may have a lower durometer than material of the polymer insert 4911. The filler material may contact the polymer insert 4911, the interior wall 4978, and the face portion 4975. The filler material may surround a perimeter of the polymer insert 4911. The filler material may be located between the interior wall 4978 and the polymer insert 4911. The filler material may be located between the face portion 4975 and the polymer insert 4911. The filler material may be located between the interior wall 4978 and the polymer insert 4911 and between the face portion 4975 and the polymer insert 4911. In another example, the face cavity 4998 may not be filled with filler material. The apparatus, methods, and articles of manufacture described herein are not limited in this regard.

The filler material may be an elastic polymer or elastomer material (e.g., a viscoelastic urethane polymer material such as Sorbothane® material manufactured by Sorbothane, Inc., Kent, Ohio), a thermoplastic elastomer material (TPE), a thermoplastic polyurethane material (TPU), and/or other suitable types of materials to absorb shock, isolate vibration, and/or dampen noise. In another example, the filler material may be a high density ethylene copolymer ionomer, a fatty acid modified ethylene copolymer ionomer, a highly amorphous ethylene copolymer ionomer, an ionomer of ethylene acid acrylate terpolymer, an ethylene copolymer comprising a magnesium ionomer, an injection moldable ethylene copolymer that may be used in conventional injection molding equipment to create various shapes, an ethylene copolymer that can be used in conventional extrusion equipment to create various shapes, and/or an ethylene copolymer having high compression and low resilience similar to thermoset polybutadiene rubbers. For example, the ethylene copolymer may include any of the ethylene copolymers associated with DuPont™ High-Performance Resin (HPF) family of materials (e.g., DuPont™ HPF AD1172, DuPont™ HPF AD1035, DuPont® HPF 1000 and DuPont™ HPF 2000), which are manufactured by E.I. du Pont de Nemours and Company of Wilmington, Delaware. The DuPont™ HPF family of ethylene copolymers are injection moldable and may be used with conventional injection molding equipment and molds, provide low compression, and provide high resilience. The apparatus, methods, and articles of manufacture described herein are not limited in this regard.

The filler material may be added to the front pocket 4977 prior to joining the face portion 4975 to the front portion 4970. Alternately, the filler material may be added to the face cavity after joining the face portion to the front portion. In examples where the filler material is added to the face cavity after the face portion 4975 is installed in the front pocket 4977, the filler material may be added to the front pocket through one or more access holes. An access hole may extend through any bounding surface of the face cavity. For instance, the access hole may extend from the interior volume of the golf club head 8200 through the interior wall 4978 of the front pocket 4977. Alternately, the access hole may be provided through the side wall 4979 of the front pocket portion 4976 or through the face portion 4975. One or more port holes may be provided to allow air to escape from the face cavity during the filling process. A port hole may extend through any bounding surface of the face cavity. The apparatus, methods, and articles of manufacture described herein are not limited in this regard.

The filler material may be a liquid, solid, gas, or combination thereof. In one example, the filler material may be a solid filler material with gas bubbles trapped within the solid filler material. In another example, the filler material may be a solution of liquid filler material having suspended solid particles. Where the filler material includes a liquid or gaseous filler material, the face cavity may be a sealed cavity. Where the filler material includes a liquid or gaseous filler material, the contents of the face cavity may be pressurized to a pressure greater than atmospheric pressure. In one example, the filler material may be pressurized to a pressure of between and including 1.1 atm and 25 atm. In another example, the filler material may be pressurized to a pressure of between and including 1.1 atm and 10 atm. In still another example, the filler material may be pressurized to a pressure of between and including 1.1 atm and 5 atm. The apparatus, methods, and articles of manufacture described herein are not limited in this regard.

In the example of FIG. 50, a golf club head 5000 may include a body portion 5010 with a top portion 5030, a crown portion (not shown), a bottom portion 5040, a toe portion 5050, a heel portion 5060, a front portion 5070, and a rear portion 5080. The bottom portion 5040 may include a skirt portion 5090 defined as a side portion of the golf club head 5000 between the top portion 5030 and the bottom portion 5040 excluding the front portion 5070 and extending across a periphery of the golf club head 5000 from the toe portion 5050, around the rear portion 5080, and to the heel portion 5060. Alternatively, the golf club head 5000 may not include the skirt portion 5090. The front portion 5070 may include a face portion 5075 to engage a golf ball. The face portion 5075 may be a separate face portion that is coupled (e.g., welded) to the golf club head 5000. The body portion 5010 may also include a hosel portion 5065 configured to receive a shaft portion (similar to the example shaft portion 6512 shown in FIG. 65). The hosel portion 5065 may be similar in many respects to any of the hosel portions described herein. The hosel portion 5065 may include an interchangeable hosel sleeve. Alternatively, the body portion 5010 may include a bore instead of the hosel portion 5065. The body portion 5010 may be made partially or entirely of an aluminum-based material, a magnesium-type material, a steel-based material, a titanium-based material, any combination thereof, or any other suitable material. In another example the body portion 5010 may be made partially or entirely of a non-metal material such as a ceramic material, a composite material, any combination thereof, or any other suitable material. The apparatus, methods, and articles of manufacture described herein are not limited in this regard.

The golf club head 5000 may have a club head volume greater than or equal to 300 cubic centimeters (cm3 or cc). In one example, the golf club head 5000 may be about 460 cc. Alternatively, the golf club head 5000 may have a club head volume less than or equal to 300 cc. In particular, the golf club head 5000 may have a club head volume between 100 cc and 200 cc. The club head volume of the golf club head 5000 may be determined by using the weighted water displacement method (i.e., Archimedes Principle). For example, procedures defined by golf standard organizations and/or governing bodies such as the United States Golf Association (USGA) and/or the Royal and Ancient Golf Club of St. Andrews (R&A) may be used for measuring the club head volume of the golf club head 5000. Although FIG. 50 may depict a particular type of club head (e.g., a driver-type club head), the apparatus, methods, and articles of manufacture described herein may be applicable to other types of club head (e.g., a fairway wood-type club head, a hybrid-type club head, an iron-type club head, a putter-type club head, etc.). The apparatus, methods, and articles of manufacture described herein are not limited in this regard.

The golf club head 5000 may include a front opening 5071 in the front portion 5070. A front pocket portion 5076 may be joined to the front portion 5070 and enclose the front opening 5071. The front pocket portion 5076 may include a front pocket 5077 defined by an interior wall 5078 and a side wall 5079. The apparatus, methods, and articles of manufacture described herein are not limited in this regard.

A face portion 5075 may be positioned in the front pocket 5077. The face portion 5075 may include a front surface, a rear surface, a side surface, a front perimeter edge, and a rear perimeter edge. The face portion 5075 may be joined (e.g. welded) to the side wall 5079 of the front pocket portion. The front pocket 5077 may serve as an assembly aid that allows the face portion 5075 to be easily and accurately positioned relative to the front portion 5070 during a joining process, such as a welding process where the face portion 5075 is welded to the front pocket portion 5076. By accurately positioning the face portion 5075 relative to the front portion 5070 during the joining process, time and expense associated with subsequent finishing processes, such as sanding or polishing processes, may be reduced. Also, variability between manufactured golf club heads may be reduced for improved consistency of performance. An interior wall 5078 of the front pocket 5077 may reinforce and support the front portion 5070 during impact with a golf ball. The apparatus, methods, and articles of manufacture described herein are not limited in this regard.

The front pocket 5077 may be defined by an interior surface and a side surface. An outer perimeter edge may circumscribe the front pocket 5077. The interior surface of the front pocket may be a surface of the interior wall 5078. The interior wall 5078 may extend in a heel-to-toe direction. The interior wall 5078 may have a thickness extending in a front-to-rear direction. In one example, the interior wall 5078 may have a thickness of between and including 0.020 inch and 0.030 inch. In another example, the interior wall 5078 may have a thickness of less than 0.030 inch. The apparatus, methods, and articles of manufacture described herein are not limited in this regard.

The interior wall 5078 of the front pocket portion 5076 may be made partially or entirely of an aluminum-based material, a magnesium-type material, a steel-based material, a titanium-based material, any combination thereof, or any other suitable material. In another example, the interior wall 5078 of the front pocket portion 5076 may be made partially or entirely of a non-metal material such as a ceramic material, a composite material, any combination thereof, or any other suitable material. The material of the interior wall 5078 of the front pocket portion 5076 may have a density of at least 4 grams per cubic centimeter. The material of the interior wall 5078 of the front pocket portion 5076 may have a density of at least 4.5 grams per cubic centimeter. The material of the interior wall 5078 of the front pocket portion 5076 may be the same material as a body portion 5010 of the golf club head 5000. The material of the interior wall 5078 of the front pocket portion 5076 may be a different material than the body portion 5010 of the golf club head 5000. The apparatus, methods, and articles of manufacture described herein are not limited in this regard.

In one example, the face portion 5075 may have a thickness between and including 0.075 and 0.125 inch. In another example, the face portion 5075 may have a thickness between and including 0.090 and 0.110 inch. In yet another example, the face portion 5075 may have a thickness of less than 0.115 inch. The apparatus, methods, and articles of manufacture described herein are not limited in this regard.

The face portion 5075 may be made partially or entirely of an aluminum-based material, a magnesium-type material, a steel-based material, a titanium-based material, any combination thereof, or any other suitable material. In another example, face portion 5075 may be made partially or entirely of a non-metal material such as a ceramic material, a composite material, any combination thereof, or any other suitable material. The material of the face portion 5075 may have a density of at least 4 grams per cubic centimeter. The material of the face portion 5075 may have a density of at least 4.5 grams per cubic centimeter. The material of the face portion 5075 may have a higher density than the material of the interior wall 5078 of the front pocket portion 5076. The material of the face portion 5075 may have a higher yield strength than the material of the interior wall 5078 of the front pocket portion. For example, the material of the face portion 5075 may have a yield strength at least 40% higher than the yield strength of a material of the interior wall 5078 of the front pocket portion 5076. The apparatus, methods, and articles of manufacture described herein are not limited in this regard.

A gap 5015 may exist between an outer perimeter edge of the face portion 5075 and the outer perimeter edge of the front pocket portion 5076, as shown in FIG. 50. During manufacturing, the gap 5015 may be entirely or partially filled with weld material during a welding process in which the face portion 5075 is joined to the front portion 5070. A sanding or polishing process may follow in which excess weld material is removed to produce a smooth surface across the front portion 5070 of the golf club head 5000. The apparatus, methods, and articles of manufacture described herein are not limited in this regard.

In the example of FIG. 51, a golf club head 5100 may include a body portion 5110 with a top portion 5130, a crown portion (not shown), a bottom portion 5140, a toe portion 5150, a heel portion 5160, a front portion 5170, and a rear portion 5180. The bottom portion 5140 may include a skirt portion 5190 defined as a side portion of the golf club head 5100 between the top portion 5130 and the bottom portion 5140 excluding the front portion 5170 and extending across a periphery of the golf club head 5100 from the toe portion 5150, around the rear portion 5180, and to the heel portion 5160. Alternatively, the golf club head 5100 may not include the skirt portion 5190. The front portion 5170 may include a face portion 5175 to engage a golf ball. The face portion 5175 may be a separate face portion that is coupled (e.g., welded) to the golf club head 5100. The body portion 5110 may also include a hosel portion 5165 configured to receive a shaft portion (similar to the example shaft portion 6512 shown in FIG. 65). The hosel portion 5165 may be similar in many respects to any of the hosel portions described herein. The hosel portion 5165 may include an interchangeable hosel sleeve. Alternatively, the body portion 5110 may include a bore instead of the hosel portion 5165. The body portion 5110 may be made partially or entirely of an aluminum-based material, a magnesium-type material, a steel-based material, a titanium-based material, any combination thereof, or any other suitable material. In another example the body portion 5110 may be made partially or entirely of a non-metal material such as a ceramic material, a composite material, any combination thereof, or any other suitable material. The apparatus, methods, and articles of manufacture described herein are not limited in this regard.

The golf club head 5100 may have a club head volume greater than or equal to 300 cubic centimeters (cm3 or cc). In one example, the golf club head 5100 may be about 460 cc. Alternatively, the golf club head 5100 may have a club head volume less than or equal to 300 cc. In particular, the golf club head 5100 may have a club head volume between 100 cc and 200 cc. The club head volume of the golf club head 5100 may be determined by using the weighted water displacement method (i.e., Archimedes Principle). For example, procedures defined by golf standard organizations and/or governing bodies such as the United States Golf Association (USGA) and/or the Royal and Ancient Golf Club of St. Andrews (R&A) may be used for measuring the club head volume of the golf club head 5100. Although FIG. 51 may depict a particular type of club head (e.g., a driver-type club head), the apparatus, methods, and articles of manufacture described herein may be applicable to other types of club head (e.g., a fairway wood-type club head, a hybrid-type club head, an iron-type club head, a putter-type club head, etc.). The apparatus, methods, and articles of manufacture described herein are not limited in this regard.

The golf club head 5100 may include a front opening 5171 in the front portion 5170. A front pocket portion 5176 may be joined to the front portion 5170 and enclose the front opening 5171. The front pocket portion 5176 may include a front pocket 5177 defined by an interior wall 5178 and a side wall 5179. The apparatus, methods, and articles of manufacture described herein are not limited in this regard.

A face portion 5175 may be positioned in the front pocket 5177. The face portion 5175 may include a front surface, a rear surface, a side surface, a front perimeter edge, and a rear perimeter edge. The face portion 5175 may be joined (e.g. welded) to the side wall 5179 of the front pocket portion 5176. A filler material 5199 may occupy a face cavity 5198 and provide structural support between the interior wall 5178 of the front pocket portion 5176 and the face portion 5175. The filler material may support the face portion 5175 and limit rearward deflection of the face portion during a ball strike. The apparatus, methods, and articles of manufacture described herein are not limited in this regard.

The front pocket portion 5176 may serve as an assembly aid that allows the face portion 5175 to be easily and accurately positioned relative to the front portion 5170 during a joining process, such as a welding process where the face portion 5175 is welded to the front portion 5170. By accurately positioning the face portion 5175 relative to the front portion 5170 during the joining process, time and expense associated with subsequent finishing processes, such as sanding or polishing processes, may be reduced. Also, variability between manufactured golf club heads may be reduced for improved consistency of performance. An interior wall 5178 of the front pocket 5177 may reinforce and support the face portion 5175 during impact with a golf ball. The front pocket 5177 and the filler material 5199 may improve the structural integrity of the golf club head 5100. The front pocket 5177 and filler material 5199 may improve the performance of the golf club head 5300. The apparatus, methods, and articles of manufacture described herein are not limited in this regard.

The front pocket 5177 may be defined by an interior surface and a side surface. An outer perimeter edge may circumscribe the front pocket 5177. The interior surface of the front pocket may be a surface of the interior wall 5178. The interior wall 5178 may extend in a heel-to-toe direction. The interior wall 5178 may have a thickness extending in a front-to-rear direction. In one example, the interior wall 5178 may have a thickness of between and including 0.020 inch and 0.030 inch. In another example, the interior wall 5178 may have a thickness of less than 0.030 inch. The apparatus, methods, and articles of manufacture described herein are not limited in this regard.

The interior wall 5178 of the front pocket portion 5176 may be made partially or entirely of an aluminum-based material, a magnesium-type material, a steel-based material, a titanium-based material, any combination thereof, or any other suitable material. In another example, the interior wall 5178 of the front pocket portion 5176 may be made partially or entirely of a non-metal material such as a ceramic material, a composite material, any combination thereof, or any other suitable material. The material of the interior wall 5178 of the front pocket portion 5176 may have a density of at least 4 grams per cubic centimeter. The material of the interior wall 5178 of the front pocket portion 5176 may have a density of at least 4.5 grams per cubic centimeter. The material of the interior wall 5178 of the front pocket portion 5176 may be the same material as a body portion 5110 of the golf club head 5100. The material of the interior wall 5178 of the front pocket portion 5176 may be a different material than the body portion 5110 of the golf club head 5100. The apparatus, methods, and articles of manufacture described herein are not limited in this regard.

In one example, the face portion 5175 may have a thickness between and including 0.075 and 0.125 inch. In another example, the face portion 5175 may have a thickness between and including 0.090 and 0.110 inch. In yet another example, the face portion 5175 may have a thickness of less than 0.115 inch. The apparatus, methods, and articles of manufacture described herein are not limited in this regard.

The face portion 5175 may be made partially or entirely of an aluminum-based material, a magnesium-type material, a steel-based material, a titanium-based material, any combination thereof, or any other suitable material. In another example, face portion 5175 may be made partially or entirely of a non-metal material such as a ceramic material, a composite material, any combination thereof, or any other suitable material. The material of the face portion 5175 may have a density of at least 4 grams per cubic centimeter. The material of the face portion 5175 may have a density of at least 4.5 grams per cubic centimeter. The material of the face portion 5175 may have a higher density than the material of the interior wall 5178 of the front pocket portion 5176. The material of the face portion 5175 may have a higher yield strength than the material of the interior wall of the front pocket. For example, the material of the face portion 5175 may have a yield strength at least 40% higher than the yield strength of a material of the interior wall 5178 of the front pocket. The apparatus, methods, and articles of manufacture described herein are not limited in this regard.

A gap 5115 may exist between an outer perimeter edge of the face portion 5175 and the outer perimeter edge of the front pocket portion 5176, as shown in FIG. 51. During manufacturing, the gap 5115 may be entirely or partially filled with weld material during a welding process in which the face portion 5175 is joined to the front portion 5170. A sanding or polishing process may follow in which excess weld material is removed to produce a smooth surface across the front portion 5170 of the golf club head 5100. The apparatus, methods, and articles of manufacture described herein are not limited in this regard.

Figure 52:
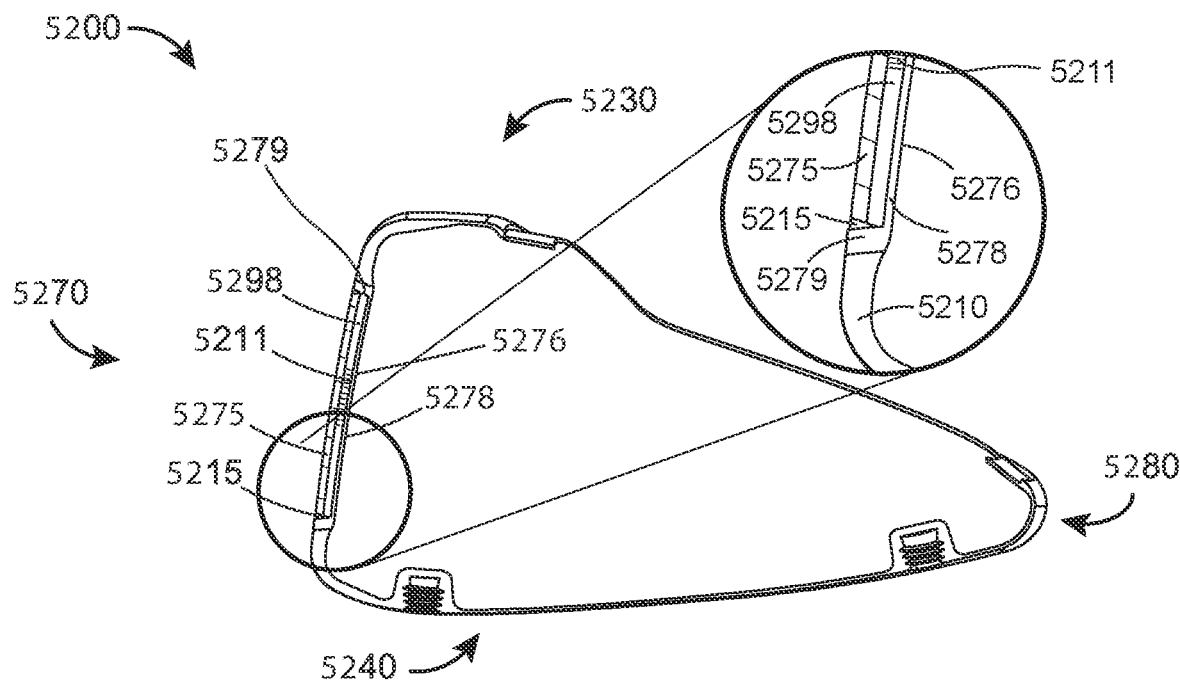
FIG. 52 depicts a side cross-sectional view of an example golf club head according to an embodiment of the apparatus, methods, and articles of manufacture described herein.

In the example of FIG. 52, a golf club head 5200 may include a body portion 5210 with a top portion 5230, a crown portion (not shown), a bottom portion 5240, a toe portion 5250, a heel portion 5260, a front portion 5270, and a rear portion 5280. The bottom portion 5240 may include a skirt portion 5290 defined as a side portion of the golf club head 5200 between the top portion 5230 and the bottom portion 5240 excluding the front portion 5270 and extending across a periphery of the golf club head 5200 from the toe portion 5250, around the rear portion 5280, and to the heel portion 5260. Alternatively, the golf club head 5200 may not include the skirt portion 5290. The front portion 5270 may include a face portion 5275 to engage a golf ball. The face portion 5275 may be a separate face portion that is coupled (e.g., welded) to the golf club head 5200. The body portion 5210 may also include a hosel portion 5265 configured to receive a shaft portion (similar to the example shaft portion 6512 shown in FIG. 65). The hosel portion 5265 may be similar in many respects to any of the hosel portions described herein. The hosel portion 5265 may include an interchangeable hosel sleeve. Alternatively, the body portion 5210 may include a bore instead of the hosel portion 5265. The body portion 5210 may be made partially or entirely of an aluminum-based material, a magnesium-type material, a steel-based material, a titanium-based material, any combination thereof, or any other suitable material. In another example the body portion 5210 may be made partially or entirely of a non-metal material such as a ceramic material, a composite material, any combination thereof, or any other suitable material. The apparatus, methods, and articles of manufacture described herein are not limited in this regard.

The golf club head 5200 may have a club head volume greater than or equal to 300 cubic centimeters (cm3 or cc). In one example, the golf club head 5200 may be about 460 cc. Alternatively, the golf club head 5200 may have a club head volume less than or equal to 300 cc. In particular, the golf club head 5200 may have a club head volume between 100 cc and 200 cc. The club head volume of the golf club head 5200 may be determined by using the weighted water displacement method (i.e., Archimedes Principle). For example, procedures defined by golf standard organizations and/or governing bodies such as the United States Golf Association (USGA) and/or the Royal and Ancient Golf Club of St. Andrews (R&A) may be used for measuring the club head volume of the golf club head 5200. Although FIG. 52 may depict a particular type of club head (e.g., a driver-type club head), the apparatus, methods, and articles of manufacture described herein may be applicable to other types of club head (e.g., a fairway wood-type club head, a hybrid-type club head, an iron-type club head, a putter-type club head, etc.). The apparatus, methods, and articles of manufacture described herein are not limited in this regard.

The golf club head 5200 may include a front opening 5271 in the front portion 5270. A front pocket portion 5276 may enclose the front opening 5271. The front pocket portion 5276 may include a front pocket 5277 defined by an interior wall 5278 and a side wall 5279. A polymer insert 5211 may be positioned in the front pocket 5277. The polymer insert 5211 may be positioned between the face portion 5275 and the interior wall 5278 of the front pocket portion 5276. The polymer insert 5211 may extend from the face portion 5275 to the interior wall 5278 of the front pocket portion 5276. The polymer insert 5211 may be compressed between the face portion 5275 and the interior wall 5278 of the front pocket portion 5276. The polymer insert 5211 may be disk-shaped or any other suitable shape. The polymer insert 5211 may include any of the polymer materials described herein. The apparatus, methods, and articles of manufacture described herein are not limited in this regard.

A face portion 5275 may be positioned in the pocket 5277. The face portion 5275 may include a front surface, a rear surface, a side surface, a front perimeter edge, and a rear perimeter edge. The face portion 5275 may be joined (e.g. welded) to the side wall 5279 of the front pocket portion. The polymer insert 5211 may provide structural support between the interior wall 5278 of the front pocket portion 5276 and the face portion 5275 and thereby support the face portion and limit inward deflection of the face portion during a ball strike. The apparatus, methods, and articles of manufacture described herein are not limited in this regard.

The front pocket 5277 may serve as an assembly aid that allows the face portion 5275 to be easily and accurately positioned relative to the front portion 5270 during a joining process, such as a welding process where the face portion 5275 is welded to the front portion 5270. By accurately positioning the face portion 5275 relative to the front portion 5270 during the joining process, time and expense associated with subsequent finishing processes, such as sanding or polishing processes, may be reduced. Also, variability between manufactured golf club heads may be reduced for improved consistency of performance. An interior wall 5278 of the front pocket 5277 may reinforce and support the face portion 5275 during impact with a golf ball. The front pocket 5277 and polymer insert 5211 may improve the structural integrity of the golf club head 5200. The front pocket 5277 and polymer insert 5211 may improve the performance of the golf club head 5200. The apparatus, methods, and articles of manufacture described herein are not limited in this regard.

The front pocket 5277 may be defined by an interior surface and a side surface. An outer perimeter edge may circumscribe the front pocket 5277. The interior surface of the front pocket may be a surface of the interior wall 5278. The interior wall 5278 may extend in a heel-to-toe direction. The interior wall 5278 may have a thickness extending in a front-to-rear direction. In one example, the interior wall 5278 may have a thickness of between and including 0.020 inch and 0.030 inch. In another example, the interior wall 5278 may have a thickness of less than 0.030 inch. The apparatus, methods, and articles of manufacture described herein are not limited in this regard.

The interior wall 5278 of the front pocket portion 5276 may be made partially or entirely of an aluminum-based material, a magnesium-type material, a steel-based material, a titanium-based material, any combination thereof, or any other suitable material. In another example, the interior wall 5278 of the front pocket portion 5276 may be made partially or entirely of a non-metal material such as a ceramic material, a composite material, any combination thereof, or any other suitable material. The material of the interior wall 5278 of the front pocket portion 5276 may have a density of at least 4 grams per cubic centimeter. The material of the interior wall 5278 of the front pocket portion 5276 may have a density of at least 4.5 grams per cubic centimeter. The material of the interior wall 5278 of the front pocket portion 5276 may be the same material as a body portion 5210 of the golf club head 5200. The material of the interior wall 5278 of the front pocket portion 5276 may be a different material than the body portion 5210 of the golf club head 5200. The apparatus, methods, and articles of manufacture described herein are not limited in this regard.

In one example, the face portion 5275 may have a thickness between and including 0.075 and 0.125 inch. In another example, the face portion 5275 may have a thickness between and including 0.090 and 0.110 inch. In yet another example, the face portion 5275 may have a thickness of less than 0.115 inch. The apparatus, methods, and articles of manufacture described herein are not limited in this regard.

The face portion 5275 may be made partially or entirely of an aluminum-based material, a magnesium-type material, a steel-based material, a titanium-based material, any combination thereof, or any other suitable material. In another example, face portion 5275 may be made partially or entirely of a non-metal material such as a ceramic material, a composite material, any combination thereof, or any other suitable material. The material of the face portion 5275 may have a density of at least 4 grams per cubic centimeter. The material of the face portion 5275 may have a density of at least 4.5 grams per cubic centimeter. The material of the face portion 5275 may have a higher density than the material of the interior wall 5278 of the front pocket portion 5276. The material of the face portion 5275 may have a higher yield strength than the material of the interior wall of the front pocket. For example, the material of the face portion 5275 may have a yield strength at least 40% higher than the yield strength of a material of the interior wall 5278 of the front pocket. The apparatus, methods, and articles of manufacture described herein are not limited in this regard.

A face cavity 5298 may exist within the front pocket 5277 between the rear surface of the face portion 5275 and the interior wall 5278 of the front pocket portion 5276. In one example, the face cavity may have a depth, measured front-to-rear, between and including 0.020 inch and 0.250 inch. In another example, the face cavity may have a depth, measured front-to-rear, between and including 0.030 inch and 0.110 inch. In yet another example, the face cavity may have a depth, measure front-to-rear, of less than 0.030 inch. In still another example, the face cavity may have a depth, measured front-to-rear, of greater than 0.250 inch. The apparatus, methods, and articles of manufacture described herein are not limited in this regard.

A gap 5215 may exist between an outer perimeter edge of the face portion 5275 and the outer perimeter edge of the front pocket portion 5276, as shown in FIG. 52. During manufacturing, the gap 5215 may be entirely or partially filled with weld material during a welding process in which the face portion 5275 is joined to the front portion 5270. A sanding or polishing process may follow in which excess weld material is removed to produce a smooth surface across the front portion 5270 of the golf club head 5200. The apparatus, methods, and articles of manufacture described herein are not limited in this regard.

In the example of FIG. 53, a golf club head 5300 may include a body portion 5310 with a top portion 5330, a crown portion (not shown), a bottom portion 5340, a toe portion 5350, a heel portion 5360, a front portion 5370, and a rear portion 5380. The bottom portion 5340 may include a skirt portion 5390 defined as a side portion of the golf club head 5300 between the top portion 5330 and the bottom portion 5340 excluding the front portion 5370 and extending across a periphery of the golf club head 5300 from the toe portion 5350, around the rear portion 5380, and to the heel portion 5360. Alternatively, the golf club head 5300 may not include the skirt portion 5390. The front portion 5370 may include a face portion 5375 to engage a golf ball. The face portion 5375 may be a separate face portion that is coupled (e.g., welded) to the golf club head 5300. The body portion 5310 may also include a hosel portion 5365 configured to receive a shaft portion (similar to the example shaft portion 6512 shown in FIG. 65). The hosel portion 5365 may be similar in many respects to any of the hosel portions described herein. The hosel portion 5365 may include an interchangeable hosel sleeve. Alternatively, the body portion 5310 may include a bore instead of the hosel portion 5365. The body portion 5310 may be made partially or entirely of an aluminum-based material, a magnesium-type material, a steel-based material, a titanium-based material, any combination thereof, or any other suitable material. In another example the body portion 5310 may be made partially or entirely of a non-metal material such as a ceramic material, a composite material, any combination thereof, or any other suitable material. The apparatus, methods, and articles of manufacture described herein are not limited in this regard.

The golf club head 5300 may have a club head volume greater than or equal to 300 cubic centimeters (cm3 or cc). In one example, the golf club head 5300 may be about 460 cc. Alternatively, the golf club head 5300 may have a club head volume less than or equal to 300 cc. In particular, the golf club head 5300 may have a club head volume between 100 cc and 200 cc. The club head volume of the golf club head 5300 may be determined by using the weighted water displacement method (i.e., Archimedes Principle). For example, procedures defined by golf standard organizations and/or governing bodies such as the United States Golf Association (USGA) and/or the Royal and Ancient Golf Club of St. Andrews (R&A) may be used for measuring the club head volume of the golf club head 5300. Although FIG. 53 may depict a particular type of club head (e.g., a driver-type club head), the apparatus, methods, and articles of manufacture described herein may be applicable to other types of club head (e.g., a fairway wood-type club head, a hybrid-type club head, an iron-type club head, a putter-type club head, etc.). The apparatus, methods, and articles of manufacture described herein are not limited in this regard.

The golf club head 5300 may include a front opening 5371 in the front portion 5370. A front pocket portion 5376 may enclose the front opening 5371. The front pocket portion 5376 may include a front pocket 5377 defined by an interior wall 5378 and a side wall 5379. A polymer insert 5311 may be positioned in the front pocket 5377. The polymer insert 5311 may be positioned between the face portion 5375 and the interior wall 5378 of the front pocket portion 5376. The polymer insert 5311 may extend from the face portion 5375 to the interior wall 5378 of the front pocket portion 5376. The polymer insert 5311 may be compressed between the face portion 5375 and the interior wall 5378 of the front pocket portion 5376. The polymer insert 5311 may be disk-shaped or any other suitable shape. The polymer insert 5311 may include any of the polymer materials described herein. The apparatus, methods, and articles of manufacture described herein are not limited in this regard.

A face portion 5375 may be positioned in the front pocket 5377. The face portion 5375 may include a front surface, a rear surface, a side surface, a front perimeter edge, and a rear perimeter edge. The face portion 5375 may be joined (e.g. welded) to the side wall 5379 of the front pocket portion. The polymer insert 5311 may provide structural support between the interior wall 5378 of the front pocket portion 5376 and the face portion 5375 and thereby support the face portion and limit inward deflection of the face portion during a ball strike. The apparatus, methods, and articles of manufacture described herein are not limited in this regard.

The front pocket 5377 may serve as an assembly aid that allows the face portion 5375 to be easily and accurately positioned relative to the front portion 5370 during a joining process, such as a welding process where the face portion 5375 is welded to the front portion 5370. By accurately positioning the face portion 5375 relative to the front portion 5370 during the joining process, time and expense associated with subsequent finishing processes, such as sanding or polishing processes, may be reduced. Also, variability between manufactured golf club heads may be reduced for improved consistency of performance. An interior wall 5378 of the front pocket 5377 may reinforce and support the face portion 5375 during impact with a golf ball. The front pocket 5377 and polymer insert 5311 may improve the structural integrity of the golf club head 5300. The front pocket 5377 and polymer insert 5311 may improve the performance of the golf club head 5300. The apparatus, methods, and articles of manufacture described herein are not limited in this regard.

The front pocket 5377 may be defined by an interior surface and a side surface. An outer perimeter edge may circumscribe the front pocket 5377. The interior surface of the front pocket may be a surface of the interior wall 5378. The interior wall 5378 may extend in a heel-to-toe direction. The interior wall 5378 may have a thickness extending in a front-to-rear direction. In one example, the interior wall 5378 may have a thickness of between and including 0.020 inch and 0.030 inch. In another example, the interior wall 5378 may have a thickness of less than 0.030 inch. The apparatus, methods, and articles of manufacture described herein are not limited in this regard.

The interior wall 5378 of the front pocket portion 5376 may be made partially or entirely of an aluminum-based material, a magnesium-type material, a steel-based material, a titanium-based material, any combination thereof, or any other suitable material. In another example, the interior wall 5378 of the front pocket portion 5376 may be made partially or entirely of a non-metal material such as a ceramic material, a composite material, any combination thereof, or any other suitable material. The material of the interior wall 5378 of the front pocket portion 5376 may have a density of at least 4 grams per cubic centimeter. The material of the interior wall 5378 of the front pocket portion 5376 may have a density of at least 4.5 grams per cubic centimeter. The material of the interior wall 5378 of the front pocket portion 5376 may be the same material as a body portion 5310 of the golf club head 5300. The material of the interior wall 5378 of the front pocket portion 5376 may be a different material than the body portion 5310 of the golf club head 5300. The apparatus, methods, and articles of manufacture described herein are not limited in this regard.

In one example, the face portion 5375 may have a thickness between and including 0.075 and 0.125 inch. In another example, the face portion 5375 may have a thickness between and including 0.090 and 0.110 inch. In yet another example, the face portion 5375 may have a thickness of less than 0.115 inch. The apparatus, methods, and articles of manufacture described herein are not limited in this regard.

The face portion 5375 may be made partially or entirely of an aluminum-based material, a magnesium-type material, a steel-based material, a titanium-based material, any combination thereof, or any other suitable material. In another example, face portion 5375 may be made partially or entirely of a non-metal material such as a ceramic material, a composite material, any combination thereof, or any other suitable material. The material of the face portion 5375 may have a density of at least 4 grams per cubic centimeter. The material of the face portion 5375 may have a density of at least 4.5 grams per cubic centimeter. The material of the face portion 5375 may have a higher density than the material of the interior wall 5378 of the front pocket portion 5376. The material of the face portion 5375 may have a higher yield strength than the material of the interior wall of the front pocket. For example, the material of the face portion 5375 may have a yield strength at least 40% higher than the yield strength of a material of the interior wall 5378 of the front pocket. The apparatus, methods, and articles of manufacture described herein are not limited in this regard.

A face cavity 5398 may exist within the front pocket 5377 between the rear surface of the face portion 5375 and the interior wall 5378 of the front pocket portion 5376. In one example, the face cavity 5398 may have a depth, measured front-to-rear, between and including 0.020 inch and 0.250 inch. In another example, the face cavity may have a depth, measured front-to-rear, between and including 0.030 inch and 0.110 inch. In yet another example, the face cavity may have a depth, measure front-to-rear, of less than 0.030 inch. In still another example, the face cavity may have a depth, measured front-to-rear, of greater than 0.250 inch. The apparatus, methods, and articles of manufacture described herein are not limited in this regard.

The face cavity 5398 may include filler material. In one example, the face cavity 5398 may be fully filled with filler material. In another example, the face cavity 5398 may be partially filled with filler material. The filler material may occupy at least 50% of the face cavity 5398. The filler material may occupy at least 75% of the face cavity 5398. The filler material may occupy at least 95% of the face cavity 5398. The filler material may occupy at least 25% of a volume of the front pocket 5377. The filler material may occupy at least 45% of a volume of the front pocket 5377. The apparatus, methods, and articles of manufacture described herein are not limited in this regard.

The filler material may be injected around a perimeter of the polymer insert 5311. The filler material may contact the polymer insert 5311, the interior wall 5378, and the face portion 5375. The filler material may surround a perimeter of the polymer insert 5311. The filler material 5399 may have a higher durometer than a material of the polymer insert 5311. The filler material 5399 may have a lower durometer than a material of the polymer insert 5311. The apparatus, methods, and articles of manufacture described herein are not limited in this regard.

A gap 5315 may exist between an outer perimeter edge of the face portion 5375 and the outer perimeter edge of the front pocket 5376 portion, as shown in FIG. 53. During manufacturing, the gap 5315 may be entirely or partially filled with weld material during a welding process in which the face portion 5375 is joined to the front portion 5370. A sanding or polishing process may follow in which excess weld material is removed to produce a smooth surface across the front portion 5370 of the golf club head 5300. The apparatus, methods, and articles of manufacture described herein are not limited in this regard.

Any of the golf club heads described herein may be part of a golf club. The golf club may include a shaft portion (similar to the example shaft portion 6512 shown in FIG. 65) extending from the golf club head. The shaft portion may have a first end attached to a hosel of the golf club head and a second end opposite the first end. The golf club may include a grip at or proximate to the second end of the shaft portion. The shaft portion may be formed from metal material, composite material, or any other suitable material or combination of materials. The grip may be formed from rubber material, polymer material, or any other suitable material or combination of materials. The apparatus, methods, and articles of manufacture described herein are not limited in this regard.

In the example of FIGS. 54-57, a golf club head 5400 is shown including a body portion 5410 having a face portion 5420 defining an opening 5510. A face plate 5430 at least partially defining a strike face may be set in the opening 5510 and may be configured to close the opening 5510. The face plate 5430 may include a bezel 5440 and a strike assembly 5450 set in the bezel 5440. The strike assembly 5450 may include a plurality of sheets exemplarily shown as an outer sheet 5610, an inner sheet 5620, and an intermediate sheet 5630 disposed between the outer sheet 5610 and the inner sheet 5620. The body portion 5410 may be formed of a metal material, a non-metal material, or a combination of materials. In one example, the body portion 5410 may be formed from casting a titanium alloy (e.g., Ti-8Al-1Mo-1V). The body portion 5410 may be similar in many respects to any of the example body portions described herein. Thus, the body portion 5410 may include a composite crown and/or one or more weight portions located in or on the body portion 5410. As described herein, the face plate 5430 may be durable and lightweight. Accordingly, discretionary mass may be allocated to other portions of the golf club head 5400 thereby enabling the CG of the golf club head 5400 to be located farther away from the strike face and/or enhancing the MOI and COR of the golf club head 5400. With the face plate 5430 assembled to the body portion 5410, the golf club head 5400 may define a volume of at least 100 cc. In another example, the golf club head 5400 may define a volume of at least 200 cc. In yet another example, the golf club head 5400 may define a volume of at least 300 cc. The apparatus, methods, and articles of manufacture described herein are not limited in this regard.

Figure 55:
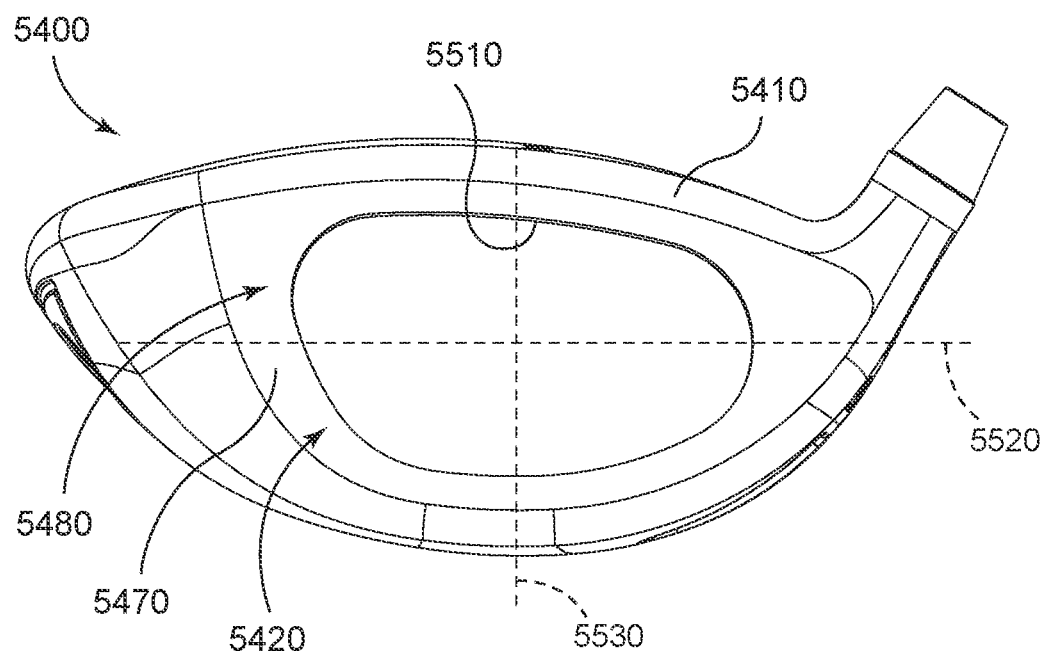
FIG. 55 depicts a front view of the example golf club head of FIG. 54 having an opening formed through a face portion.
Figure 56:
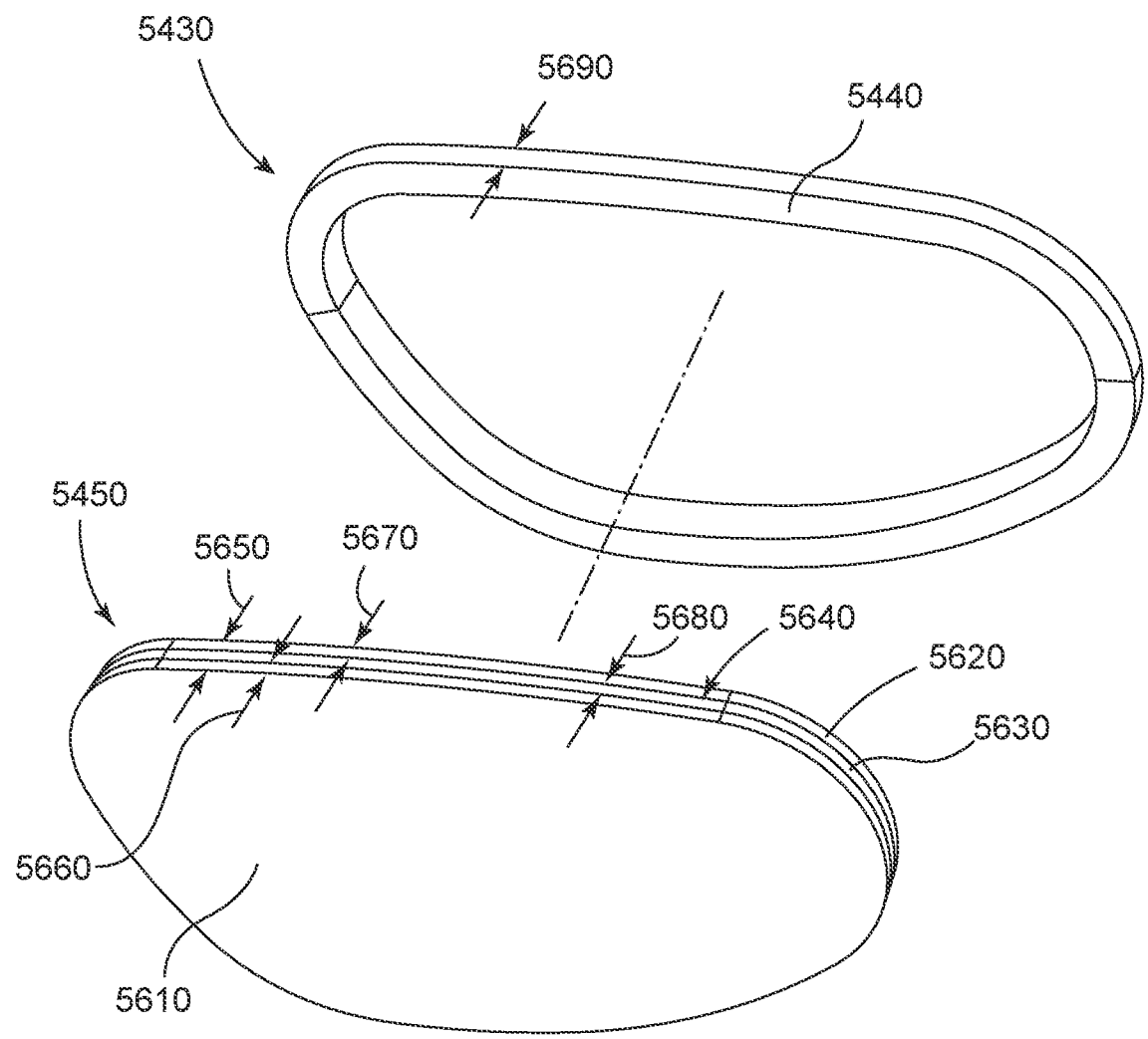
FIG. 56 depicts an exploded front perspective view of a face plate of the example golf club head of FIG. 54.
Figure 57:
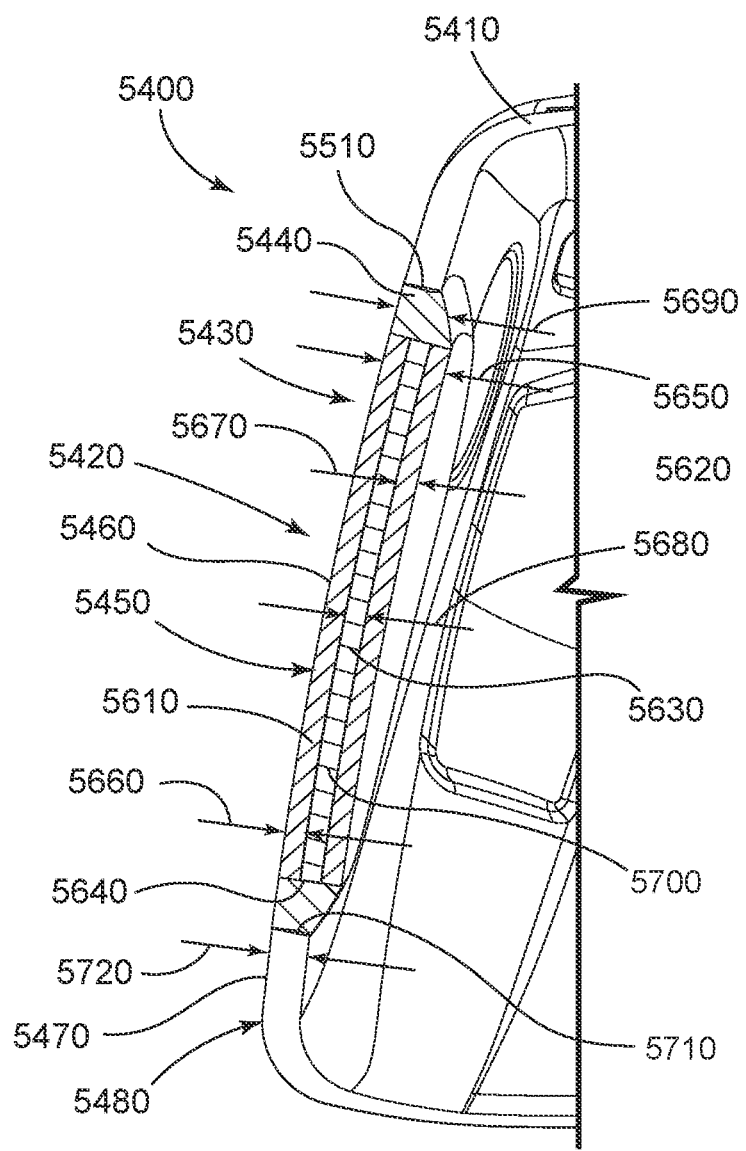
FIG. 57 depicts a cross-sectional view of the example golf club head of FIG. 54 taken at section line 57-57 of FIG. 54.

The bezel 5440 of the face plate 5430 may be provided about a periphery 5640 of the strike assembly 5450. In one example, the bezel 5440, the outer sheet 5610, and the inner sheet 5620 may be formed from a metal material including, but not limited to, a titanium alloy (e.g., Ti-6Al-4V). The intermediate sheet 5630 of the strike assembly 5450 may be formed from a composite material including, but not limited to, a fiber reinforced thermoplastic. In one example, the composite material may include a fiber reinforced thermoplastic having a plurality of discontinuous fibers transversely aligned to provide interlaminar reinforcement that improves compressive strength and toughness while reducing the overall mass of the face plate 5430. Accordingly, the intermediate sheet 5630 may include a plurality of fibers 5700 transversely aligned (e.g., orthogonal to the substrate or extending in a front-to-rear direction of the golf club head 5400) that may significantly benefit the compressive properties of the face plate 5430. Additionally, the composite material may provide vibration damping and improved sound characteristics when a golf ball is struck using the golf club head 5400. As exemplarily shown in FIG. 57, the fibers 5700 may be orthogonal to the intermediate sheet 5630 such that the fibers 5700 may extend in a front-to-rear direction of the golf club head 5400. A suitable composite material is known as Z-axis fiber and is available from Boston Materials, Inc., of Billerica, Massachusetts. In assembly, the outer sheet 5610, the inner sheet 5620, and the intermediate sheet 5630 may be provided as three separate sheets having a predetermined area (e.g., one square meter sheets). The intermediate sheet 5630 may be coupled (e.g., adhered) to the outer sheet 5610 and the inner sheet 5620 to form a sandwiched structure. The sandwiched structure may be cut to any desired shape by any method such as a waterjet process and subsequently stamped to a desired bulge and roll to define the strike assembly 5450. The strike assembly 5450 may be set in the bezel 5440 by welding the bezel 5440 to the outer sheet 5610 and the inner sheet 5620. The weld penetration depth may be selected so as not to penetrate the intermediate sheet 5630. In turn, the face plate 5430 may be set in the opening 5510 of the body portion 5410 by welding the bezel 5440 to a rim 5710 of the opening 5510. Accordingly, the face plate 5430 may have a complementary shape and size to the opening 5510. With reference to FIG. 55, the opening 5510 may be located at a central area of the face portion 5420 and may have an oval or oval-like shape that is defined by a major axis 5520 extending in a heel-to-toe direction of the golf club head 5400 and a minor axis 5530 extending in a top-to-bottom direction of the golf club head 5400. In other examples, the opening 5510 may have other geometric or nongeometric shapes. When set in the opening 5510, the face plate 5430 may define a strike surface 5460 that is flush or substantially flush with an outer surface 5470 of a peripheral face portion 5480 surrounding the opening

5510. In addition to providing improved durability and a reduction in mass, the face plate 5430 may offer improved performance over a monolithic face plate. The apparatus, methods, and articles of manufacture described herein are not limited in this regard.

The strike assembly 5450 may have a variable or uniform thickness (e.g., shown as 5650). In one example, the strike assembly 5450 may have a thickness that is greater than or equal to 0.125 inch (3.175 mm) and less than or equal to 0.175 inch (4.445 mm) with the outer sheet 5610, the inner sheet 5620, and the intermediate sheet 5630 each having a thickness (e.g., shown as 5660, 5670, and 5680, respectively) that is greater or equal to 0.042 inch (1.0668 mm) and less than or equal to 0.058 inch (1.4732 mm). In another example, the strike assembly 5450 may have a thickness that is greater than or equal to 0.125 inch (3.175 mm) and less than or equal to 0.175 inch (4.445 mm) with the outer sheet 5610 and the inner sheet 5620 each having a thickness that is greater than or equal to 0.025 inch (0.6350 mm) and less than or equal to 0.035 inch (0.8890 mm) and the intermediate sheet 5630 having a thickness that is greater than or equal to 0.075 inch (1.905 mm) and less than or equal to 0.105 inch (2.6670 mm). In another example, the strike assembly 5450 may have a thickness that is greater than or equal to 0.120 inch (3.0480 mm) and less than or equal to 0.130 inch (3.3020 mm) with the outer sheet 5610 and the inner sheet 5620 each having a thickness that is greater than or equal to 0.048 inch (1.2192 mm) and less than or equal to 0.052 inch (1.3208 mm) and the intermediate sheet 5630 having a thickness that is greater than or equal to 0.024 inch (0.6096 mm) and less than or equal to 0.026 inch (0.6604 mm). In yet another example, the strike assembly 5450 may have a thickness that is greater than or equal to 0.120 inch (3.0480 mm) and less than or equal to 0.175 inch (4.445 mm) with the outer sheet 5610 having a thickness that is greater than or equal to 0.025 inch (0.6350 mm) and less than or equal to 0.058 inch (1.4732 mm), the inner sheet 5620 having a thickness that is greater than or equal to 0.025 inch (0.6350 mm) and less than or equal to 0.058 inch (1.4732 mm), and the intermediate sheet 5630 having a thickness that is greater than or equal to 0.024 inch (0.6096 mm) and less than or equal to 0.105 inch (2.6670 mm). In other examples, the thickness of any one of the outer sheet 5610, the inner sheet 5620, or the intermediate sheet 5630 may be similar to or different from any other one of the outer sheet 5610, the inner sheet 5620, or the intermediate sheet 5630. The bezel 5440 may also have a variable or uniform thickness (e.g., shown as 5690). In one example, the bezel 5440 may have a thickness that transitions between the thickness of the strike assembly 5450 and a thickness (e.g., shown as 5720) of the peripheral face portion 5480. In one example, the peripheral face portion 5480 may have a thickness less than or equal to about 0.100 inch (2.540 mm). The thickness of the peripheral face portion 5480 may be greater than, less than, or equal to the thickness of the strike assembly 5450 and/or the bezel 5440. The apparatus, methods, and articles of manufacture described herein are not limited in this regard.

In one example, the face plate 5430 may have an outer surface area that is greater than or equal to 40% and less than or equal to 70% of an outer surface area of the face portion 5420 (e.g., combined outer surface area of the face plate 5430 and the peripheral face portion 5480). In another example, the face plate 5430 may have an outer surface area that is greater than or equal to 50% and less than or equal to 60% of an outer surface area of the face portion 5420. In one example, the golf club head 5400 may be configured as a driver-type golf club head and the face plate 5430 may have an outer surface area greater than or equal to 3.50 square inches (22.58 square centimeters) and less than or equal to 4.00 square inches (25.81 square centimeters). Generally, by increasing the relative size of the face plate 5430, a larger reduction in mass may be achieved. The apparatus, methods, and articles of manufacture described herein are not limited in this regard.

Figure 58:
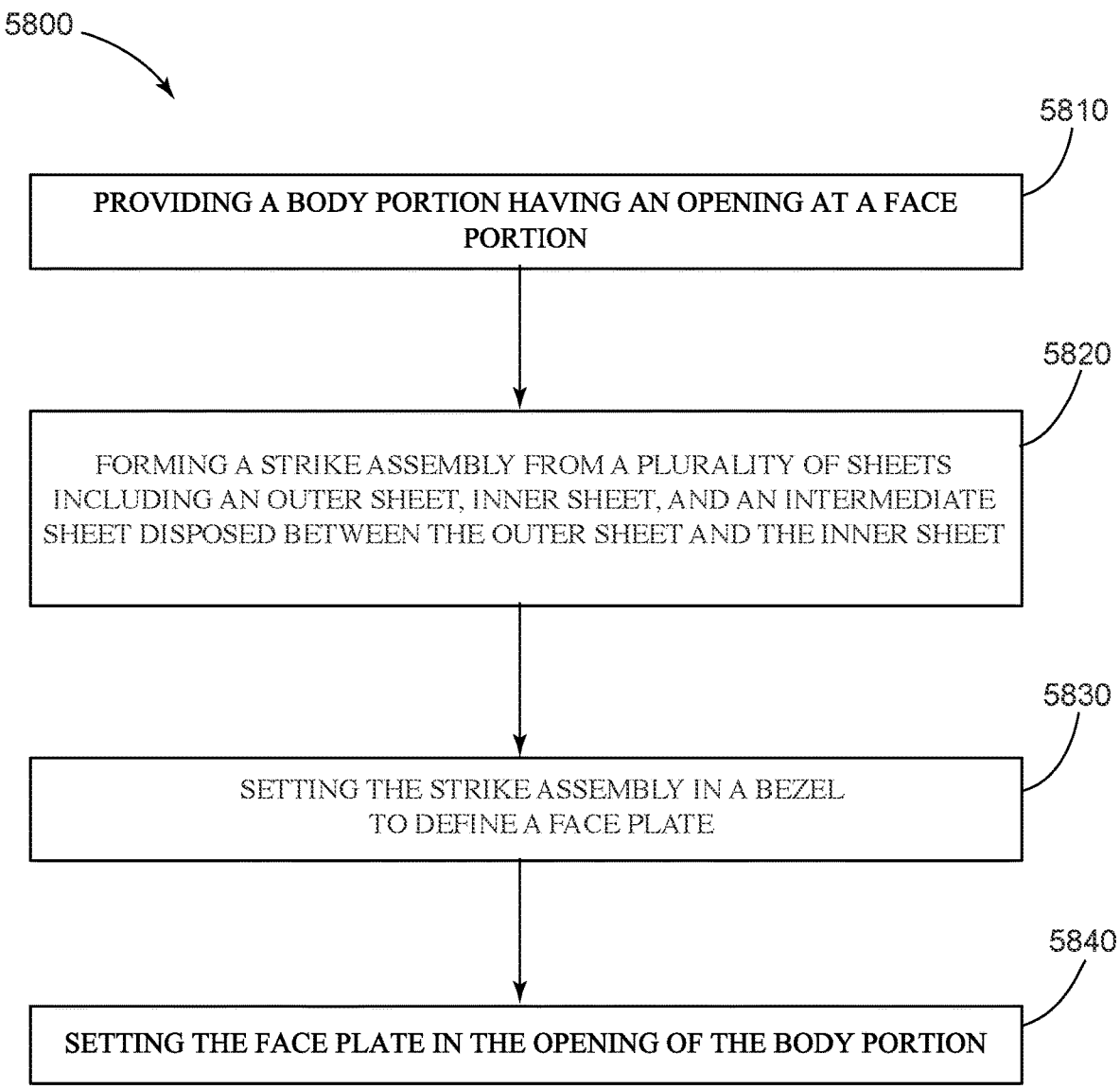
FIG. 58 depicts a process for assembling a golf club head according to an embodiment of the apparatus, methods, and articles of manufacture described herein.
Figure 59:
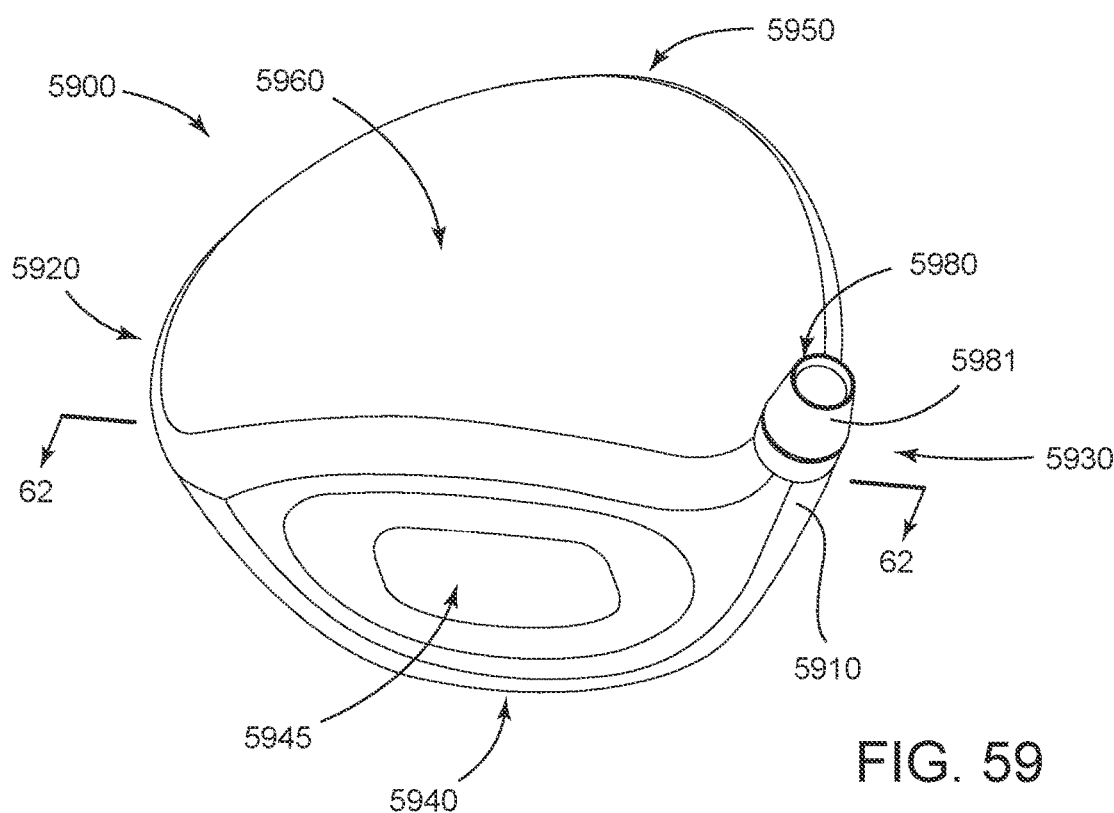
FIG. 59 illustrates a top perspective view of an example golf club head according to an embodiment of the apparatus, methods, and articles of manufacture described herein.
Figure 60:
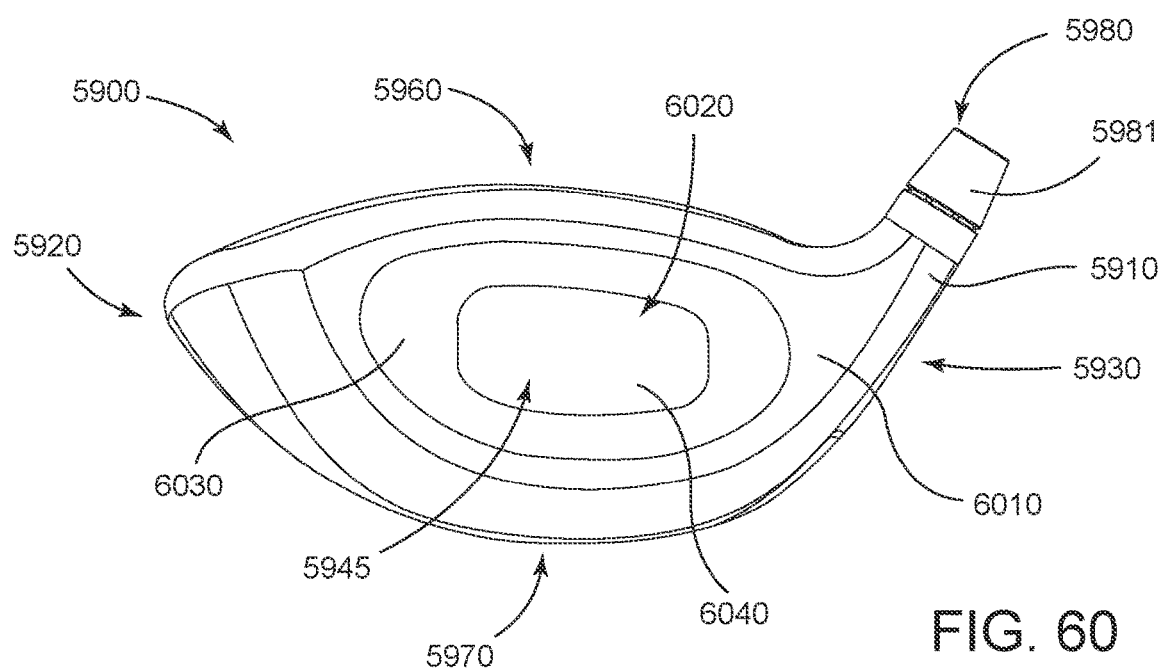
FIG. 60 illustrates a front view of the golf club head of FIG. 59.
Figure 61:
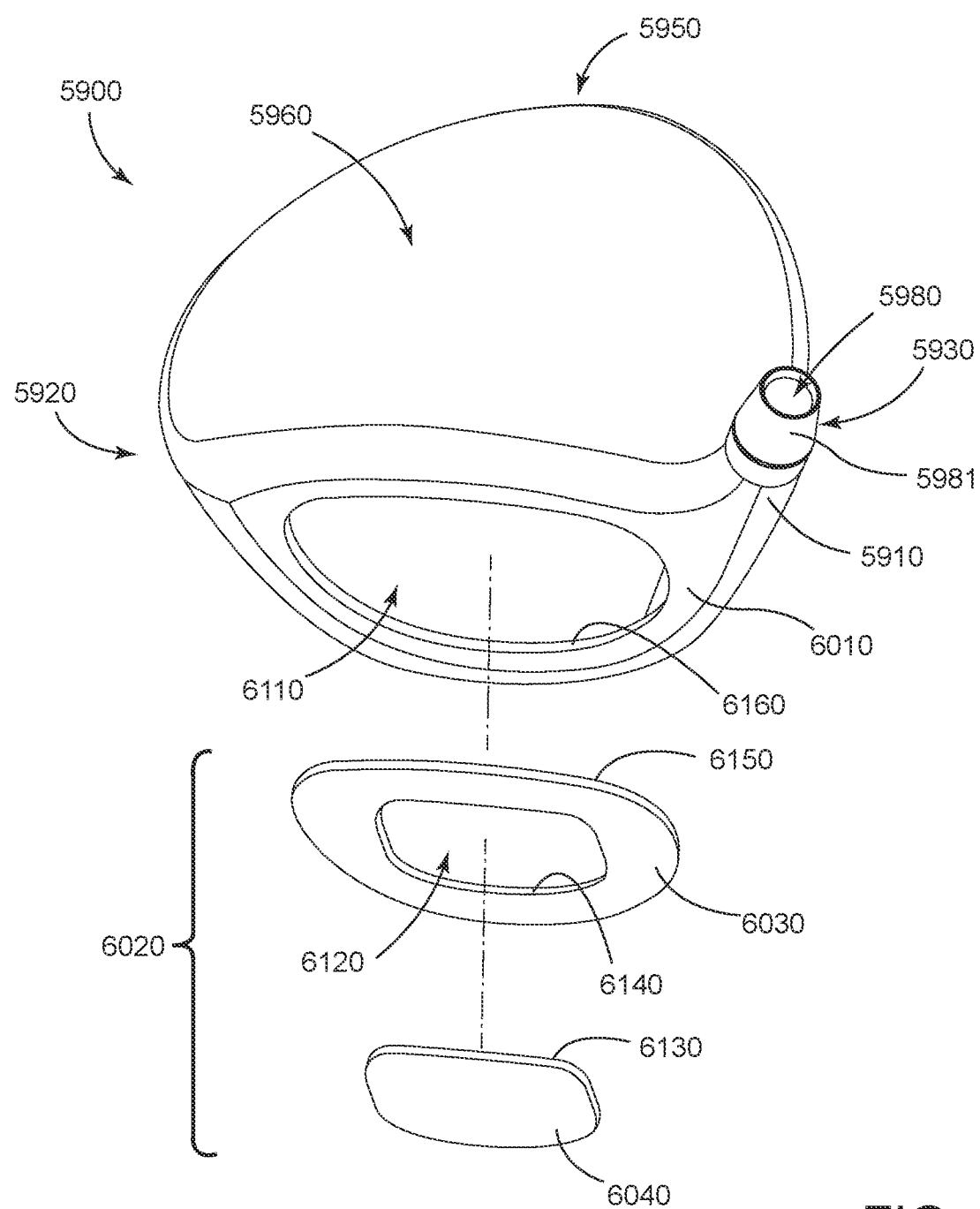
FIG. 61 illustrates an exploded view of a face portion of the golf club head of FIG. 59.
Figure 62:
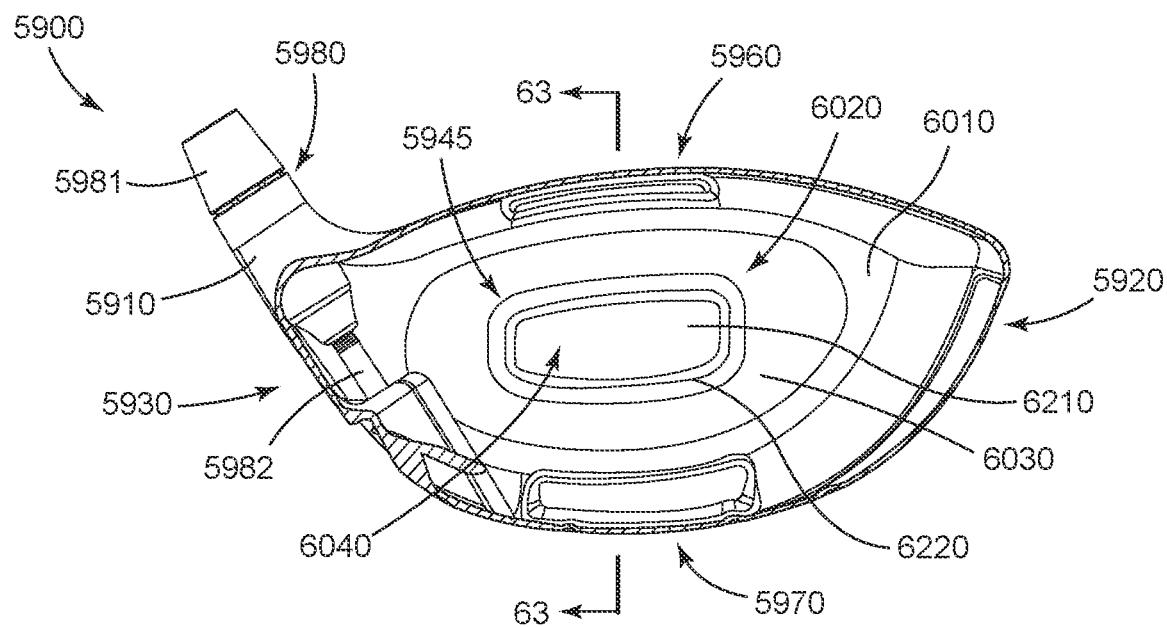
FIG. 62 illustrates a cross sectional view of the golf club head of FIG. 59 taken at section line 62-62 of FIG. 59.
Figure 63:
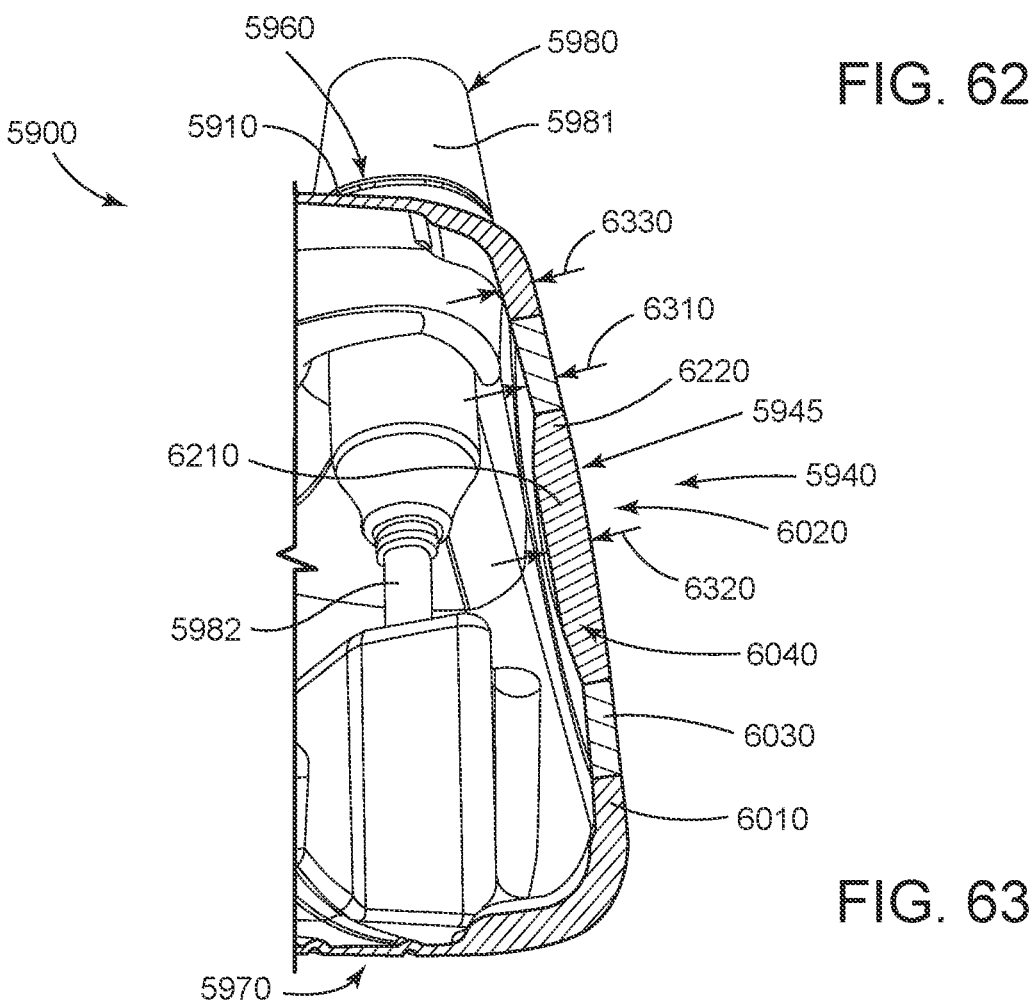
FIG. 63 illustrates a cross sectional view of the golf club head of FIG. 59 taken at section line 63-63 of FIG. 62.

In the example of FIG. 58, a process 5800 for assembling the golf club head 5400 or any of the golf club heads described herein is shown. The process 5800 may include providing a body portion 5410 having an opening 5510 at a face portion 5420 (block 5810). The body portion 5410 may be formed by casting a metal material including, but not limited to, a titanium alloy (e.g., Ti-8Al-1Mo-1V). A strike assembly 5450 may be formed from a plurality of sheets including an outer sheet 5610 (e.g., Ti-6Al-4V), an inner sheet 5620 (e.g., Ti-6Al-4V), and an intermediate sheet 5630 (e.g., fiber reinforced thermoplastic) disposed between the outer sheet 5610 and the inner sheet 5620 (block 5820). In one example, the outer sheet 5610, the inner sheet 5620, and the intermediate sheet 5630 may be provided as three separate one square meter sheets. The intermediate sheet 5630 may be adhered to the outer sheet 5610 and the inner sheet 5620 to form a sandwiched structure. The sandwiched structure may be cut to any desired shape using a waterjet process and subsequently stamped to a desired bulge and roll. The strike assembly 5450 may be set in a bezel 5440 (e.g., Ti-6Al-4V) to define a face plate 5430 (block 5830). The strike assembly 5450 may have a uniform thickness or a variable thickness achieved by milling the outer sheet 5610, the inner sheet 5620, and/or the bezel 5440. In one example, the bezel 5440 may be welded to the outer sheet 5610 and the inner sheet 5620. The face plate 5430 may be set in the opening 5510 of the body portion 5410 (block 5840) to close the opening 5510 and at least partially define a strike face of the golf club head 5400. In one example, the face plate 5430 may be set in the opening 5510 by welding the bezel 5440 to a rim 5710 of the opening 5510. The apparatus, methods, and articles of manufacture described herein are not limited in this regard.

The face plate 5430 may include a metal shell defined by the bezel 5440, the outer sheet 5610, and the inner sheet 5620 and a composite core encased by the metal shell and defined by the intermediate sheet 5630. As described herein, the face plate 5430 may benefit from improved durability and impart a reduction in mass. Accordingly, the face plate 5430 described herein may be incorporated in a golf club head to positively affect performance properties such as CG, MOI, and/or COR. The apparatus, methods, and articles of manufacture described herein are not limited in this regard.

In the example of FIGS. 59-63, a golf club head 5900 may include a body portion 5910 with a toe portion 5920, a heel portion 5930, a front portion 5940, a rear portion 5950, a top portion 5960, and a bottom portion 5970. The front portion 5940 may include a face portion 5945 configured to strike a golf ball. The body portion 5910 may also include a hosel portion 5980 configured to receive a shaft portion (similar to the example shaft portion 6512 shown in FIG. 65). The hosel portion 5980 may be similar in many respects to any of the hosel portions described herein. The hosel portion 5980 may include an interchangeable hosel sleeve 5981 and a fastener 5982. Alternatively, the body portion 5910 may include a bore instead of the hosel portion 5980. The golf club head 5900 may be made partially or entirely of an aluminum-based material, a magnesium-based material, a steel-based material, a titanium-based material, any combination thereof, or any other suitable material. In another example, the body portion 5910 may be made partially or entirely of a non-metal material such as a ceramic material, a composite material, any combination thereof, or any other suitable material. The golf club head 5900 may have a club head volume greater than or equal to 300 cubic centimeters (cm³ or cc). In one example, the golf club head 5900 may be about 460 cc. Alternatively, the golf club head 5900 may have a club head volume less than or equal to 300 cc. In particular, the golf club head 5900 may have a club head volume between 100 cc and 200 cc. The apparatus, methods, and articles of manufacture described herein are not limited in this regard.

In one example, the face portion 5945 may include an outer face portion 6010 defining a face opening 6110 and a dual face insert structure 6020 coupled to the outer face portion 6010 to close the face opening 6110. The outer face portion 6010 may correspond to a peripheral region of the face portion 5945 and may be integral with the body portion 5910. The dual face insert structure 6020 may include a first face insert 6030 and a second face insert 6040. The first face insert 6030 may define an insert opening 6120 configured to receive the second face insert 6040. The insert opening 6120 may have a shape that complements a shape of the second face insert 6040 to enable the second face insert 6040 to be set inside the insert opening 6120 such that an outer perimeter edge 6130 of the second face insert 6040 may at least partially contact an inner perimeter edge 6140 of the first face insert 6030. The second face insert 6040 may be welded or otherwise attached to the first face insert 6030. Likewise, the face opening 6110 may have a shape that complements a shape of the first face insert 6030 to enable the dual face insert structure 6020 to be set inside the face opening 6110 such that an outer perimeter edge 6150 of the first face insert 6030 may at least partially contact an inner perimeter edge 6160 of the outer face portion 6010. The dual face insert structure 6020 may be welded or otherwise attached to the outer face portion 6010. A sanding or polishing process may be employed to remove excess weld material to produce a smooth surface across the outside and inside of the face portion 5945. In examples where the golf club head 5900 is configured as a driver-type golf club head, a fairway wood-type golf club head, or a hybrid-type golf club head, the face portion 5945 may have a specified bulge and roll. In such examples, the dual face insert structure 6020 may have a radius of curvature in both a heel-to-toe direction and a top-to-bottom of the golf club head 5900. The apparatus, methods, and articles of manufacture described herein are not limited in this regard.

The second face insert 6040 may define a central hitting surface of the face portion 5945 and may include a sweet spot of the face portion 5945. The second face insert 6040 may be elongate, extending a greater length in the heel-to-toe direction than in the top-to-bottom direction of the golf club head 5900. The first face insert 6030 may surround the second face insert 6040 and may at least partially define a peripheral hitting surface of the face portion 5945. Similar to the second face insert 6040, the first face insert 6030 may be elongate, extending a greater length in the heel-to-toe direction than in the top-to-bottom direction of the golf club head 5900. The first face insert 6030 may have an outer surface area that is greater than an outer surface area of the second face insert 6040. In one example, the outer surface area of the first face insert 6030 may be greater than or equal to 2.00 square inches (12.90 square centimeters) and less than or equal to 2.50 square inches (16.13 square centimeters) and the outer surface area of the second face insert 6040 may be greater than or equal to 1.00 square inches (6.45 square centimeters) and less than or equal to 1.5 square inches (9.68 square centimeters). The second face insert 6040 may be made from a material having a higher Young's modulus to reduce or limit face deflection when a golf ball is struck by the central hitting surface in order to conform with any CT or COR requirements set forth by golf governing bodies. Additionally, reducing or limiting the face deflection of the second face insert 6040 may result in more uniform ball speeds. In contrast, the first face insert 6030 may be made from a material having a lower Young's modulus to increase face deflection when a golf ball is struck by the peripheral hitting surface in an effort to improve ball speed for off-center face strikes. Accordingly, the dual face insert structure 6020 may be configured with contrasting face deflection properties and may work in conjunction to promote faster and more uniform ball speed distribution resulting from ball strikes across the face portion 5945 in both the toe-to-heel direction and the top-to-bottom direction of the golf club head 5900. The apparatus, methods, and articles of manufacturing described herein are not limited in this regard.

As described herein, the first face insert 6030 may exhibit greater face deflection than the second face insert 6040. Accordingly, the first face insert 6030 may be made from a material that is different from a material of the second face insert 6040. Additionally, the material of the first face insert 6030 may be different from a material of the outer face portion 6010 while the material of the second face insert 6040 may be similar to or different from the material of the outer face portion 6010. In one example, the first face insert 6030 may be made from a material having a Young's modulus greater than or equal to 85 Gigapascals (GPa) and less than or equal to 110 GPa while the second face insert 6040 may be made from a material having a Young's modulus greater than or equal to 125 GPa and less than or equal to 140 GPa. To further optimize ball speeds, the dual face insert structure 6020 may be made from materials having higher yield strengths to achieve a thinner face construction without sacrificing face durability. In one example, the first face insert 6030 may have a variable or uniform face thickness 6310 greater than or equal to 0.080 inch (2.032 mm) and less than or equal to 0.110 inch (2.794 mm) while the second face insert 6040 may have a variable or uniform face thickness 6320 greater than or equal to 0.120 inch (3.048 mm) and less than or equal to 0.150 inch (3.810 mm). In one example, the face thickness 6310 of the first face insert 6030 may be less than or equal to a thickness 6330 of the outer face portion 6010. The face thickness 6320 of the second face insert 6040 may be uniform at a central portion 6210 and may transition to the face thickness 6310 of the first face insert 6030 at a transition portion 6220 surrounding the central portion 6210 and located adjacent to the first face insert 6030. With respect to the examples described herein, one suitable material for the first face insert 6030 may include a beta, beta rich, or alpha-beta phase titanium alloy such as, but not limited to, Ti-412, Ti-180, Ti-1-5-3-3-3, DAT-55G, or any combination thereof. One suitable material for the second face insert 6040 may include an alpha, near alpha, or alpha-beta phase titanium alloy such as, but not limited to, TA15, Ti-811, TiX51AF, or any combination thereof. The apparatus, methods, and articles of manufacturing described herein are not limited in this regard.

Figure 64:
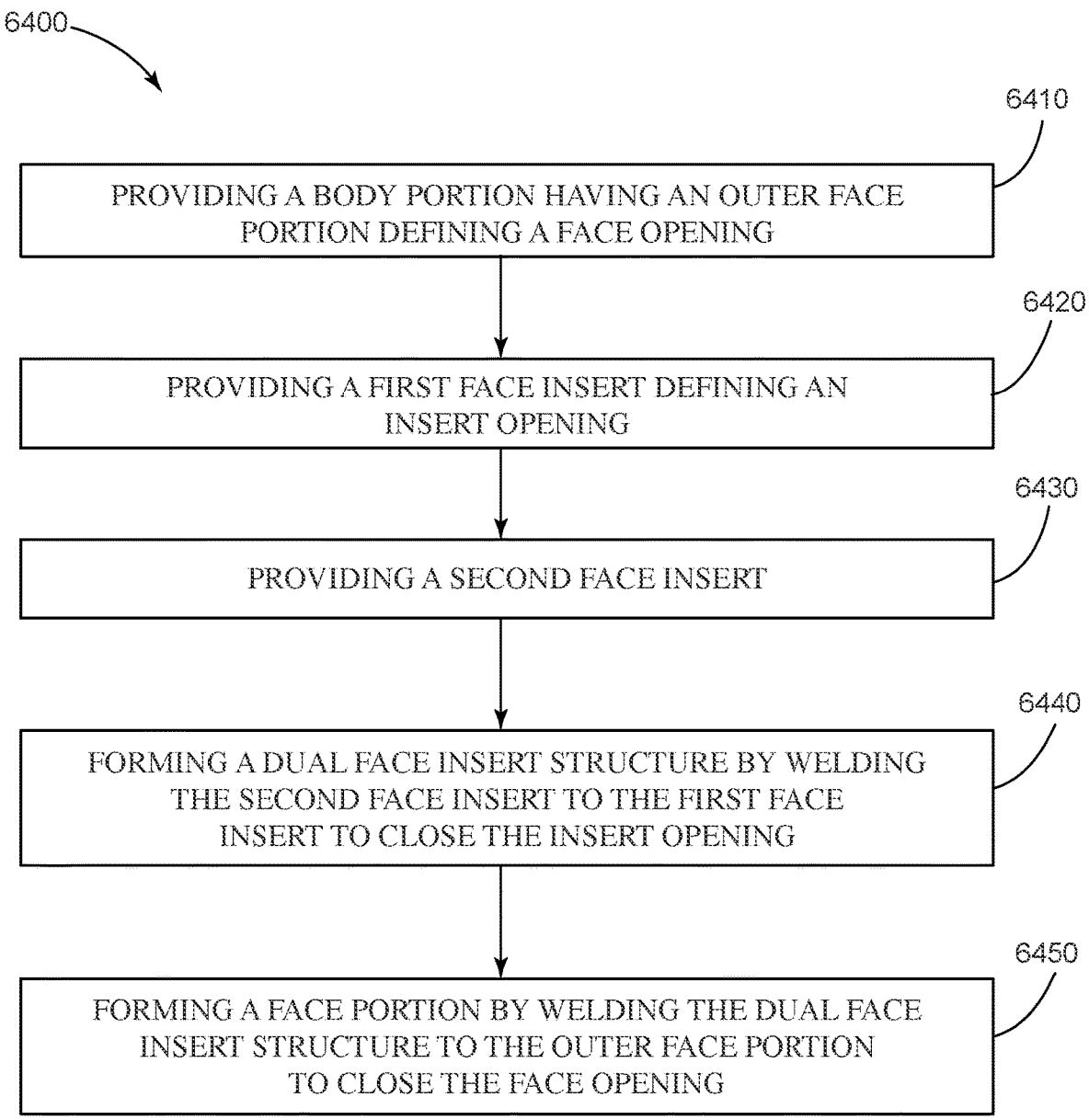
FIG. 64 depicts a process for assembling a golf club head according to an embodiment of the apparatus, methods, and articles of manufacture described herein.

In the example of FIG. 64, a process 6400 for assembling a face portion of a golf club head is shown with continued reference to the example golf club head 5900 of FIGS. 59-63 for purposes of understanding. The process 6400 may include providing a body portion 5910 having an outer face portion 6010 defining a face opening 6110 (block 6410), providing a first face insert 6030 defining an insert opening 6120 (block 6420), and providing a second face insert 6040 (block 6430). A dual face insert structure 6020 may be formed by welding or otherwise attaching the second face insert 6040 to the first face insert 6030 to close the insert opening 6120 (block 6440). Subsequently, a face portion 5945 of the golf club head 5900 may be formed by welding or otherwise attaching the dual face insert structure 6020 to the outer face portion 6010 to close the face opening 6110 (block 6450). In one example, the face portion 5945 may be strengthened via an aging heat treatment process. The apparatus, methods, and articles of manufacturing described herein are not limited in this regard.

Figure 65:
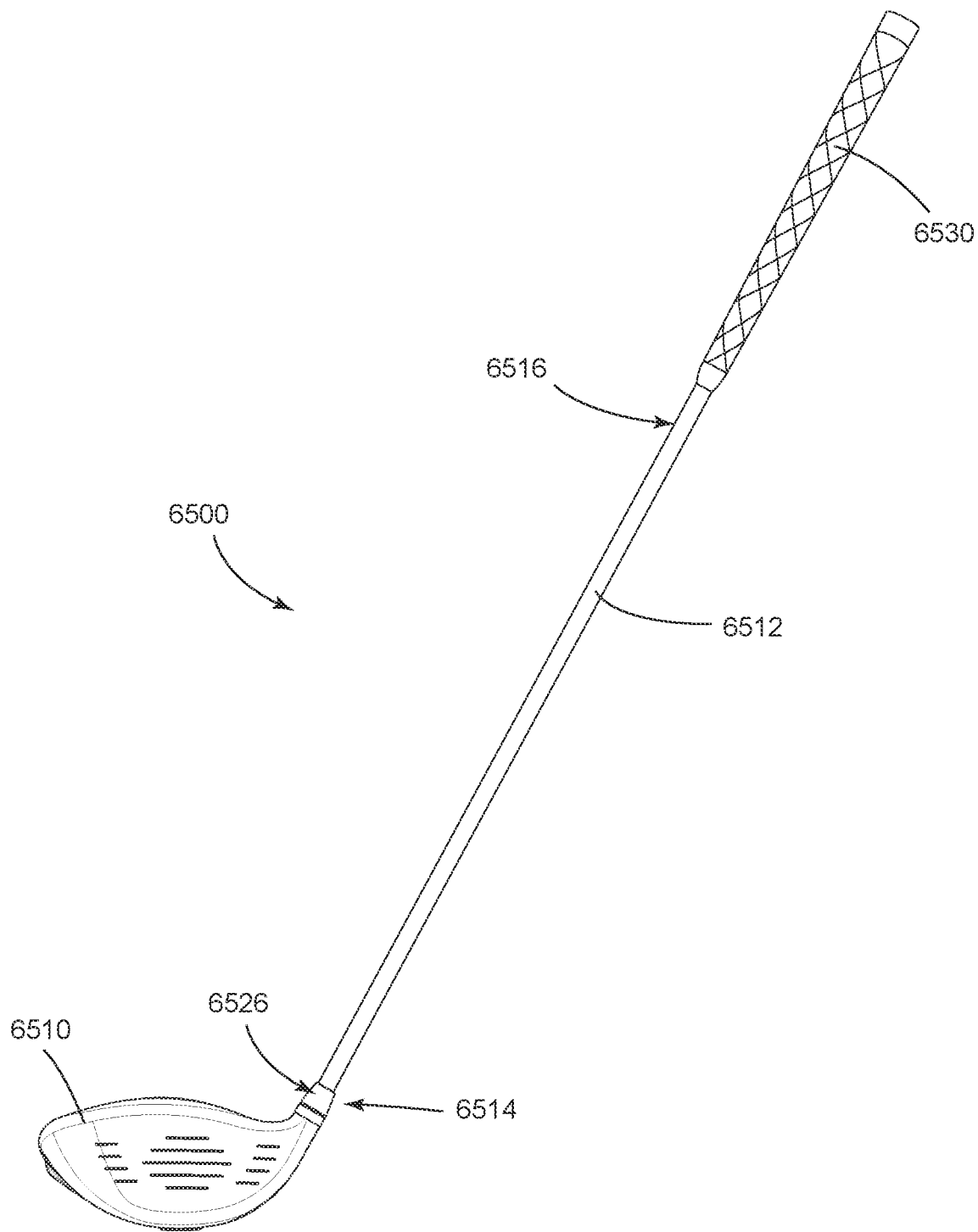
FIG. 65 illustrates a golf club including a golf club head according to any of the embodiments of the apparatuses, methods, and articles of manufacture described herein.

Any of the golf club heads described herein may be part of a golf club. In one example, as shown in FIG. 65, a golf club 6500, which may include any of the golf club heads described herein, may include a shaft portion 6512 extending from a golf club head 6510. The shaft portion 6512 may have a first end 6514 or first end portion 6514 (a first end portion 6514 of the shaft portion 6512 is shown in FIG. 65) attached to a hosel 6526 of the golf club head 6510 and a second end 6516 or a second end portion 6516 (a second end portion 6516 of the shaft portion 6512 is shown in FIG. 65) opposite the first end portion 6514. The golf club 6500 may include a grip 6530 at or proximate to the second end portion 6516 of the shaft portion 6512. The shaft portion 6512 may be formed from metal material, composite material, or any other suitable material or combination of materials. The grip 6530 may be formed from rubber material, polymer material, or any other suitable material or combination of materials. The apparatus, methods, and articles of manufacture described herein are not limited in this regard.

While each of the above examples may describe a certain type of golf club head, the apparatus, methods, and articles of manufacture described herein may be applicable to other types of golf club heads (e.g., a driver-type golf club head, a fairway wood-type golf club head, a hybrid-type golf club head, an iron-type golf club head, a putter-type golf club head, etc.).

Procedures defined by golf standard organizations and/or governing bodies such as the United States Golf Association (USGA) and/or the Royal and Ancient Golf Club of St. Andrews (R&A) may be used for measuring the club head volume of any of the golf club heads described herein. For example, a club head volume may be determined by using the weighted water displacement method (i.e., Archimedes Principle). Although the figures may depict particular types of club heads (e.g., a driver-type club head or iron-type golf club head), the apparatus, methods, and articles of manufacture described herein may be applicable to other types of club head (e.g., a fairway wood-type club head, a hybrid-type club head, a putter-type club head, etc.). Accordingly, any golf club head as described herein may have a volume that is within a volume range corresponding to certain type of golf club head as defined by golf governing bodies. A driver-type golf club head may have a club head volume of greater than or equal to 300 cubic centimeters ($cm^3$ or cc). In another example, a driver-type golf club head may have a club head volume of 460 cc. A fairway wood golf club head may have a club head volume of between 100 cc and 300 cc. In one example, a fairway wood golf club head may have a club head volume of 180 cc. An iron-type golf club head may have a club head volume of between 25 cc and 100 cc. In one example, an iron-type golf club head may have a volume of 50 cc. Any of the golf clubs described herein may have the physical characteristics of a certain type of golf club (i.e., driver, fairway wood, iron, etc.), but have a volume that may fall outside of the above-described ranges. The apparatus, methods, and articles of manufacture described herein are not limited in this regard.

Any of the golf club heads and/or golf clubs described herein may include one or more sensors (e.g., accelerometers, strain gauges, etc.) for sensing linear motion (e.g., acceleration) and/or forces in all three axes of motion and/or rotational motion (e.g., angular acceleration) and rotational forces about all three axes of motion. In one example, the one or more sensors may be internal sensors that may be located inside the golf club head, the hosel, the shaft portion, and/or the grip. In another example, the one or more sensors may be external sensors that may be located on the grip, on the shaft portion, on the hosel, and/or on the golf club head. In yet another example, the one or more sensors may be external sensors that may be attached by an individual to the grip, to the shaft portion, to the hosel, and/or to the golf club head. In one example, data collected from the sensors may be used to determine any one or more design parameters for any of the golf club heads and/or golf clubs described herein to provide certain performance or optimum performance characteristics. In another example, data from the sensors may be collected during play to assess the performance of an individual. The apparatus, methods, and articles of manufacture described herein are not limited in this regard.

Any of the apparatus, methods, or articles of manufacture described herein may include one or more visual identifiers such as alphanumeric characters, colors, images, symbols, logos, and/or geometric shapes. For example, one or more visual identifiers may be manufactured with one or more portions of a golf club such as the golf club head (e.g., casted or molded with the golf club head), painted on the golf club head, etched on the golf club (e.g., laser etching), embossed on the golf club head, machined onto the golf club head, attached as a separate badge or a sticker on the golf club head (e.g., adhesive, welding, brazing, mechanical lock(s), any combination thereof, etc.), or any combination thereof. The visual identifier may be made from the same material as the golf club head or a different material than the golf club head (e.g., a plastic badge attached to the golf club head with an adhesive). Further, the visual identifier may be associated with manufacturing and/or brand information of the golf club head, the type of golf club head, one or more physical characteristics of the golf club head, or any combination thereof. In particular, a visual identifier may include a brand identifier associated with a manufacturer of the golf club (e.g., trademark, trade name, logo, etc.) or other information regarding the manufacturer. In addition, or alternatively, the visual identifier may include a location (e.g., country of origin), a date of manufacture of the golf club or golf club head, or both.

The visual identifier may include a serial number of the golf club or golf club head, which may be used to check the authenticity to determine whether or not the golf club or golf club head is a counterfeit product. The serial number may also include other information about the golf club that may be encoded with alphanumeric characters (e.g., country of origin, date of manufacture of the golf club, or both). In another example, the visual identifier may include the category or type of the golf club head (e.g., 5-iron, 7-iron, pitching wedge, etc.). In yet another example, the visual identifier may indicate one or more physical characteristics of the golf club head, such as one or more materials of manufacture (e.g., visual identifier of "Titanium" indicating the use of titanium in the golf club head), loft angle, face portion characteristics, mass portion characteristics (e.g., visual identifier of "Tungsten" indicating the use of tungsten mass portions in the golf club head), interior cavity and filler material characteristics (e.g., one or more abbreviations, phrases, or words indicating that the interior cavity is filled with a polymer material), any other information that may visually indicate any physical or play characteristic of the golf club head, or any combination thereof. Further, one or more visual identifiers may provide an ornamental design or contribute to the appearance of the golf club, or the golf club head.

Any of the golf club heads described herein may be manufactured by casting from metal such as steel. However, other techniques for manufacturing a golf club head as described herein may be used such as 3D printing or molding a golf club head from metal or non-metal materials such as ceramics.

All methods described herein may be performed in any suitable order unless otherwise indicated herein or otherwise clearly contradicted by context. Although a particular order of actions may be described herein with respect to one or more processes, these actions may be performed in other temporal sequences. Further, two or more actions in any of the processes described herein may be performed sequentially, concurrently, or simultaneously.

The terms "and" and "or" may have both conjunctive and disjunctive meanings. The terms "a" and "an" are defined as one or more unless this disclosure indicates otherwise. The term "coupled," and any variation thereof, refers to directly or indirectly connecting two or more elements chemically, mechanically, and/or otherwise. The phrase "removably connected" is defined such that two elements that are "removably connected" may be separated from each other without breaking or destroying the utility of either element.

The term "substantially" when used to describe a characteristic, parameter, property, or value of an element may represent deviations or variations that do not diminish the characteristic, parameter, property, or value that the element may be intended to provide. Deviations or variations in a characteristic, parameter, property, or value of an element may be based on, for example, tolerances, measurement errors, measurement accuracy limitations and other factors. The term "proximate" is synonymous with terms such as "adjacent," "close," "immediate," "nearby," "neighboring," etc., and such terms may be used interchangeably as appearing in this disclosure.

Recitation of ranges of values herein is merely intended to serve as a shorthand method of referring individually to each separate value falling within the range. Unless otherwise indicated herein, each individual value is incorporated into the specification as if it were individually recited herein. A numerical range defined using the word "between" includes numerical values at both end points of the numerical range. A spatial range defined using the word "between" includes any point within the spatial range and the boundaries of the spatial range. A location expressed relative to two spaced apart or overlapping elements using the word "between" includes (i) any space between the elements, (ii) a portion of each element, and/or (iii) the boundaries of each element.

The use of any and all examples, or exemplary language (e.g., "such as") provided herein is intended merely for clarification and does not pose a limitation on the scope of the present disclosure. No language in the specification should be construed as indicating any non-claimed element essential to the practice of any embodiments discussed herein.

Groupings of alternative elements or embodiments disclosed herein are not to be construed as limitations. Each group member may be referred to and claimed individually or in any combination with other members of the group or other elements disclosed herein. One or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

While different features or aspects of an embodiment may be described with respect to one or more features, a singular feature may comprise multiple elements, and multiple features may be combined into one element without departing from the scope of the present disclosure. Further, although methods may be disclosed as comprising one or more operations, a single operation may comprise multiple steps, and multiple operations may be combined into one step without departing from the scope of the present disclosure.

The apparatus, methods, and articles of manufacture described herein may be implemented in a variety of embodiments, and the foregoing description of some of these embodiments does not necessarily represent a complete description of all possible embodiments. Instead, the description of the drawings, and the drawings themselves, disclose at least one embodiment, and may disclosure alternative embodiments.

As the rules of golf may change from time to time (e.g., new regulations may be adopted or old rules may be eliminated or modified by golf standard organizations and/or governing bodies such as the USGA, the R&A, etc.), golf equipment related to the apparatus, methods, and articles of manufacture described herein may be conforming or non-conforming to the rules of golf at any particular time. Accordingly, golf equipment related to the apparatus, methods, and articles of manufacture described herein may be advertised, offered for sale, and/or sold as conforming or non-conforming golf equipment. The apparatus, methods, and articles of manufacture described herein are not limited in this regard.

Further, while the above examples may be described with respect to golf clubs, the apparatus, methods and articles of manufacture described herein may be applicable to other suitable types of sports equipment such as a fishing pole, a hockey stick, a ski pole, a tennis racket, etc.

Although certain example apparatus, methods, and articles of manufacture have been described herein, the scope of coverage of this disclosure is not limited thereto. On the contrary, this disclosure covers all apparatus, methods, and articles of articles of manufacture fairly falling within the scope of the appended claims either literally or under the doctrine of equivalents.

What is claimed is:

1. A golf club head comprising:
    a metal body portion including a front portion having a peripheral face portion surrounding an opening; and
    a face plate set in the opening, the face plate comprising:
        a metal bezel attached to the opening; and
        a strike assembly set in the bezel, the strike face assembly having:
            an outer metal sheet welded to the metal bezel;
            an inner metal sheet welded to the metal bezel; and
            an intermediate composite sheet disposed between the outer metal sheet and the inner metal sheet,
        wherein the intermediate composite sheet includes a fiber reinforced thermoplastic having a plurality of fibers disposed transversely with respect to a substrate of the intermediate composite sheet.

2. A golf club head as defined in claim 1, wherein the strike assembly has a thickness that is greater than a thickness of the peripheral face portion, and wherein the metal bezel has a thickness that transitions between the thickness of the strike assembly and the thickness of the peripheral face portion.

3. A golf club head as defined in claim 1, wherein the opening has an oval or an oval-like shape.

4. A golf club head as defined in claim 1, wherein the metal body portion, the metal bezel, the outer metal sheet, and the inner metal sheet each includes a titanium alloy.

5. A golf club head as defined in claim 1, wherein the intermediate composite sheet has a thickness greater than or equal to a thickness of any one of the outer metal sheet and the inner metal sheet.

6. A golf club head as defined in claim 1, wherein the intermediate composite sheet has a thickness less than or equal to a thickness of any one of the outer metal sheet and the inner metal sheet.

7. A golf club head as defined in claim 1, wherein the plurality of fibers extend orthogonally with respect to the substrate of the intermediate composite sheet in a front-to-rear direction of the golf club head.

8. A golf club head comprising:
a body portion formed from a first material, the body portion including an opening at a face portion; and
a face plate set in the opening, the face plate comprising:
a bezel formed from a second material; and
a strike assembly set in the bezel, the strike face assembly having:
an outer sheet formed from a third material;
an inner sheet formed from a fourth material; and
an intermediate sheet formed from a fifth material and disposed between the outer sheet and the inner sheet,
wherein the first, second, third, and fourth materials include a metal material, and
wherein the fifth material includes a non-metal material.

9. A golf club head as defined in claim 8, wherein the first material includes a titanium-based material.

10. A golf club head as defined in claim 8, wherein the second material, the third material, and the fourth material include a titanium-based material.

11. A golf club head as defined in claim 8, wherein the fifth material includes a fiber reinforced thermoplastic having a plurality of discontinuous fibers transversely aligned such that the plurality of discontinuous fibers extend in a front-to-rear direction of the golf club head.

12. A golf club head as defined in claim 8, wherein the strike assembly has a thickness greater than or equal to 0.125 inch (3.175 mm) and less than or equal to 0.175 inch (5.080 mm).

13. A golf club head as defined in claim 8, wherein the strike assembly has a thickness of about 0.150 inch (3.810 mm), and wherein the outer sheet, the inner sheet, and the intermediate sheet each have a thickness of about 0.050 inch (1.270 mm).

14. A golf club head comprising:
a body portion including an opening at a face portion; and
a face plate set in the opening, the face plate comprising:
a metal shell; and
a composite core encased by the metal shell,
wherein the composite core includes a fiber reinforced thermoplastic having a plurality of discontinuous fibers transversely aligned such that the plurality of discontinuous fibers are disposed orthogonally with respect to a substrate of the composite core.

15. A golf club head as defined in claim 14, wherein the metal shell is formed from a titanium-based material.

16. A golf club head as defined in claim 14, wherein the body portion is formed from a titanium-based material.

17. A golf club head as defined in claim 14, wherein the face plate has an outer surface area that is greater than or equal to 50% of an outer surface area of the face portion and less than or equal to 60% of the outer surface area of the face portion.

18. A golf club head as defined in claim 14, wherein the face plate has a thickness greater than or equal to 0.125 inch (3.175 mm) and less than or equal to 0.175 inch (5.080 mm).

19. A golf club head as defined in claim 14, wherein the composite core is configured as a sheet having a thickness that is greater than or equal to 0.025 inch (0.635 mm) and less than or equal to 0.090 inch (2.286 mm).

20. A golf club head as defined in claim 14, wherein the plurality of discontinuous fibers are oriented to extend in a front-to-rear direction of the golf club head.

* * * * *